(12) United States Patent
Xiong et al.

(10) Patent No.: US 12,491,638 B2
(45) Date of Patent: Dec. 9, 2025

(54) BILATERAL TELEOPERATION SYSTEM AND CONTROL METHOD

(71) Applicant: Tencent Technology (Shenzhen) Company Limited, Shenzhen (CN)

(72) Inventors: Kun Xiong, Shenzhen (CN); Longfei Zhao, Shenzhen (CN); Dongsheng Zhang, Shenzhen (CN); Lei Wei, Shenzhen (CN); Cheng Zhou, Shenzhen (CN); Haitao Wang, Shenzhen (CN); Wangwei Lee, Shenzhen (CN); Ke Chen, Shenzhen (CN); Bidan Huang, Shenzhen (CN); Yi Ren, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 244 days.

(21) Appl. No.: 17/992,762

(22) Filed: Nov. 22, 2022

(65) Prior Publication Data
US 2023/0083258 A1 Mar. 16, 2023

Related U.S. Application Data

(63) Continuation of application No. PCT/CN2022/074388, filed on Jan. 27, 2022.

(30) Foreign Application Priority Data

Feb. 8, 2021 (CN) .......................... 202110172991.1

(51) Int. Cl.
  *B25J 9/16* (2006.01)
  *B25J 3/04* (2006.01)
  (Continued)

(52) U.S. Cl.
  CPC ............... *B25J 9/1689* (2013.01); *B25J 3/04* (2013.01); *B25J 9/1602* (2013.01); *B25J 13/084* (2013.01); *B25J 13/085* (2013.01); *B25J 19/023* (2013.01)

(58) Field of Classification Search
  CPC . B25J 9/1689; B25J 3/04; B25J 9/1602; B25J 13/084; B25J 13/085; B25J 19/023;
  (Continued)

(56) References Cited

U.S. PATENT DOCUMENTS 7,155,315 B2 * 12/2006 Niemeyer ............... A61B 34/70
2003/0223844 A1 * 12/2003 Schiele .................. A63B 23/12
(Continued)

FOREIGN PATENT DOCUMENTS

CN 101434066 A 5/2009
CN 102615637 A 8/2012
(Continued)

OTHER PUBLICATIONS

Machine Translation of CN-111515951-A (Year: 2020).*
(Continued)

*Primary Examiner* — Ramon A. Mercado
*Assistant Examiner* — Ellis B. Ramirez
(74) *Attorney, Agent, or Firm* — Morgan, Lewis & Bockius LLP

(57) ABSTRACT

A bilateral teleoperation system includes: a primary-end operation platform and a secondary-end operation platform. The primary-end operation platform includes: a primary-end support, primary-end mechanical arms, a mechanical hand control assembly, and a first controller, a root end of the primary-end mechanical arm being arranged on the primary-end support, and a tail end of the primary-end mechanical arm being connected to the mechanical hand control assembly. The secondary-end operation platform includes: a sec-
(Continued)

ondary-end support, secondary-end mechanical arms, secondary-end mechanical hands, and a second controller, a root end of the secondary-end mechanical arm being arranged on the secondary-end support, and a tail end of the secondary-end mechanical arm being connected to the secondary-end mechanical hand; the primary-end mechanical arm and the secondary-end mechanical arm are homogeneous mechanical arms, and the first controller in the primary-end operation platform is communicatively connected to the second controller in the secondary-end operation platform.

20 Claims, 25 Drawing Sheets

(51) Int. Cl.
    *B25J 13/08* (2006.01)
    *B25J 19/02* (2006.01)

(58) Field of Classification Search
    CPC ........ B25J 5/007; B25J 9/0006; B25J 9/0087;
                  B25J 13/025; B25J 3/00; B25J 9/1664;
                  B25J 13/00; G05B 2219/40138; G05B
                                          2219/40184
    USPC ........................ 700/264, 246; 706/12, 16, 52
    See application file for complete search history.

(56) References Cited

U.S. PATENT DOCUMENTS

| | | | | |
|---|---|---|---|---|
| 2012/0328395 | A1* | 12/2012 | Jacobsen | B66F 9/18 |
| 2013/0178978 | A1* | 7/2013 | Kim | B25J 9/00 |
| 2017/0050310 | A1* | 2/2017 | Kanaoka | B25J 13/088 |
| 2017/0265890 | A1* | 9/2017 | Page | A61B 17/3423 |
| 2017/0348858 | A1* | 12/2017 | Chiu | G06F 3/017 |
| 2018/0250086 | A1* | 9/2018 | Grubbs | A61B 34/35 |
| 2018/0250830 | A1* | 9/2018 | Hashimoto | B25J 9/1628 |
| 2020/0066405 | A1* | 2/2020 | Peyman | A61B 5/7275 |
| 2020/0198120 | A1* | 6/2020 | Hashimoto | B25J 19/02 |
| 2020/0289227 | A1* | 9/2020 | Jiang | A61B 34/76 |
| 2021/0086364 | A1* | 3/2021 | Handa | B25J 13/08 |

FOREIGN PATENT DOCUMENTS

| | | | |
|---|---|---|---|
| CN | 104793622 | A | 7/2015 |
| CN | 106272382 | A | 1/2017 |
| CN | 107457762 | A | 12/2017 |
| CN | 111251336 | A | 6/2020 |
| CN | 111319026 | A | 6/2020 |
| CN | 111409074 | A | 7/2020 |
| CN | 111459277 | A | 7/2020 |
| CN | 111515951 | A | 8/2020 |
| CN | 211362244 | U | 8/2020 |
| CN | 112060088 | A | 12/2020 |
| JP | 2012125851 | A | 7/2012 |
| JP | 2019217557 | A | 12/2019 |

OTHER PUBLICATIONS

Machine translation of CN-211362244-U (Year: 2020).*
Katsunari Sato, Kouta Minamizawa, Naoki Kawakami, and Susumu Tachi. 2007. Haptic telexistence. In ACM SIGGRAPH 2007 emerging technologies (SIGGRAPH '07). Association for Computing Machinery, New York, NY, USA, 10âes. https://doi.org/10.1145/1278280.1278291 (Year: 2007).*
C. L. Fernando, M. Furukawa, K. Minamizawa and S. Tachi, "Experiencing ones own hand in telexistence manipulation with a 15 DOF anthropomorphic robot hand and a flexible master glove," 2013 23rd International Conference on Artificial Reality and Telexistence (ICAT), Tokyo, Japan, 2013, pp. 20-27, (Year: 2013).*
Tencent Technology, ISR, PCT/CN2022/074388, Apr. 6, 2022, 2 pgs.
Tencent Technology, WO, PCT/CN2022/074388, Apr. 6, 2022, 4 pgs.
Tencent Technology, IPRP, PCT/CN2022/074388, Aug. 3, 2023, 5 pgs.

* cited by examiner (a)

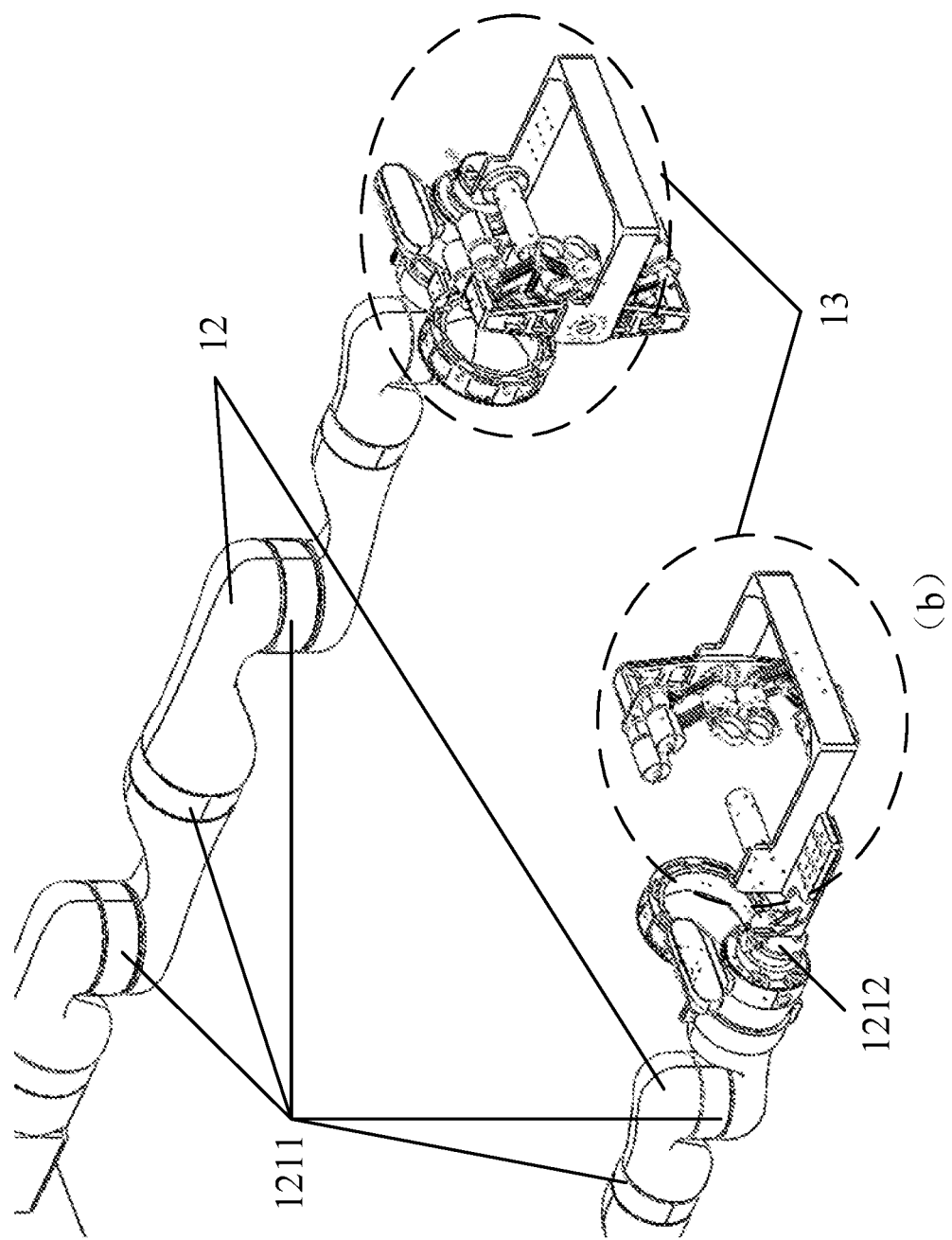
FIG. 9 - continued

BILATERAL TELEOPERATION SYSTEM AND CONTROL METHOD

RELATED APPLICATION

This application is a continuation application of PCT Patent Application No. PCT/CN2022/074388, entitled "BILATERAL TELEOPERATION SYSTEM AND CONTROL METHOD" filed on Jan. 27, 2022, which claims priority to Chinese Patent Application No. 202110172991.1, entitled "BILATERAL TELEOPERATION SYSTEM AND CONTROL METHOD" filed with the China National Intellectual Property Administration on Feb. 8, 2021, which is incorporated herein by reference in its entirety.

FIELD OF THE TECHNOLOGY

This application relates to the field of teleoperation technologies, and in particular, to a bilateral teleoperation system and a control method.

BACKGROUND OF THE DISCLOSURE

With the development of sciences and technologies, bilateral teleoperation systems are widely applied to industry and daily life, so as to process some complex, dangerous, or inconvenient events in place of human beings. The bilateral teleoperation system includes a primary-end operation platform and a secondary-end operation platform, and an operator usually implements a teleoperation on the secondary-end operation platform by controlling the primary-end operation platform; and moreover, the secondary-end operation platform sends corresponding motion information to the primary-end operation platform to provide motion feedback to the operator.

For example, the primary-end operation platform in the bilateral teleoperation system is an exoskeleton apparatus having three degrees of freedom, and the secondary-end operation platform is a controlled robot having five degrees of freedom. First, the primary-end operation platform obtains activity information of the operator through a plurality of joint motors on the exoskeleton apparatus. Subsequently, the primary-end operation platform converts the obtained activity information into a motion instruction of the controlled robot and then transfers the motion instruction to the secondary-end operation platform, thereby controlling the controlled robot. Moreover, the secondary-end operation platform sends corresponding motion information to the primary-end operation platform, and the operator obtains the motion information of the controlled robot through motion feedback of the primary-end operation platform.

In the bilateral teleoperation system, because the number of degrees of freedom of the secondary-end operation platform is different from the number of degrees of freedom of the primary-end operation platform, a mechanical arm of the secondary-end operation platform generates null-space motion. The null space occurs when the number of degrees of freedom of the secondary-end operation platform is greater than the number of degrees of freedom controlled by the primary-end operation platform. For example, in the foregoing bilateral teleoperation system, the number of degrees of freedom controlled by the primary-end operation platform is 3, and the number of degrees of freedom of the secondary-end operation platform is 5. Three controllable joints of the mechanical arm of the controlled robot are controlled by the exoskeleton apparatus. When the three controllable joints are kept motionless, there are two rotatable redundant joints forming the null space, and motion performed by the two rotatable joints is the null-space motion. That is, the three joints of the mechanical arm of the controlled robot are controlled through the exoskeleton apparatus, and the remaining two joints become the redundant joints, thereby causing the mechanical arm to generate the null-space motion that causes the controlled robot to become out of control.

SUMMARY

According to various embodiments of this application, a bilateral teleoperation system and a control method are provided. The technical solutions include at least solutions as follows:

According to an aspect of this application, a bilateral teleoperation system is provided, including: a primary-end operation platform and a secondary-end operation platform;

the primary-end operation platform includes: a primary-end support, primary-end mechanical arms, a mechanical hand control assembly, and a first controller, a root end of the primary-end mechanical arm being arranged on the primary-end support, and a tail end of the primary-end mechanical arm being connected to the mechanical hand control assembly;

the secondary-end operation platform includes: a secondary-end support, secondary-end mechanical arms, secondary-end mechanical hands, and a second controller, a root end of the secondary-end mechanical arm being arranged on the secondary-end support, and a tail end of the secondary-end mechanical arm being connected to the secondary-end mechanical hand; and the primary-end mechanical arm and the secondary-end mechanical arm being homogeneous mechanical arms, and the first controller in the primary-end operation platform being communicatively connected to the second controller in the secondary-end operation platform.

According to an aspect of this application, a primary-end operation platform is provided, including: a primary-end support, primary-end mechanical arms, mechanical hand control assemblies, and a first controller;

a root end of the primary-end mechanical arm being arranged on the primary-end support, and a tail end of the primary-end mechanical arm being connected to the mechanical hand control assembly; and the first controller being configured to collect motion information of the primary-end mechanical arm and the mechanical hand control assembly, and control motion of the primary-end mechanical arm and the mechanical hand control assembly.

According to an aspect of this application, a secondary-end operation platform is provided, including: a secondary-end support, secondary-end mechanical arms, secondary-end mechanical hands, and a second controller;

a root end of the secondary-end mechanical arm being arranged on the secondary-end support, and a tail end of the secondary-end mechanical arm being connected to the secondary-end mechanical hand; and the second controller is configured to control motion of the secondary-end mechanical arm and the secondary-end mechanical hand, and return motion information of the secondary-end mechanical arm and the secondary-end mechanical hand.

According to an aspect of this application, a bilateral teleoperation system control method is provided, applicable to the foregoing bilateral teleoperation system, the method including:

collecting, by a first controller, at least one of motion information of a primary-end mechanical arm of a primary-end operation platform of a bilateral teleoperation system and motion information of the mechanical hand control assembly of the primary-end operation platform;

transmitting, by the first controller, the motion information or a control instruction to a second controller of a secondary-end operation platform of the bilateral teleoperation system, the control instruction being generated based on the motion information; and controlling, by the second controller according to the motion information or the control instruction, the secondary-end operation platform to perform motion corresponding to the motion information, the motion being performed by at least one of a secondary-end mechanical arm and a secondary-end mechanical hand.

Details of one or more embodiments of this application are provided in the accompanying drawings and descriptions below. Other features and advantages of this application become obvious with reference to the specification, the accompanying drawings, and the claims.

BRIEF DESCRIPTION OF THE DRAWINGS

The accompanying drawings described herein are used to provide a further understanding of this application, and form a part of this application. Exemplary embodiments of this application and descriptions thereof are used to explain this application, and do not constitute any inappropriate limitation to this application. In the accompanying drawings.

DESCRIPTION OF EMBODIMENTS

Unless otherwise defined, all technical terms used in embodiments of this application have the same meanings as commonly understood by a person skilled in the art.

In the embodiments of this application, all involved "front" and "rear" are based on front and rear shown in the accompanying drawings. A "first end" and a "second end" are two opposite ends.

To make the objectives, technical solutions, and advantages of this application clearer, the following further describes the implementations of this application in detail with reference to the accompanying drawings.

Figure 1:
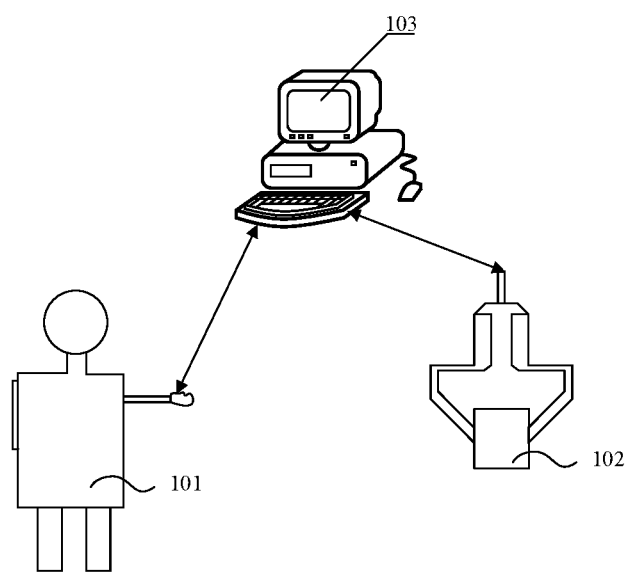
FIG. 1 is a schematic diagram of an application scenario of a bilateral teleoperation system according to an exemplary embodiment of this application.

FIG. 1 is a schematic diagram of an application scenario of a bilateral teleoperation system according to an exemplary embodiment of this application. As shown in FIG. 1, the application scenario includes a primary-end operation platform 101, a secondary-end operation platform 102 and a computer device 103 for implementing data exchange between the primary-end operation platform 101 and the secondary-end operation platform 102.

An operator obtains motion information of the primary-end operation platform 101 through an operation on the primary-end operation platform 101, transmits the motion information of the primary-end operation platform 101 to the computer device 103, and transmits the motion information to the secondary-end operation platform 102 through the computer device 103. After obtaining the motion information, the secondary-end operation platform 102 generates a related instruction according to the motion information to control a related part to perform corresponding motion.

Alternatively, after the operator obtains motion information of the primary-end operation platform 101 through an operation on the primary-end operation platform 101, the primary-end operation platform 101 generates a related instruction according to the motion information. The primary-end operation platform 101 transmits the foregoing related instruction to the computer device 103, the related instruction is transmitted to the secondary-end operation platform 102 through the computer device 103, and the secondary-end operation platform 102 performs corresponding motion according to the actual related instruction.

Moreover, the secondary-end operation platform 102 further has a function of feeding back information to the primary-end operation platform 101. The information fed by the secondary-end operation platform 102 back to the primary-end operation platform 101 includes but not limited to at least one of motion information and contact information.

The application scenario of the bilateral teleoperation system involved in this application is described above using only an exemplary method, and does not limit a bilateral teleoperation system, a primary-end operation platform, a secondary-end operation platform and a bilateral teleoperation system control method provided in this embodiment of this application, and other application scenarios that may implement data exchange between the primary-end operation platform 101 and the secondary-end operation platform 102 are also feasible.

Figure 2:
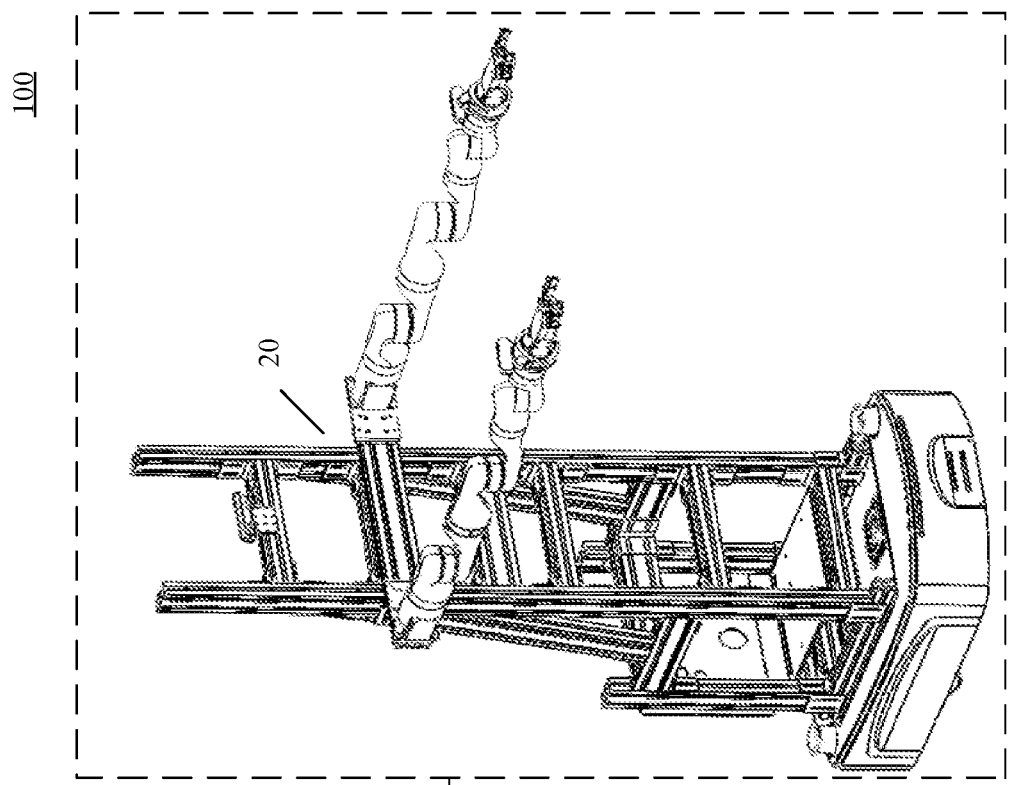
FIG. 2 is a schematic structural diagram of a bilateral teleoperation system according to an exemplary embodiment of this application.
Figure 2:
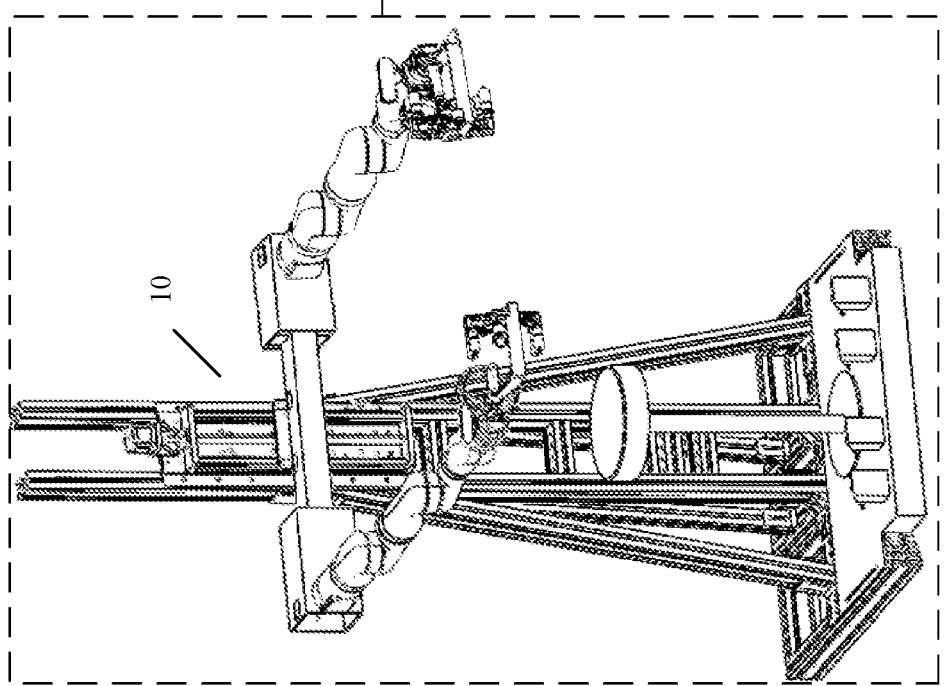

Schematically, as shown in FIG. 2, an embodiment of this application provides a bilateral teleoperation system 100, configured to control a teleoperation on a secondary-end operation platform 20. An example in which the bilateral teleoperation system 100 is applied to the application scenario shown in FIG. 1 is used. Schematically, the bilateral teleoperation system 100 provided in this embodiment of this application includes a primary-end operation platform 10 and the secondary-end operation platform 20.

Figure 7:
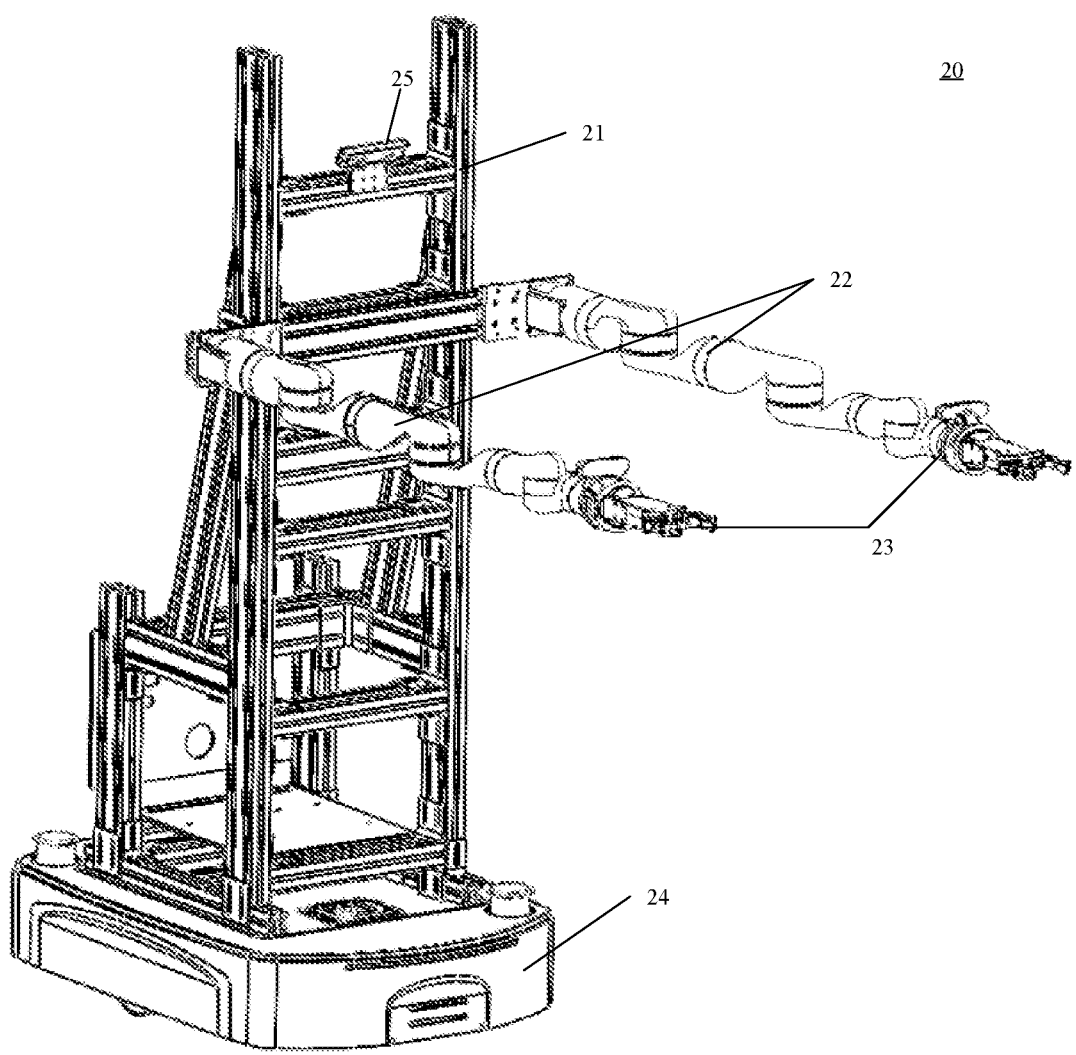
FIG. 7 is a schematic structural diagram of a secondary-end operation platform according to an exemplary embodiment of this application.
Figure 8:
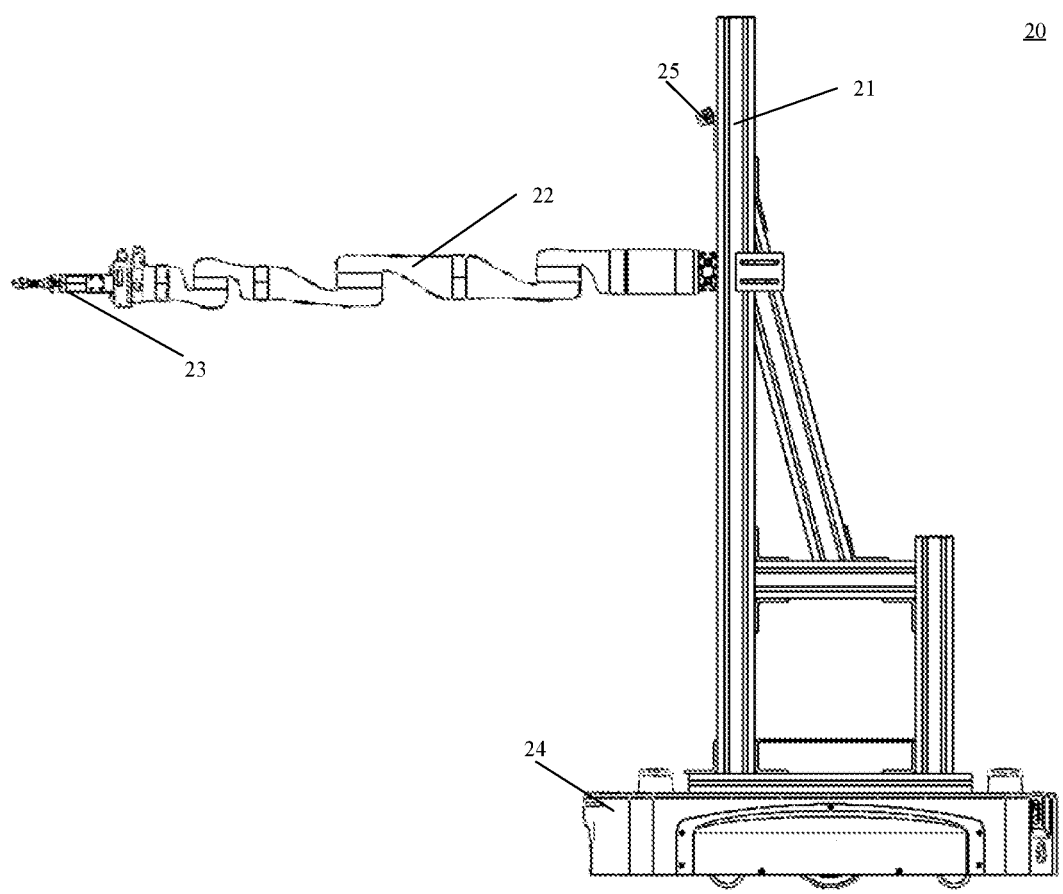
FIG. 8 is a schematic structural diagram of a secondary-end operation platform according to an exemplary embodiment of this application.

The primary-end operation platform 10 is shown in FIG. 3 to FIG. 6, and the secondary-end operation platform 20 is shown in FIG. 7 and FIG. 8.

The primary-end operation platform 10 includes: a primary-end support 11, primary-end mechanical arms 12, mechanical hand control assemblies 13, and a first controller, a root end of the primary-end mechanical arm 12 being arranged on the primary-end support 11, and a tail end of the primary-end mechanical arm 12 being connected to the mechanical hand control assembly 13.

The secondary-end operation platform 20 includes: a secondary-end support 21, secondary-end mechanical arms 22, secondary-end mechanical hands 23, and a second controller, a root end of the secondary-end mechanical arm 22 being arranged on the secondary-end support 21, and a tail end of the secondary-end mechanical arm 22 being connected to the secondary-end mechanical hand 23.

Schematically, the primary-end mechanical arm 12 and the secondary-end mechanical arm 22 are homogeneous mechanical arms, and the first controller in the primary-end operation platform 10 is communicatively connected to the second controller in the secondary-end operation platform 20.

Schematically, as shown in FIG. 3 to FIG. 6, in the primary-end operation platform 10, the primary-end support 11 is configured to support the primary-end mechanical arm 12, and the primary-end mechanical arm 12 is configured to support the mechanical hand control assembly 13. Schematically, as shown in FIG. 7 and FIG. 8, in the secondary-end operation platform 20, the secondary-end support 21 is configured to support the secondary-end mechanical arm 22, and the secondary-end mechanical arm 22 is configured to support the secondary-end mechanical hand 23. Schematically, the primary-end support 11 is movably connected to the primary-end mechanical arm 12, and is configured to adjust heights of and a spacing between the primary-end mechanical arms 12; and the secondary-end support 21 is movably connected to the secondary-end mechanical arm 22, and is configured to adjust heights of and a spacing between the secondary-end mechanical arms 22.

Schematically, the primary-end mechanical arm 12 and the secondary-end mechanical arm 22 are homogeneous mechanical arms. Schematically, the homogeneousness involved in the embodiments of this application means that the number of degrees of freedom of the primary-end mechanical arm 12 is the same as that of the secondary-end mechanical arm 22. Based on the premise that the number of degrees of freedom of the primary-end mechanical arm 12 is the same as that of the secondary-end mechanical arm 22, the length, size, and structure of the primary-end mechanical arm 12 are the same as or similar to those of the secondary-end mechanical arm 22. For example, each of the primary-end mechanical arm 12 and the secondary-end mechanical arm 22 is a mechanical arm with five degrees of freedom, the primary-end mechanical arm 12 is 0.5 meters, and the secondary-end mechanical arm 22 is 1.2 meters. Additionally, an auxiliary apparatus arranged on the primary-end mechanical arm 12 may be the same as or different from an auxiliary apparatus arranged on the secondary-end mechanical arm 22, which is not limited in this application.

That is, the primary-end mechanical arm 12 and the secondary-end mechanical arm 22 have the same number of degrees of freedom. Exemplarily, the primary-end mechanical arm 12 and the secondary-end mechanical arm 22 are mechanical arms with seven degrees of freedom.

An example in which the operator controls the primary-end operation platform 10 of the bilateral teleoperation system 100 is used. Because the number of degrees of freedom of the primary-end mechanical arm 12 is the same as that of the secondary-end mechanical arm 22, an operation of the operator on the primary-end mechanical arm 12 may be directly mapped to the secondary-end mechanical arm 22, to control the secondary-end mechanical arm 22 in real time. That is, Cartesian space and joint space of the primary-end mechanical arm 12 directly corresponds to Cartesian space and joint space of the secondary-end mechanical arm 22, and are used for controlling the secondary-end mechanical arm 22, which may effectively avoid out-of-control motion of redundant joints in the null space, so as to control the secondary-end mechanical arm 22 more intuitively.

Schematically, the mechanical hand control assembly 13 and the secondary-end mechanical hand 23 are homogeneous, or, the mechanical hand control assembly 13 and the secondary-end mechanical hand 23 are not homogeneous.

The mechanical hand control assembly 13 may include a plurality of mechanical hand control apparatuses, configured to control the secondary-end mechanical hand 23. Schematically, the mechanical hand control assembly 13 includes at least one of a wrist control apparatus and a finger section control apparatus, and the mechanical hand control assembly 13 is arranged on the tail end of the primary-end mechanical arm 12, and is configured to obtain at least one of wrist motion information and finger section motion information of the secondary-end mechanical hand 23.

An example in which the operator controls the primary-end operation platform 10 of the bilateral teleoperation system 100 is used. For example, each of the mechanical hand control assembly 13 and the secondary-end mechanical hand 23 is a five-finger mechanical hand, and the operator operates five fingers of the mechanical hand control assembly 13, thereby controlling five fingers of the secondary-end mechanical hand 23. In another example, the mechanical hand control assembly 13 includes a plurality of mechanical hand control apparatuses, the secondary-end mechanical hand 23 is at least one of a two-finger mechanical hand, a five-finger mechanical hand, and a multi-finger mechanical hand, the operator operates the plurality of mechanical hand control apparatuses of the mechanical hand control assembly 13, and the plurality of mechanical hand control apparatuses obtain motion information of fingers, and transmit the motion information to the secondary-end mechanical hand 23, thereby correspondingly controlling the secondary-end mechanical hand 23. Exemplarily, the secondary-end mechanical hand 23 is a two-finger clamping claw.

Schematically, the first controller in the primary-end operation platform 10 is communicatively connected to the second controller in the secondary-end operation platform 20.

The quantity of first controllers and second controllers may be set according to actual needs. Schematically, the first controller may be divided into a first mechanical arm controller and a first mechanical hand controller, and the second controller may be divided into a second mechanical arm controller and a second mechanical hand controller.

Additionally, the first controller is configured to collect motion information of the primary-end mechanical arm 12 and/or the mechanical hand control assembly 13, and control motion of the primary-end mechanical arm 12 and/or the mechanical hand control assembly 13; and the second controller is configured to control motion of the secondary-end mechanical arm 22 and/or the secondary-end mechanical hand 23, and return motion information of the secondary-end mechanical arm 22 and/or the secondary-end mechanical hand 23. For example, the first controller is communicatively connected to the second controller, the first controller collects mobile motion information of the primary-end mechanical arm 12, and the second controller controls the secondary-end mechanical arm 22 to perform mobile motion corresponding to the mobile motion information.

That is, the motion information or motion instruction of the primary-end mechanical arm 12 and/or the mechanical hand control assembly 13 in the primary-end operation platform 10 is transmitted to the second controller through the first controller, and the second controller receives the foregoing motion information or motion instruction, and is configured to control the secondary-end mechanical arm 22 and/or the secondary-end mechanical hand 23 to perform motion corresponding to the foregoing motion information or motion instruction. Moreover, the second controller collects motion information of the secondary-end mechanical arm 22 and/or the secondary-end mechanical hand 23, and transmits the motion information to the first controller, and the first controller feeds back the motion information of the secondary-end mechanical arm 22 and/or the secondary-end mechanical hand 23 to the primary-end mechanical arm 12 and/or the mechanical hand control assembly 13.

The first controller is communicatively connected to the second controller in a plurality of implementations. Schematically, the first controller is communicatively connected to the second controller through at least one of a conducting wire, a cable, and a signal.

Schematically, information exchange between the first controller and the second controller includes the following at least two manners:

The first controller collects motion information of the primary-end mechanical arm 12 and/or the mechanical hand control assembly 13, and transmits the motion information of the primary-end mechanical arm 12 and/or the mechanical hand control assembly 13 to the second controller;

or, the first controller collects motion information of the primary-end mechanical arm 12 and/or the mechanical hand control assembly 13, generates a motion instruction of the secondary-end mechanical arm 22 and/or the secondary-end mechanical hand 23 according to the motion information of the primary-end mechanical arm 12 and/or the mechanical hand control assembly 13, and transmits the motion instruction of the secondary-end mechanical arm 22 and/or the secondary-end mechanical hand 23 to the second controller.

To sum up, for the bilateral teleoperation system 100 provided in this embodiment of this application, the primary-end mechanical arm 12 and the secondary-end mechanical arm 22 are homogeneous, so that the primary-end mechanical arm and the secondary-end mechanical arm have the same number of degrees of freedom, joints in the joint space of the primary-end mechanical arm and joints in the joint space of the secondary-end mechanical arm are in a one-to-one correspondence, and no redundant joint exists in the joint space of the secondary-end mechanical arm, to prevent the secondary-end mechanical arm from generating null-space motion, that is, prevent the secondary-end mechanical arm from generating invalid motion.

According to the foregoing content, the primary-end mechanical arm 12 and the secondary-end mechanical arm 22 are homogeneous mechanical arms. Based on the premise that the primary-end mechanical arm 12 and the secondary-end mechanical arm 22 have the same number of degrees of freedom, the primary-end mechanical arm 12 and the secondary-end mechanical arm 22 are completely the same mechanical arm; or mechanical arms having the same number of degrees of freedom but slightly different structures, sizes, and auxiliary apparatuses. According to this, the embodiments of this application provide the following several implementations of the primary-end mechanical arm 12 and the secondary-end mechanical arm 22:

I. Torque Sensor.

Figure 9:
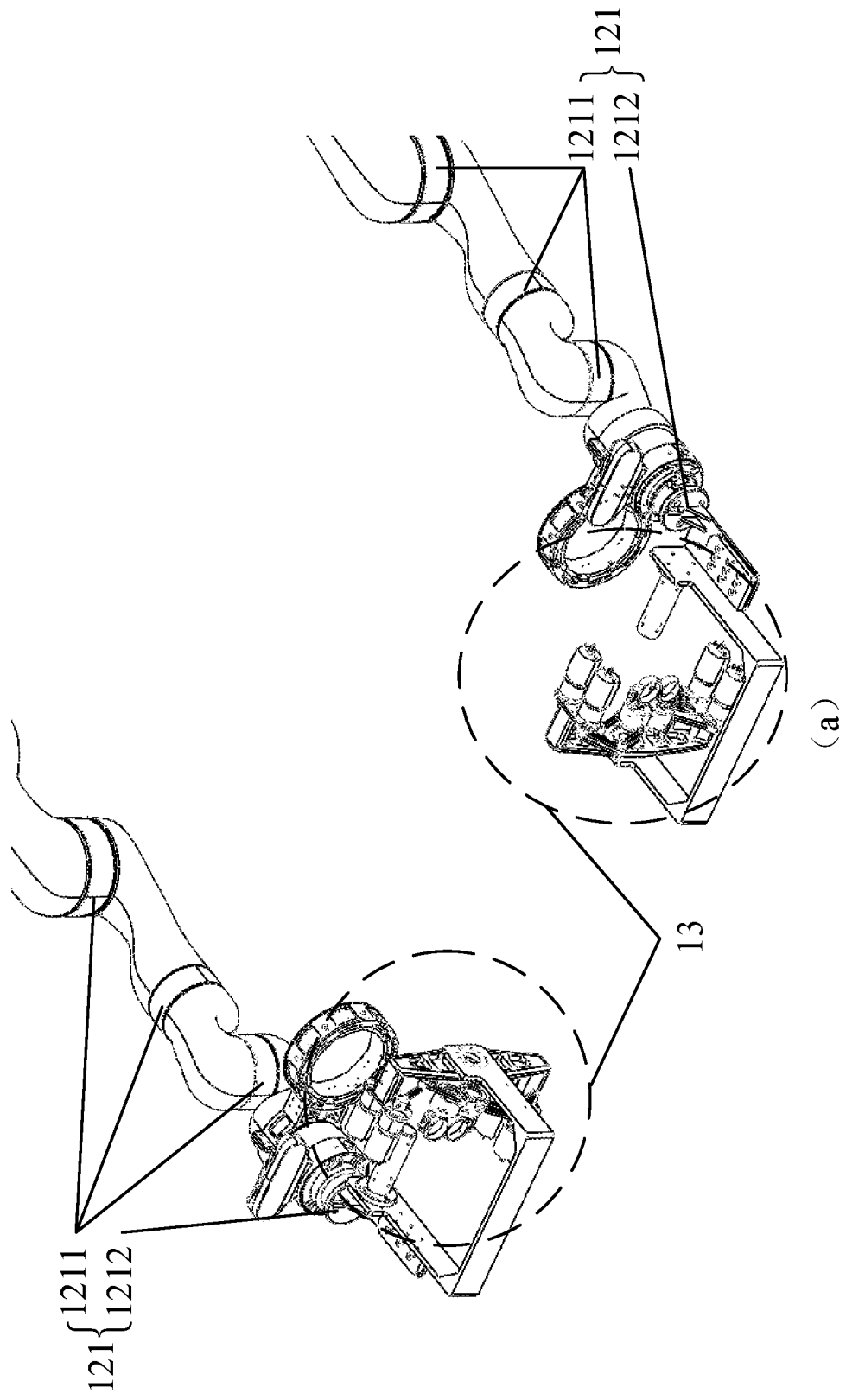
FIG. 9 is a schematic partial diagram of a secondary-end operation platform according to an exemplary embodiment of this application.
Figure 10:
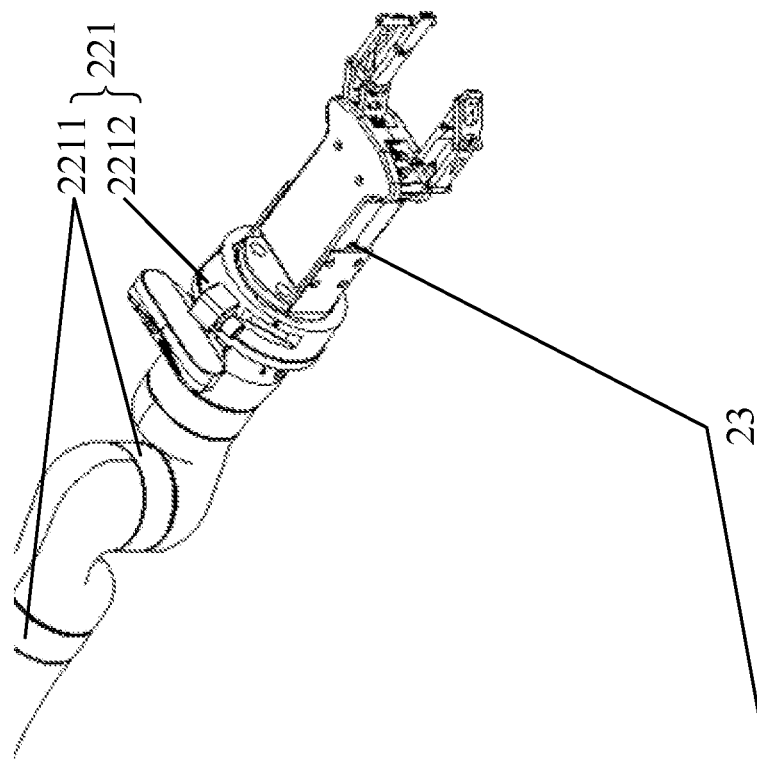
FIG. 10 is a schematic partial diagram of a secondary-end operation platform according to an exemplary embodiment of this application.
Figure 10:
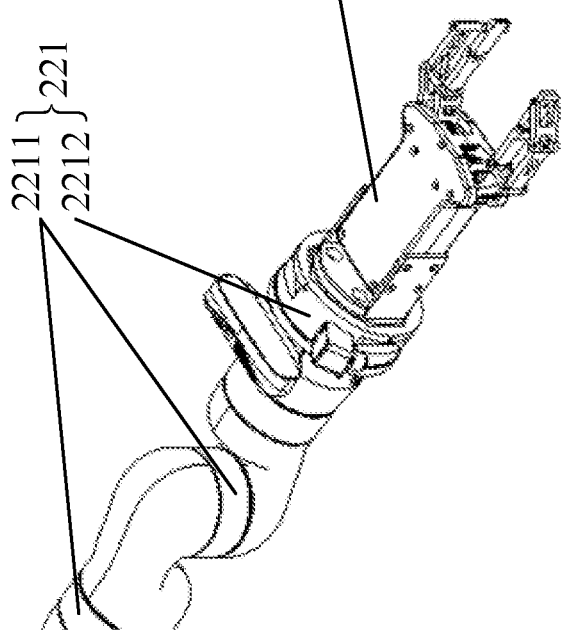

Schematically, as shown in FIG. 9 and FIG. 10, in the bilateral teleoperation system 100 provided in this embodiment of this application, a primary-end torque sensor 121 connected to a first controller is arranged on a primary-end mechanical arm 12; and/or, a secondary-end torque sensor 221 connected to a second controller is arranged on a secondary-end mechanical arm 22.

That is, one or both of the primary-end torque sensor 121 and the secondary-end torque sensor 221 may be arranged. A torque sensor is configured to perceive torque information of a mechanical part; and convert the torque information into an electrical signal and transfer the electrical signal to a corresponding controller.

Schematically, according to specific structures of the mechanical arms, the primary-end torque sensor 121 and the secondary-end torque sensor 221 involved in the embodiments of this application may be arranged on joints and/or tail ends of the mechanical arms. That is, the primary-end torque sensor 121 and the secondary-end torque sensor 221 may perceive torque information of the joints and/or tail ends of the primary-end mechanical arm 12 and the secondary-end mechanical arm 22. Specifically, a torque sensor arranged on a joint may perceive conditions of forces applied to the joint, including but not limited to torque sizes and force directions; and a torque sensor arranged on a tail end may perceive conditions of forces applied to the tail end, including but not limited to torque sizes and force direction of the directional forces.

Schematically, in the bilateral teleoperation system 100 provided in this embodiment of this application, the primary-end torque sensor 121 includes at least one of a first torque sensor 1211 and a second torque sensor 1212; and/or, the secondary-end torque sensor 221 includes at least one of a third torque sensor 2211 and a fourth torque sensor 2212.

The first torque sensor 1211 is arranged on a joint of the primary-end mechanical arm 12, and the second torque sensor 1212 is arranged on the tail end of the primary-end mechanical arm 12; and the third torque sensor 2211 is arranged on a joint of the secondary-end mechanical arm 22, and the fourth torque sensor 2212 is arranged on a tail end of the secondary-end mechanical arm 22.

Schematically, the second torque sensor 1212 and/or the fourth torque sensor 2212 is a six-dimensional force sensor. The six-dimensional torque sensor is characterized by high sensitivity, good rigidity, and small inter-dimensional coupling, and has a mechanical overload protection function.

Because the torque sensors are arranged in different positions, the torque sensors play different roles for the primary-end mechanical arm 12 and the secondary-end mechanical arm 22, which are specifically as follows:

1. The primary-end torque sensor 121 is arranged on the primary-end mechanical arm 12.

Schematically, as shown in FIG. 9, in the bilateral teleoperation system 100 provided in this embodiment of this application, a primary-end torque sensor 121 connected to a first controller is arranged on a primary-end mechanical arm 12; the first controller is configured to collect arm motion information of the primary-end mechanical arm 12, and the second controller is configured to receive the arm motion information of the primary-end mechanical arm 12.

The primary-end torque sensor 121 is configured to perceive the arm motion information of the primary-end mechanical arm 12, where the arm motion information of the primary-end mechanical arm 12 includes but not limited to at least one of joint motion information and arm tail end motion information. Schematically, the quantity, types, and arrangement positions of primary-end torque sensors 121 may be set according to actual needs, which is not limited in this application.

The first controller collects the arm motion information of the primary-end mechanical arm 12 through the primary-end torque sensor 121, and through communicative connection between the first controller and the second controller, the second controller controls the secondary-end mechanical arm 22 to perform arm motion corresponding to the arm motion information. Schematically, after perceiving the arm motion information of the primary-end mechanical arm 12, the primary-end torque sensor 121 transfers the arm motion information to the first controller, and the first controller transmits the arm motion information to the second controller, or generates an arm control instruction according to the arm motion information and then transmits the arm control instruction to the second controller. Subsequently, the second controller controls the secondary-end mechanical arm 22 according to parameter information in the arm control instruction to perform arm motion corresponding to the arm motion information.

Additionally, after receiving the torque information of the arm motion perceived by the primary-end torque sensor 121, the first controller may further predict a motion trend of the primary-end mechanical arm 12 according to the torque information of the arm motion, to obtain prediction information of the arm motion trend, and transmit the prediction information of the arm motion trend to the second controller, so that the primary-end operation platform 10 controls the secondary-end mechanical arm 22 more compliantly, to avoid occurrence of the stuck situation as much as possible. The part of content is specifically described below.

In actual application, one or more primary-end torque sensors 121 may be arranged. Schematically, in the bilateral teleoperation system 100 provided in this embodiment of this application, the primary-end torque sensor 121 includes at least one of a first torque sensor 1211 and a second torque sensor 1212.

The first torque sensor 1211 is arranged on a joint of the primary-end mechanical arm 12, and the second torque sensor 1212 is arranged on the tail end of the primary-end mechanical arm 12.

Schematically, the first torque sensor 1211 is configured to perceive motion information of each joint of the primary-end mechanical arm 12, and the second torque sensor 1212 is configured to perceive motion information of the tail end of the primary-end mechanical arm 12. Schematically, the motion information of each joint of the primary-end mechanical arm 12 includes at least one of a motion direction, a motion distance and a stop position of each joint of the primary-end mechanical arm 12, and the motion information of the tail end of the primary-end mechanical arm 12 includes at least one of a motion direction, a motion distance and a stop position of the tail end of the primary-end mechanical arm 12.

Types of the first torque sensor 1211 and the second torque sensor 1212 may be selected according to an actual situation. Schematically, the first torque sensor 1211 is a joint torque sensor. Schematically, the second torque sensor 1212 is a six-dimensional force sensor.

An example in which the primary-end mechanical arm 12 is a mechanical arm with seven degrees of freedom is used. The primary-end torque sensor 121 includes 6 first torque sensors 1211 and one second torque sensor 1212. The 6 first torque sensors 1211 are configured to perceive motion information of 6 joints of the mechanical arm with seven degrees of freedom, and the second torque sensor 1212 is configured to perceive motion information of the tail end of the mechanical arm with seven degrees of freedom. The first torque sensor 1211 is a joint torque sensor, and the second torque sensor 1212 is a six-dimensional force sensor.

2. The secondary-end torque sensor 221 is arranged on the secondary-end mechanical arm 22.

Schematically, as shown in FIG. 10, in the bilateral teleoperation system 100 provided in this embodiment of this application, a secondary-end torque sensor 221 connected to a second controller is arranged on a secondary-end mechanical arm 22; the second controller is configured to collect arm feedback information of the secondary-end mechanical arm 22, and the first controller is configured to receive the arm feedback information of the secondary-end mechanical arm 22.

The secondary-end torque sensor 221 is configured to perceive the arm motion information of the secondary-end mechanical arm 22, where the arm motion information of the secondary-end mechanical arm 22 includes but not limited to at least one of joint motion information and arm tail end motion information. Schematically, the quantity, types, and arrangement positions of secondary-end torque sensors 221 may be set according to actual needs, which is not limited in this application.

The second controller collects the arm motion information of the secondary-end mechanical arm 22 through the secondary-end torque sensor 221, and through communicative connection between the first controller and the second controller, the first controller controls the primary-end mechanical arm 12 to perform arm motion corresponding to the arm motion information. Schematically, after perceiving the arm feedback information of the secondary-end mechanical arm 22, the secondary-end torque sensor 221 transfers the arm feedback information to the second controller, and the second controller transmits the arm feedback information to the first controller, or generates an arm feedback instruction according to the arm feedback information and then transmits the arm feedback instruction to the first controller. Subsequently, the first controller feeds back arm motion of the secondary-end mechanical arm 22 to the primary-end mechanical arm 12 according to parameter information in the arm feedback information or arm feedback instruction.

In actual application, one or more secondary-end torque sensors 221 may be arranged. Schematically, in the bilateral teleoperation system 100 provided in this embodiment of this application, the secondary-end torque sensor 221 includes at least one of a third torque sensor 2211 and a fourth torque sensor 2212.

The third torque sensor 2211 is arranged on a joint of the secondary-end mechanical arm 22, and the fourth torque sensor 2212 is arranged on a tail end of the secondary-end mechanical arm 22.

Schematically, the third torque sensor 2211 is configured to perceive motion information of each joint of the secondary-end mechanical arm 22, and the fourth torque sensor 2212 is configured to perceive motion information of the tail end of the secondary-end mechanical arm 22. Schematically, the motion information of each joint of the secondary-end mechanical arm 22 includes at least one of a motion direction, a motion distance and a stop position of each joint of the secondary-end mechanical arm 22, and the motion information of the tail end of the secondary-end mechanical arm 22 includes at least one of a motion direction, a motion distance and a stop position of the tail end of the secondary-end mechanical arm 22.

Types of the third torque sensor 2211 and the fourth torque sensor 2212 may be selected according to an actual situation. Schematically, the third torque sensor 2211 is a joint torque sensor. Schematically, the fourth torque sensor 2212 is a six-dimensional force sensor.

An example in which the secondary-end mechanical arm 22 is a mechanical arm with seven degrees of freedom is used. The secondary-end torque sensor 221 includes 6 third torque sensors 2211 and one fourth torque sensor 2212. The 6 third torque sensors 2211 are configured to perceive motion information of 6 joints of the mechanical arm with seven degrees of freedom, and the fourth torque sensor 2212 is configured to perceive motion information of the tail end of the mechanical arm with seven degrees of freedom. The third torque sensor 2211 is a joint torque sensor, and the fourth torque sensor 2212 is a six-dimensional force sensor.

II. Electronic Skin.

Schematically, in the bilateral teleoperation system 100 provided in this embodiment of this application, an electronic skin connected to a first controller is attached to a surface of a primary-end mechanical arm 12; and/or, an electronic skin connected to a second controller is attached to a surface of a secondary-end mechanical arm 22.

The electronic skin is configured to perceive contact information of the primary-end mechanical arm 12 and/or the secondary-end mechanical arm 22 for an external environment. Schematically, the electronic skin includes a skin tactile sensor. The skin tactile sensor works according to a tactile perception principle. Specifically, according to the contact information perceived by the electronic skin, a contact force and geometrical characteristics of a contact surface of the primary-end mechanical arm 12 and/or the secondary-end mechanical arm 22 may be learned. In some embodiments, the skin tactile sensor is a touch sensor.

According to different arrangement positions of the electronic skin, the electronic skin has different functions, which are specifically described as follows:

1. An electronic skin is arranged on the primary-end mechanical arm 12.

Schematically, in the bilateral teleoperation system 100 provided in this embodiment of this application, an electronic skin connected to a first controller is attached to a surface of a primary-end mechanical arm 12; the first controller is further configured to collect contact information of the primary-end mechanical arm 12, and the second controller is further configured to return the contact information of the primary-end mechanical arm 12 to the secondary-end mechanical arm 22.

The electronic skin is configured to perceive contact information of the primary-end mechanical arm 12 for an external environment, and after collecting the foregoing contact information, the first controller transmits the contact information to the second controller through the electronic skin. Specifically, the electronic skin covers the primary-end mechanical arm 12.

Schematically, the contact information refers to information about touch between the primary-end mechanical arm 12 and the external environment, including but not limited to at least one of a contact point, a contact surface, a contact position, the temperature of a contacted object, the shape of the contacted object, the weight of the contacted object, and the roughness of the contacted object. Through the foregoing contact information, the primary-end operation platform 10 may obtain related information of the object with which the primary-end mechanical arm 12 comes into contact, and after obtaining the related information of the object, the second controller feeds back the related information to the secondary-end mechanical arm 22.

2. An electronic skin is arranged on the secondary-end mechanical arm 22.

Schematically, in the bilateral teleoperation system 100 provided in this embodiment of this application, an electronic skin connected to a second controller is attached to a surface of a secondary-end mechanical arm 22; the second controller is further configured to collect contact information of the secondary-end mechanical arm 22, and the first controller is further configured to return the contact information of the secondary-end mechanical arm 22 to the primary-end mechanical arm 12.

The electronic skin is configured to perceive contact information of the secondary-end mechanical arm 22 for an external environment, and after collecting the foregoing contact information, the second controller transmits the contact information to the first controller through the electronic skin. Specifically, the electronic skin covers the secondary-end mechanical arm 22.

Schematically, the contact information refers to information about touch between the secondary-end mechanical arm 22 and the external environment, including but not limited to at least one of a contact point, a contact surface, a contact position, the temperature of a contacted object, the shape of the contacted object, the weight of the contacted object, and the roughness of the contacted object. Through the foregoing contact information, the primary-end operation platform 10 may obtain related information of the object with which the secondary-end mechanical arm 22 comes into contact, thereby determining control over the primary-end mechanical arm 12.

For example, an arm section of the secondary-end mechanical arm 22 touches an obstacle, the electronic skin obtains information indicating that the obstacle is a hard article, the second controller transmits the information to the first controller, and the primary-end operation platform 10 may adjust a motion direction of the primary-end mechanical arm 12 according to the information.

To sum up, in the bilateral teleoperation system 100 provided in this embodiment of this application, based on the premise that the primary-end mechanical arm 12 and the secondary-end mechanical arm 22 have the same number of degrees of freedom, auxiliary apparatuses such as torque sensors and/or electronic skins may be further arranged. Conditions of forces applied to joints and/or tail ends of the mechanical arms may be learned through the torque sensors, and contact forces and geometrical characteristics of contact surfaces of the mechanical arms may be learned through the electronic skin. Based on this, the primary-end mechanical arm 12 and the secondary-end mechanical arm 22 may implement bidirectional interaction between motion information and contact information.

In an actual operation process of the bilateral teleoperation system 100, the primary-end operation platform 10 is usually controlled by the operator. According to changes of specific motion scenarios of the primary-end operation platform 10 and/or the secondary-end operation platform 20, the operator may control the primary-end operation platform 10 in real time. For the secondary-end operation platform 20, the secondary-end operation platform 20 is usually a mechanical apparatus or robot, and therefore has no autonomous thinking and prejudgment capability. As a result, its motion is mechanically replicating motion of the primary-end operation platform 10. In the bilateral teleoperation system 100 provided in this embodiment of this application, the primary-end operation platform 10 has a motion intention prediction function, and may generate a related instruction according to a motion intention obtained by prediction, so that the secondary-end operation platform 20 may obtain the motion intention of the primary-end operation platform 10 in real time, and the primary-end operation platform 10 controls the secondary-end operation platform 20 more compliantly.

Schematically, in the bilateral teleoperation system 100 provided in this embodiment of this application, the primary-end operation platform 10 includes an intention prediction part, and the intention prediction part is configured to collect motion information for predicting a motion intention of the primary-end operation platform 10.

There may be one or more intention prediction parts. Schematically, the intention prediction part is arranged on the primary-end mechanical arm 12; or the intention prediction part is arranged on the mechanical hand control assembly 13.

Additionally, the motion information for predicting a motion intention of the primary-end operation platform 10 includes but not limited to at least one of motion direction information and motion torque information. According to different motion information, the intention prediction part also includes a plurality of different parts. Schematically, the intention prediction part includes at least one of a direction intention prediction part and a torque intention prediction part.

An example in which the operator controls the primary-end operation platform 10 of the bilateral teleoperation system 100 is used below. Discussion is made from two aspects of the direction intention prediction part and the torque intention prediction part:

I. The direction intention prediction part includes an annular tactile sensor 131 connected to the first controller.

Figure 11:
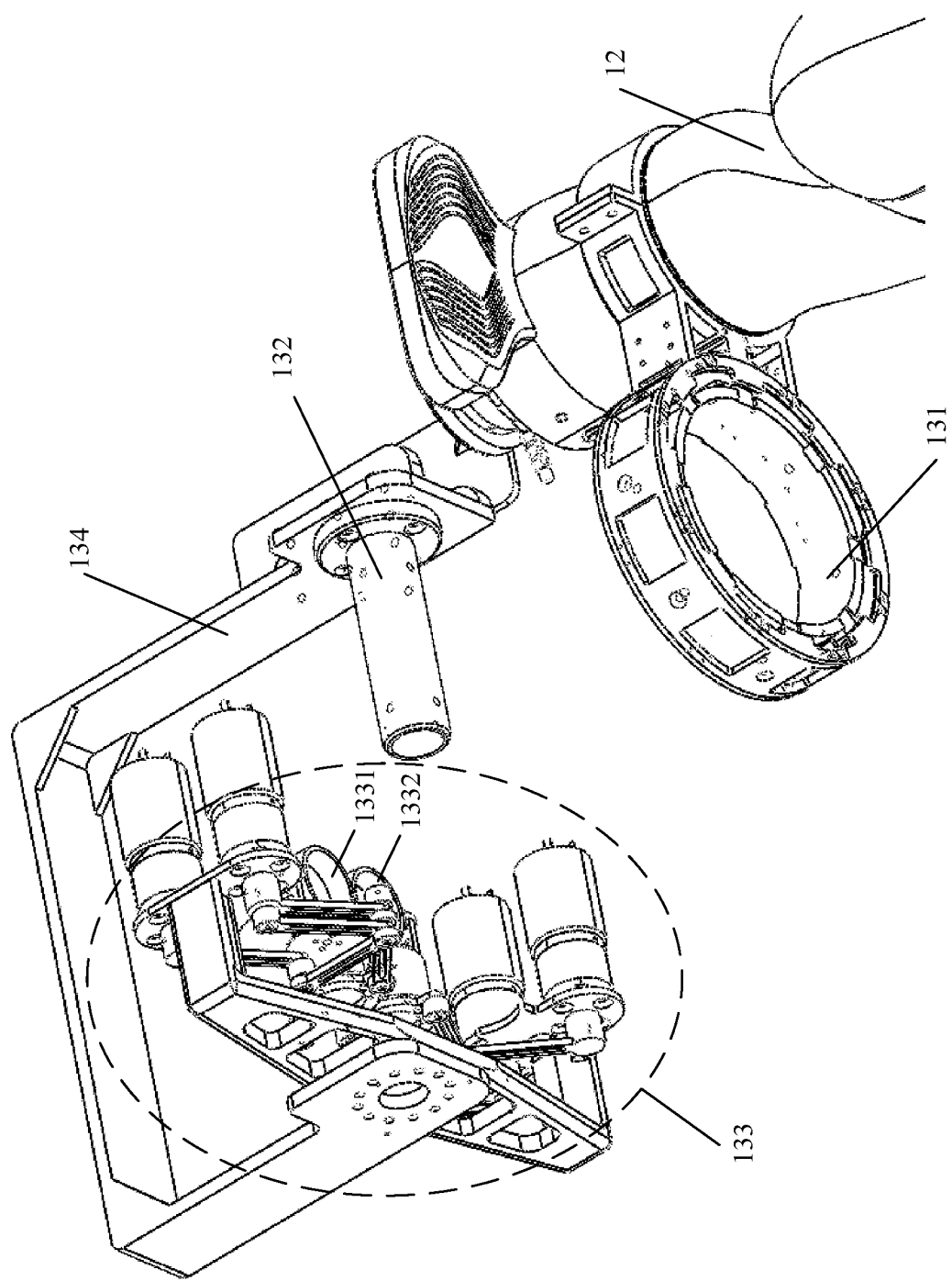
FIG. 11 is a schematic structural diagram of a mechanical hand control assembly according to an exemplary embodiment of this application.
Figure 12:
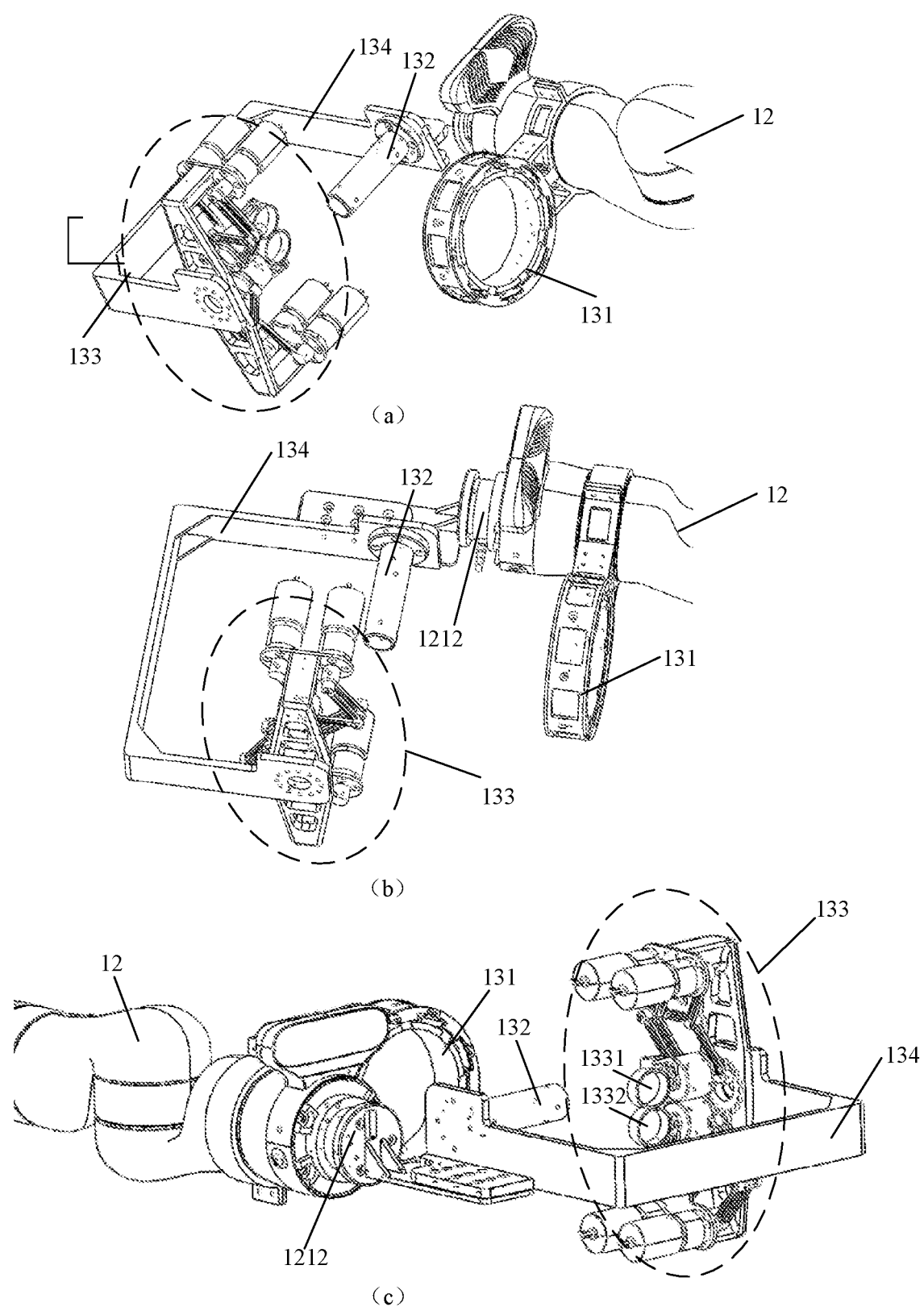
FIG. 12 is a schematic structural diagram of a mechanical hand control assembly according to an exemplary embodiment of this application.

Schematically, as shown in FIG. 11 and FIG. 12, an embodiment of this application provides a structure of a mechanical hand control assembly 13: The mechanical hand control assembly 13 includes at least one of an annular tactile sensor 131, a handle 132 and a multi-finger control apparatus 133.

Schematically, In the bilateral teleoperation system 100 provided in this embodiment of this application, the direction intention prediction part includes an annular tactile sensor 131 connected to the first controller; and the annular tactile sensor 131 is arranged on the tail end of the primary-end mechanical arm 12.

The annular tactile sensor 131 is configured to perceive wrist motion information of the primary-end operation platform 10 and transmit the perceived wrist motion information to the first controller, and the first controller transmits the wrist motion information to the second controller through communicative connection to the second controller, and is configured to control the secondary-end operation platform 20 to perform wrist motion corresponding to the wrist motion information.

Schematically, the wrist motion information includes at least one of a motion direction, a motion speed and a stop position of a wrist of the mechanical hand control assembly 13. An example in which the operator operates the primary-end operation platform 10 is used. The annular tactile sensor 131 is configured to perceive wrist motion information of the operator.

The tactile sensor is a sensor configured to simulate a tactile function in a machine and work based on a tactile perception principle, and the tactile sensor includes but not limited to at least one of a contact sensor, a torque sensor, a pressure sensor and a slippage sensor. Schematically, the annular tactile sensor 131 is configured to perceive at least one of contact information and torque information of the wrist of the primary-end operation platform 10. The torque information includes but not limited to a force size and a force direction of the wrist. Schematically, through the annular tactile sensor 131, the first controller may learn man-machine interaction information of the operator and the primary-end operation platform 10, including but not limited to at least one of a motion direction and a condition of a force applied to a contact surface. For example, the wrist of the operator passes through the annular tactile sensor 131, the operator moves the wrist toward the right front, the annular tactile sensor 131 may perceive a situation that the wrist of the operator moves toward the right front, including but not limited to a force size and a force direction.

Based on the premise of ensuring that the annular tactile sensor 131 can perceive the wrist motion information of the primary-end operation platform 10, the structure of the annular tactile sensor 131 may be set according to actual needs.

Figure 13:
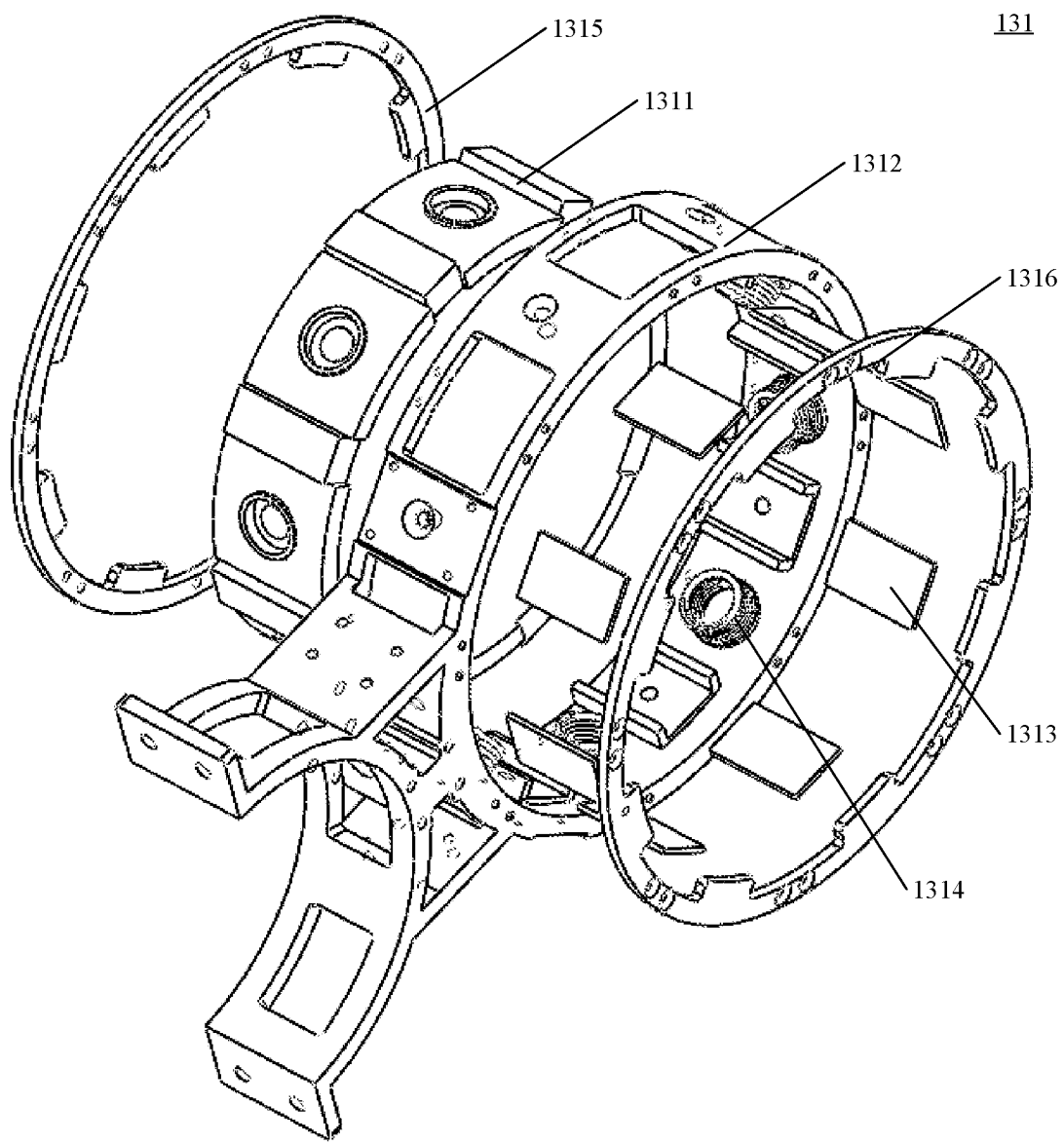
FIG. 13 is a schematic structural diagram of an annular tactile sensor according to an exemplary embodiment of this application.
Figure 14:
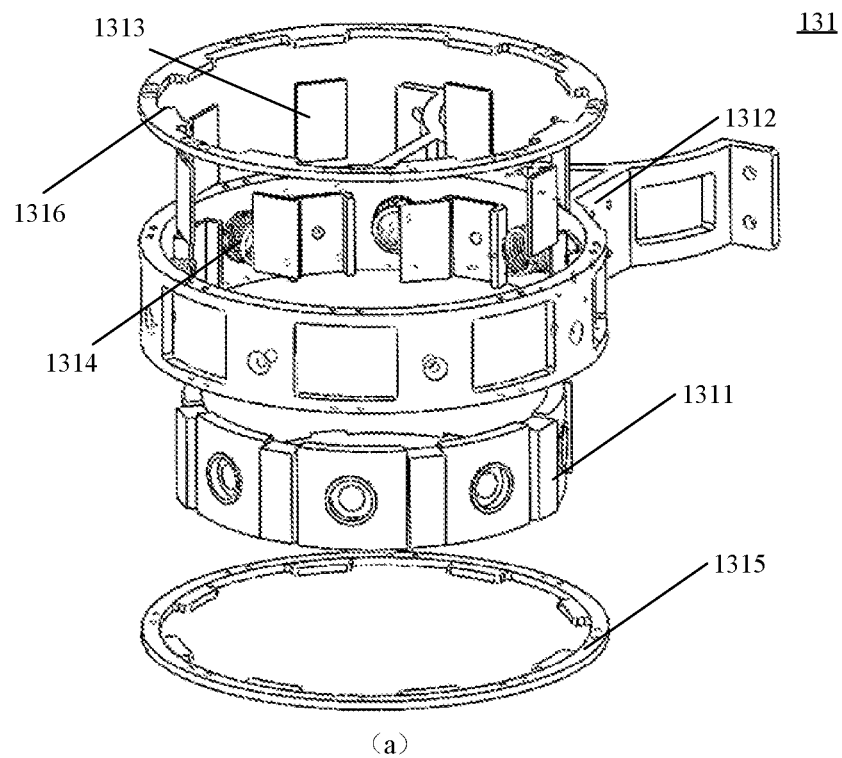
FIG. 14 is a schematic structural diagram of an annular tactile sensor according to an exemplary embodiment of this application.
Figure 14:
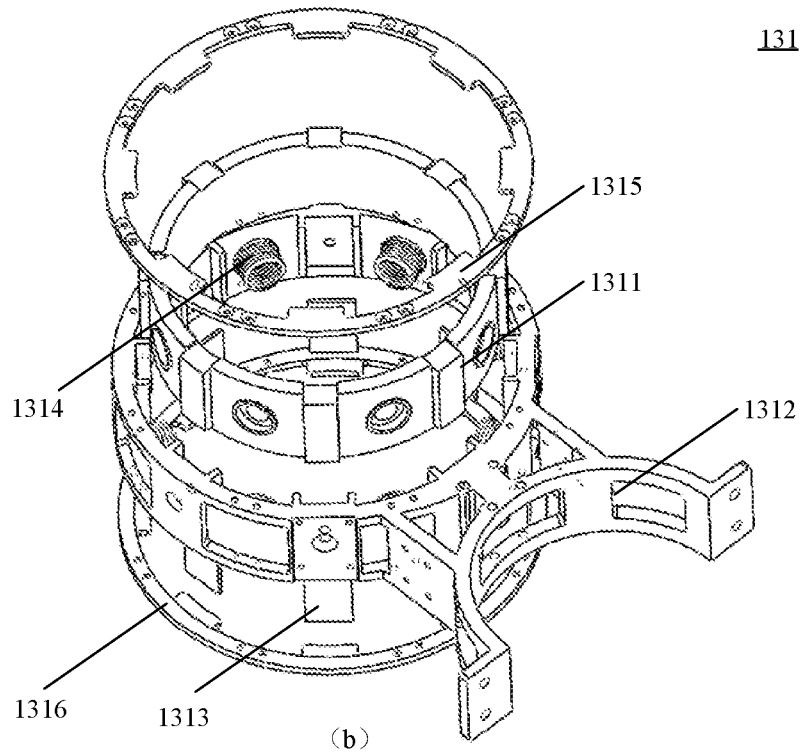

Schematically, as shown in FIG. 13 and FIG. 14, an embodiment of this application provides a structure of an annular tactile sensor 131:

Schematically, the annular tactile sensor 131 includes an inner ring 1311, an outer ring 1312 and at least two tactile sensor chips 1313. The at least two tactile sensor chips 1313 are nested between the inner ring 1311 and the outer ring 1312.

The inner ring 1311 and the outer ring 1312 are configured to limit the tactile sensor chip 1313; the tactile sensor chip 1313 is configured to perceive wrist motion information of the primary-end operation platform 10, and transfer the perceived wrist motion information to the first controller; and after collecting the wrist motion information, the first controller may learn specific wrist motion of the primary-end operation platform 10.

An example in which the operator controls the primary-end operation platform 10 of the bilateral teleoperation system 100 is used. A wrist of the operator is located in the inner ring 1311. In an operation process, the wrist of the operator touches the tactile sensor chip 1313 nested between the inner ring 1311 and the outer ring 1312, and the tactile sensor chip 1313 perceives the wrist motion information according to the contact.

Schematically, the quantity of tactile sensor chips 1313 may be set according to actual needs, and the at least two tactile sensor chips 1313 are cooperatively used, so as to obtain relatively accurate wrist motion information. Schematically, as shown in FIG. 13 and FIG. 14, the annular tactile sensor 131 includes eight tactile sensor chips 1313.

In the use process of the annular tactile sensor 131, when the tactile sensor chip 1313 is impacted by a relatively large force, the position of the tactile sensor chip 1313 is offset, causing the perceived motion information to have an error. Schematically, as shown in FIG. 13 and FIG. 14, in the bilateral teleoperation system 100 provided in this embodiment of this application, the annular tactile sensor 131 further includes at least two elastic members 1314.

Schematically, the at least two elastic members 1314 are nested between the inner ring 1311 and the outer ring 1312, and the at least two elastic members 1314 and the at least two tactile sensor chips 1313 are distributed at intervals.

The elastic member 1314 plays a buffering role, so that the tactile sensor chip 1313 can return to zero as soon as possible, thereby reducing the measurement error of the tactile sensor chip 1313, and obtaining motion information in higher precision in cooperation with the tactile sensor chip 1313.

Schematically, the quantity of elastic members 1314 may be set according to actual needs, and the distributing the elastic members 1314 and the tactile sensor chips 1313 at intervals plays a role in protecting the tactile sensor chips 1313. Schematically, as shown in FIG. 13 and FIG. 14, the annular tactile sensor 131 includes eight tactile sensor chips 1313 and eight elastic members 1314, and the eight tactile sensor chips 1313 and the eight elastic members 1314 are sequentially distributed at intervals. Schematically, the elastic member 1314 is made of an elastic material, and is, for example, a spring.

To make the inner ring 1311 not separate from the outer ring 1312, and ensure a limit function of the two rings on the tactile sensor chips 1313, schematically, as shown in FIG. 13 and FIG. 14, in the bilateral teleoperation system 100 provided in this embodiment of this application, the annular tactile sensor 131 further includes a first retaining ring 1315 and a second retaining ring 1316. The first retaining ring 1315 is fixedly connected to the inner ring 1311, and the second retaining ring 1316 is fixedly connected to the outer ring 1312.

Correspondingly, to enable the second controller to control the secondary-end operation platform 20 to respond to the wrist motion corresponding to the wrist motion information, schematically, in the bilateral teleoperation system 100 provided in this embodiment of this application, the secondary-end mechanical hand 23 is connected to the secondary-end mechanical arm 22 through a rotation apparatus, and the rotation apparatus is configured to control rotation motion of the secondary-end mechanical hand 23. For example, the tail end of the secondary-end mechanical arm 22 is connected to the secondary-end mechanical hand 23 through a rotary shaft, and the rotary shaft is configured to control rotation motion of the secondary-end mechanical hand 23. Schematically, the specific structure of the rotation apparatus may be set according to actual needs, which is not limited in this application.

Additionally, the annular tactile sensor 131 further has a function of predicting a motion intention of the primary-end mechanical arm 12. Specifically, the first controller collects the wrist motion information of the primary-end mechanical arm 12 through the annular tactile sensor 131, and transmits the wrist motion information or wrist control instruction to the second controller through communicative connection; and subsequently, the second controller controls the secondary-end mechanical arm 22 according to the wrist motion information or wrist control instruction to perform motion. The wrist control instruction is generated by the first controller by performing intention prediction in a motion direction based on the wrist motion information.

That is, through the annular tactile sensor 131, the first controller may obtain motion information for predicting a motion intention of the primary-end mechanical arm 12, the motion information includes at least a motion direction of the primary-end mechanical arm 12, and through the motion information, the secondary-end mechanical arm 22 may learn a motion trend of the primary-end mechanical arm 12, thereby controlling the secondary-end mechanical arm 22 more compliantly. Specifically, because the annular tactile sensor 131 is an annular structure, the first controller may collect motion information on at least two positions through functions of the at least two tactile sensor chips 1313. An example in which the motion information includes a motion direction of the primary-end mechanical arm 12 is used. The first controller may collect related information of motion directions on at least two positions, and according to the motion directions on the at least two positions, the first controller or the second controller may learn intention prediction in motion directions of the primary-end mechanical arm 12.

To sum up, in the bilateral teleoperation system 100 provided in this embodiment of this application, through the annular tactile sensor 131 included by the mechanical hand control assembly 13, the primary-end operation platform 10 may collect wrist motion information of the mechanical hand control assembly 13, learn man-machine interaction information of the operator and the primary-end operation platform 10, and collect a condition of a force applied to a contact surface of man-machine interaction. Moreover, the annular tactile sensor 131 further has a function of predicting a motion intention, and in particular, and can be used in cooperation with the primary-end torque sensor 121, to provide a motion intention of the primary-end operation platform 10 to the secondary-end operation platform 20, so that the secondary-end operation platform 20 is controlled more compliantly.

II. The torque intention prediction part includes a primary-end torque sensor 121 connected to the first controller Schematically, as shown in FIG. 9, In the bilateral teleoperation system 100 provided in this embodiment of this application, the torque intention prediction part includes a primary-end torque sensor 121 connected to the first controller; and the primary-end torque sensor 121 is arranged on the primary-end mechanical arm 12.

The primary-end torque sensor 121 is configured to perceive the arm motion information of the primary-end mechanical arm 12, where the arm motion information of the primary-end mechanical arm 12 includes but not limited to at least one of joint motion information and arm tail end motion information. Schematically, when the primary-end torque sensor 121 is configured to predict a motion intention of the primary-end operation platform 10, the primary-end torque sensor 121 may obtain at least torque information related to motion of the primary-end mechanical arm 12, where the torque information includes but not limited to at least one of a size, a direction and a distance of a force of motion of a joint and/or arm tail end of the primary-end mechanical arm 12. Schematically, the quantity, types, and arrangement positions of primary-end torque sensors 121 may be set according to actual needs, which is not limited in this application.

In actual application, one or more primary-end torque sensors 121 may be arranged. Schematically, in the bilateral teleoperation system 100 provided in this embodiment of this application, the primary-end torque sensor 121 includes at least one of a first torque sensor 1211 and a second torque sensor 1212.

The first torque sensor 1211 is arranged on a joint of the primary-end mechanical arm 12, and the second torque sensor 1212 is arranged on the tail end of the primary-end mechanical arm 12.

Schematically, the first torque sensor 1211 is configured to perceive motion information of each joint of the primary-end mechanical arm 12, and the second torque sensor 1212 is configured to perceive motion information of the tail end of the primary-end mechanical arm 12.

According to the foregoing content, the primary-end torque sensor 121 has a function of predicting a motion intention of the primary-end mechanical arm 12. Specifically, the primary-end torque sensor 121 may be individually used, so as to obtain the arm motion information of the primary-end mechanical arm 12. Moreover, the primary-end torque sensor 121 may be further used in cooperates with the annular tactile sensor 131, so as to improve prediction accuracy of a motion intention of the primary-end mechanical arm 12.

Specifically, the annular tactile sensor 131 transfers the perceived wrist motion information to the first controller, and the primary-end torque sensor 121 transfers the perceived arm motion information to the first controller. The wrist motion information includes information about a motion direction, and the arm motion information includes information about a motion torque. The first controller prejudges a motion intention of the primary-end operation platform 10 with reference to specific motion information of a wrist and an arm. That is, through cooperative use of the primary-end torque sensor 121 and the annular tactile sensor 131, a motion intention of the primary-end operation platform 10 is predicted, and through communicative connection between the first controller and the second controller, the primary-end operation platform 10 may control the secondary-end mechanical arm 22 in a low delay.

For example, the wrist motion information includes moving by 0.5 meters toward the left front, and the arm motion information includes applying a movement force to the left side. According to the foregoing two pieces of motion information, it may be prejudged that the primary-end operation platform 10 has an intention to move leftward. According to the motion intention, the secondary-end mechanical arm 22 is controlled to move by 0.5 meters toward the left front and meanwhile keeps a trend to move toward the right front motion with a force of the same size.

Based on the premise that the torque intention prediction part includes the primary-end torque sensor 121, to improve accuracy of predicting a motion intention of the primary-end operation platform 10, the bilateral teleoperation system 100 provided in this embodiment of this application further includes the handle 132.

Schematically, as shown in FIG. 11 and FIG. 12, in the bilateral teleoperation system 100 provided in this embodiment of this application, the torque intention prediction part further includes the handle 132. The handle 132 is fixedly arranged on the tail end of the primary-end mechanical arm 14, and the handle 132 is configured to transfer arm motion information of the primary-end mechanical arm 12 to the primary-end torque sensor 121.

An example in which the operator controls the primary-end operation platform 10 of the bilateral teleoperation system 100 is used. Control personnel holds the handle 132 and applies a force of a specific size, so that the primary-end mechanical arm 12 may perform corresponding motion under driving of the handle 132. Based on this motion, the primary-end torque sensor 121 arranged on the joint and the tail end of the primary-end mechanical arm 12 may collect corresponding torque information, and transfer the torque information to the first controller, and the first controller may prejudge torque information of a motion intention of the primary-end mechanical arm 12 according to the torque information.

To sum up, in the bilateral teleoperation system 100 provided in this embodiment of this application, through the primary-end torque sensor 121, the primary-end operation platform 10 may collect the arm motion information of the primary-end mechanical arm 12, and learn the torque information of the primary-end mechanical arm 12. Additionally, the handle 132 included by the mechanical hand control assembly 13 may transfer the arm motion information of the primary-end mechanical arm 12 to the primary-end torque sensor 121, so that the primary-end torque sensor 121 learns more accurate torque information, thereby obtaining a more accurate prediction result of a motion intention of the primary-end mechanical arm 12, and the primary-end operation platform 10 controls the secondary-end operation platform 20 more compliantly.

Additionally, schematically, as shown in FIG. 11 and FIG. 12, in the bilateral teleoperation system 100 provided in this embodiment of this application, the mechanical hand control assembly 13 further includes a multi-finger control apparatus 133 connected to the first controller; the multi-finger control apparatus 133 is fixedly connected to the tail end of the primary-end mechanical arm 12.

The multi-finger control apparatus 133 is configured to perceive multi-finger motion information of the primary-end operation platform 10 and transmit the perceived multi-finger motion information to the first controller, and the first controller transmits the multi-finger motion information to the second controller through communicative connection to the second controller, and is configured to control the secondary-end operation platform 20 to perform multi-finger motion corresponding to the multi-finger motion information. Schematically, the multi-finger motion information includes at least one of a motion direction, a motion speed and a stop position of multiple fingers of the mechanical hand control assembly 13.

Schematically, the multi-finger motion information includes at least one of a motion direction, a motion speed and a stop position of multiple fingers of the mechanical hand control assembly 13. An example in which the operator operates the primary-end operation platform 10 is used. The multi-finger control apparatus 133 is configured to perceive multi-finger motion information of the operator.

The multi-finger control apparatus 133 has a function of collecting multi-finger motion information of the mechanical hand control assembly 13. Schematically, the multi-finger motion information collected by the multi-finger control apparatus 133 includes at least motion information of a finger of the mechanical hand control assembly 13.

Because the multi-finger motion information may include motion information of a plurality of fingers, the structure of the multi-finger control apparatus 133 has a plurality of manners. Schematically, as shown in FIG. 11 and FIG. 12, in the bilateral teleoperation system 100 provided in this embodiment of this application, the multi-finger control apparatus 133 includes a first finger thimble 1331 and a second finger thimble 1332; the first finger thimble 1331 and the second finger thimble 1332 are arranged on the tail end of the primary-end mechanical arm 12.

The first finger thimble 1331 is configured to perceive motion information of a first finger of the mechanical hand control assembly 13, the motion information including at least one of a motion direction, a motion speed and a stop position of the first finger; the second finger thimble 1332 is configured to perceive motion information of a second finger of the mechanical hand control assembly 13, the motion information including at least one of a motion direction, a motion speed and a stop position of the second finger.

Schematically, the first finger thimble 1331 and the second finger thimble 1332 are fixedly arranged on the tail end of the primary-end mechanical arm 12; or the first finger thimble 1331 and the second finger thimble 1332 are movably arranged on the tail end of the primary-end mechanical arm 12.

To obtain motion information of more fingers of the mechanical hand control assembly 13, schematically, in the bilateral teleoperation system 100 provided in this embodiment of this application, the mechanical hand control assembly 13 further includes the handle 132 and an assembly supporting member 134; the assembly supporting member 134 is a U-shaped structure; a first end of the assembly supporting member 134 is fixed to the tail end of the primary-end mechanical arm 12, the handle 132 is fixedly arranged on the first end of the assembly supporting member 134, and the multi-finger control apparatus 133 is fixedly arranged on a second end of the assembly supporting member 134.

The assembly supporting member 134 is configured to fix the multi-finger control apparatus 133 and the handle 132; in addition to being configured to perceive motion information of the remaining fingers of the mechanical hand control assembly 13, the handle 132 further has a function of controlling the primary-end mechanical arm 12.

The multi-finger control apparatus 133 including the first finger thimble 1331 and the second finger thimble 1332 is used as an example. A thumb of the operator passes through the first finger thimble 1331, an index finger passes through the second finger thimble 1332, and the remaining three fingers hold the handle 132. According to this, the first controller may respectively collect motion information of the thumb, the index finger and the remaining three fingers of the operator. Moreover, because the handle 132 is fixed to the tail end of the primary-end mechanical arm 12 through the assembly supporting member 134, the first controller may further collect information such as a movement force applied by the remaining three fingers of the operator to the handle 132 and a motion direction of the force.

Additionally, the multi-finger control apparatus 133 further has an information feedback function. Schematically, as shown in FIG. 11 and FIG. 12, in the bilateral teleoperation system 100 provided in this embodiment of this application, the mechanical hand control assembly 13 is configured to return contact information of the secondary-end mechanical hand 23; the second controller is further configured to collect the contact information of the secondary-end mechanical hand 23, and the first controller is further configured to return the contact information of the secondary-end mechanical hand 23.

The contact information refers to information about contact between the secondary-end mechanical hand 23 and the external environment, including but not limited to at least one of a contact point, a contact surface, a contact position, the temperature of a contacted object, the shape of the contacted object, the weight of the contacted object, and the roughness of the contacted object. Through the foregoing contact information, the primary-end operation platform 10 may obtain related information of the object with which the secondary-end mechanical hand 23 comes into contact, thereby accurately determining and controlling grip, placement, movement and other motion of the secondary-end mechanical hand 23.

Schematically, an embodiment of this application provides an information feedback manner of the multi-finger control apparatus 133. Schematically, in the bilateral teleoperation system 100 provided in this embodiment of this application, a fingertip tactile sensor connected to the second controller is arranged on the secondary-end mechanical hand 23, and a tactile feedback apparatus is arranged on the multi-finger control apparatus 133.

The fingertip tactile sensor is configured to obtain fingertip contact information of the secondary-end mechanical hand 23, and the tactile feedback apparatus is configured to generate fingertip stimulus feedback of the mechanical hand control assembly 13. That is, through the fingertip tactile sensor, the second controller may learn a condition of a force applied to a contact surface between the secondary-end mechanical hand 23 and an external environment and/or object.

Schematically, the second controller collects fingertip contact information of the secondary-end mechanical hand 23 through the fingertip tactile sensor, the first controller obtains the contact information through communicative connection, and the tactile feedback apparatus generates corresponding fingertip stimulus feedback according to the contact information. For example, two fingertips of the secondary-end mechanical hand 23 pinch a high-temperature steel ball, and according to the high temperature and the shape of the steel ball perceived by the fingertip tactile sensor, stimulus feedback that the mechanical hand control assembly 13 may feel is that the fingertips are burning hot and the touch feeling is smooth.

According to the foregoing content, the operator controlling the primary-end operation platform 10 is used as an example, and the bilateral teleoperation system 100 may perform the following operations:

The arm of the operator passes through the annular tactile sensor 131 on the tail end of the primary-end mechanical arm 12, the thumb and the index finger are buckled into the first finger thimble 1331 and the second finger thimble 1332, and the remaining three fingers hold the handle 132. Based on this, a motion intention of the primary-end mechanical arm 12 may be predicted according to a condition of an applied force through the annular tactile sensor 131, motion information of the two fingers of the mechanical hand control assembly 13 may be perceived through the first finger thimble 1331 and the second finger thimble 1332, to implement control over the secondary-end mechanical hand 23 and force perception; and motion information of the remaining fingers of the mechanical hand control assembly 13 may be perceived through the handle 132, and force information of the second torque sensor 1212 on the tail end of the primary-end mechanical arm 12 is fed back to the first controller while providing the hand with a stable supporting point.

To sum up, in the bilateral teleoperation system 100 provided in this embodiment of this application, through the multi-finger control apparatus 133 included by the mechanical hand control assembly 13, the primary-end operation platform 10 may collect multi-finger motion information of the mechanical hand control assembly 13, so as to control multi-finger motion of the secondary-end mechanical hand 23. Moreover, the multi-finger control apparatus 133 further has an information feedback function, and is configured to return contact information of the secondary-end mechanical hand 23.

In an actual operation, because a distance between the primary-end operation platform 10 and the secondary-end operation platform 20 is usually relatively large, the primary-end operation platform 10 needs to learn information about the external environment of the secondary-end operation platform 20.

Schematically, as shown in FIG. 7 and FIG. 8, in the bilateral teleoperation system 100 provided in this embodiment of this application, the secondary-end operation platform 20 further includes a binocular vision camera 25 connected to the second controller; the binocular vision camera 25 is arranged on the top of the secondary-end support 21; and the second controller is further configured to collect vision information of the binocular vision camera 25, and the second controller is further configured to return the vision information of the binocular vision camera 25.

The binocular vision camera 25 is configured to perceive vision feedback information of the secondary-end operation platform 20. Schematically, the vision feedback information includes external image information of the secondary-end operation platform 20 perceived by the binocular vision camera 25, and the external image information of the secondary-end operation platform 20 includes but not limited to at least one of a related image, a video, and an audio of an external environment in which the secondary-end operation platform 20 is located. Specifically, the second controller collects the vision feedback information of the secondary-end operation platform 20 through the binocular vision camera 25, and transmits the vision feedback information to the first controller.

Figure 15:
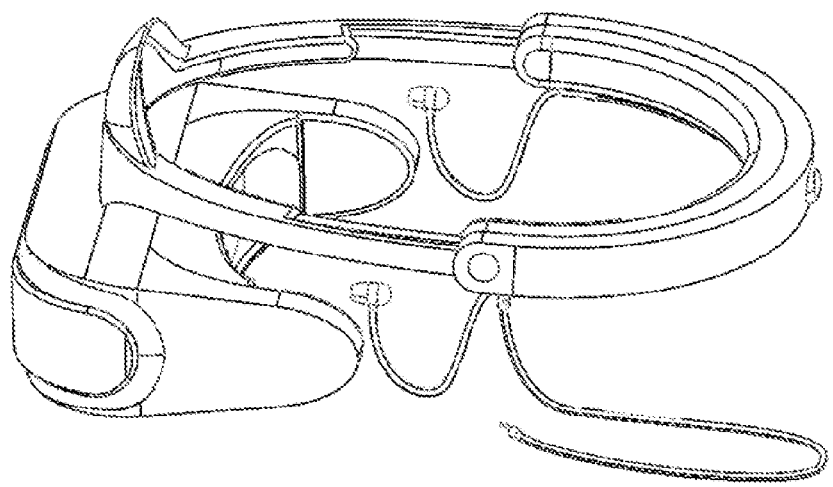
FIG. 15 is a schematic diagram of virtual glasses according to an exemplary embodiment of this application.

To enable the operator of the primary-end operation platform 10 to obtain the foregoing vision feedback information in real time, schematically, as shown in FIG. 15, in the bilateral teleoperation system 100 provided in this embodiment of this application, the primary-end operation platform 10 further includes virtual glasses 15 connected to the first controller, and the virtual glasses 15 are configured to be worn by the operator. Schematically, the type of the virtual glasses 15 may be selected according to actual needs, which is not limited in this application.

To sum up, in the bilateral teleoperation system 100 provided in this embodiment of this application, through the binocular vision camera 25 on the secondary-end support 21, the primary-end operation platform 10 may obtain the vision feedback information of the secondary-end operation platform 20.

According to the foregoing content, in the operation process of the bilateral teleoperation system 100, the secondary-end operation platform 20 may also return corresponding motion information to the primary-end operation platform 10, so that the primary-end operation platform 10 may prejudge a next operation according to the fed-back motion information.

Specifically, the second controller is further configured to collect feedback information of the secondary-end operation platform 20, the first controller is further configured to control the primary-end operation platform 10 to generate a feedback stimulus corresponding to the feedback information or perform feedback motion corresponding to the feedback information.

Schematically, the bilateral teleoperation system 100 provided in this embodiment of this application provides force tactile perception channels in a plurality of modes. Specifically, through the torque sensors, the primary-end mechanical arm 12 and the secondary-end mechanical arm 22 may exchange force feedback information, including at least torque information of joints and/or tail ends of mechanical arms; through the electronic skin, the primary-end mechanical arm 12 and the secondary-end mechanical arm 22 may exchange contact information; through the annular tactile sensor 131, a motion intention of the primary-end mechanical arm 12 may be predicted; through the fingertip tactile sensor and the tactile feedback apparatus, the primary-end operation platform 10 may learn contact information of fingertips of the secondary-end mechanical hand 23 for the outside; through the binocular vision camera 25, the primary-end operation platform 10 may obtain the vision feedback information of the secondary-end operation platform 20.

That is, through the force tactile perception channels in the plurality of modes, the bilateral teleoperation system 100 provided in this embodiment of this application may obtain at least one of geometrical characteristics of the contact force and the contact surface of the secondary-end operation platform 20; a condition of a force applied to a man-machine interaction contact surface between the operator and the primary-end operation platform 10; forces and torques of the tail ends of the primary-end mechanical arm 12 and/or the secondary-end mechanical arm 22 in various directions; conditions of forces applied to internal joints of the primary-end mechanical arm 12 and/or the secondary-end mechanical arm 22; a condition of a force applied to a contact surface between the secondary-end mechanical hand 23 and an object; and external vision feedback information of the secondary-end operation platform 20. Based on the foregoing force tactile perception channels in the plurality of modes, the primary-end operation platform 10 may learn related information of motion and the external environment of the secondary-end operation platform 20, thereby prejudging control over the primary-end operation platform 10, so that the bilateral teleoperation system 100 can form a relatively precise mapping mode. Therefore, the bilateral teleoperation system 100 can complete various teleoperation systems accurately, in real time, and continuously.

Figure 3:
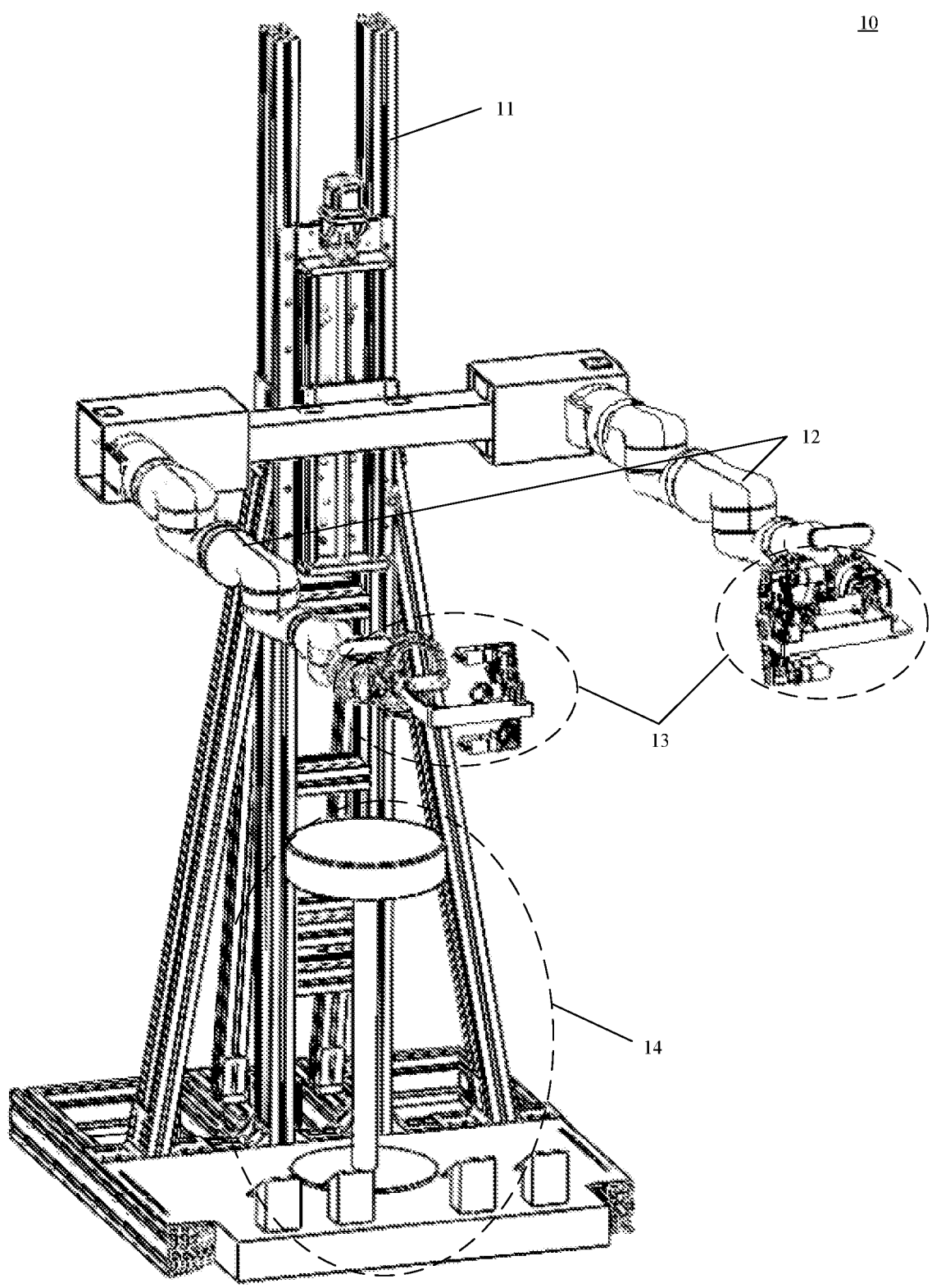
FIG. 3 is a schematic structural diagram of a primary-end operation platform according to an exemplary embodiment of this application.
Figure 4:
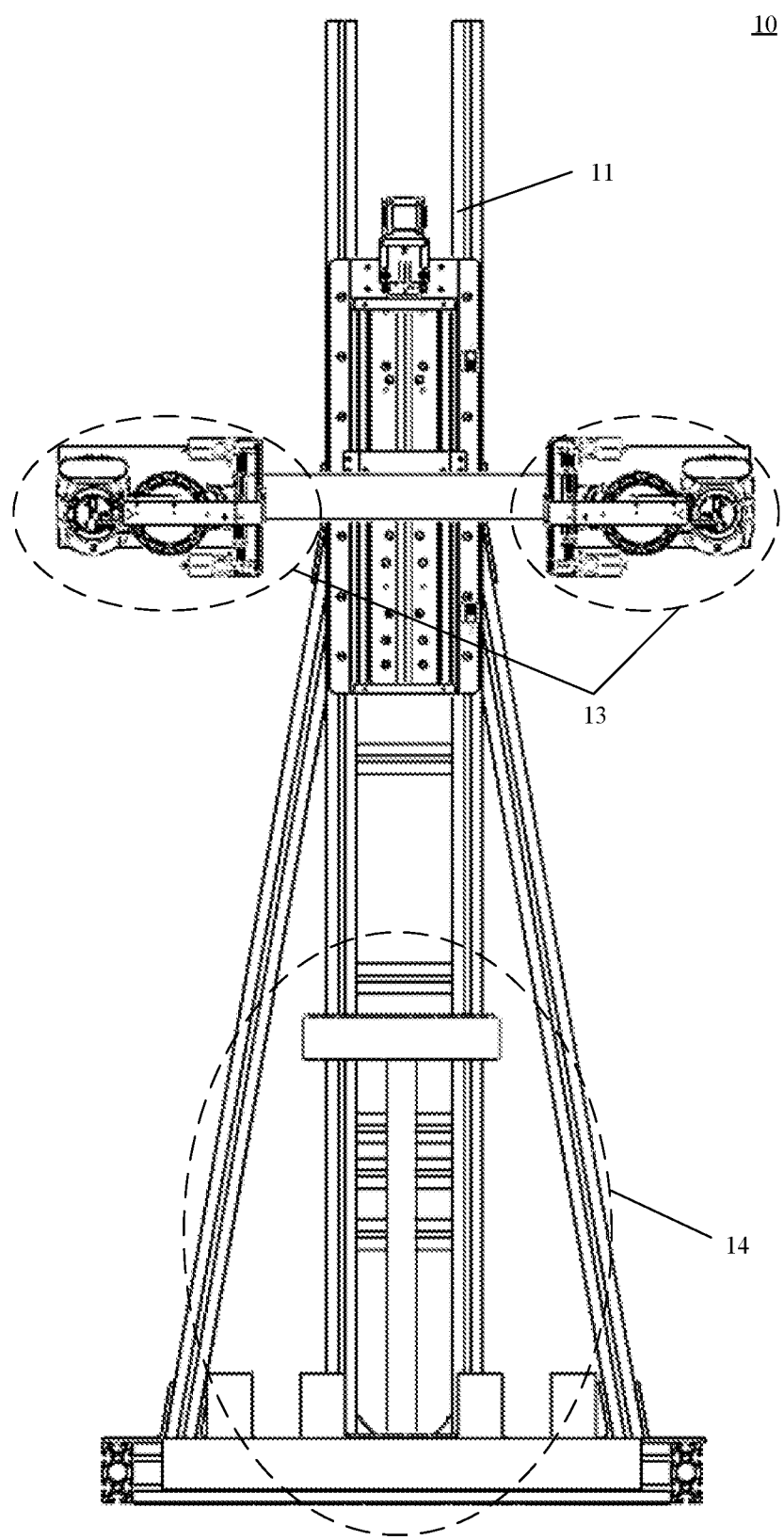
FIG. 4 is a schematic structural diagram of a primary-end operation platform according to an exemplary embodiment of this application.
Figure 5:
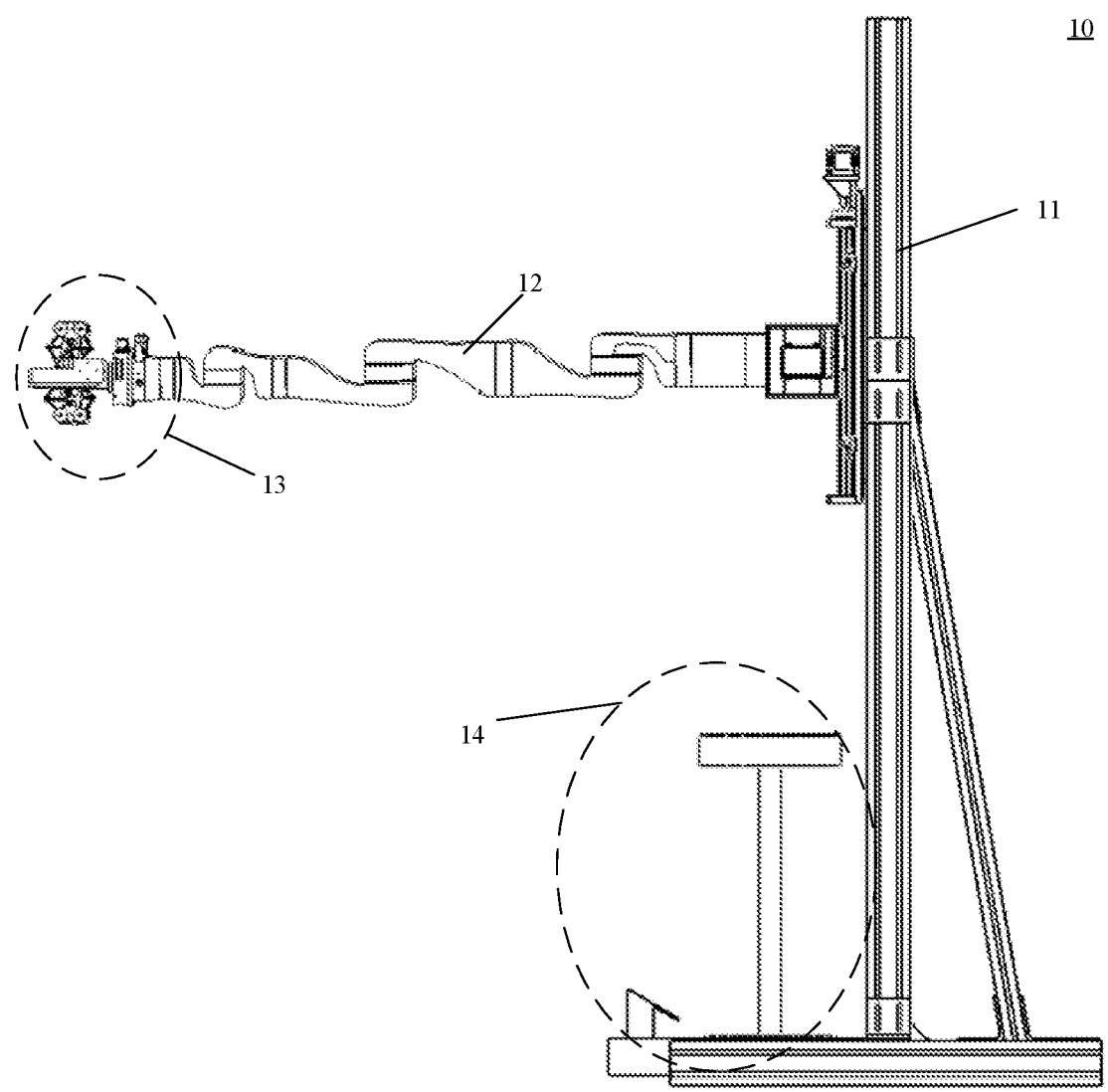
FIG. 5 is a schematic structural diagram of a primary-end operation platform according to an exemplary embodiment of this application.
Figure 6:
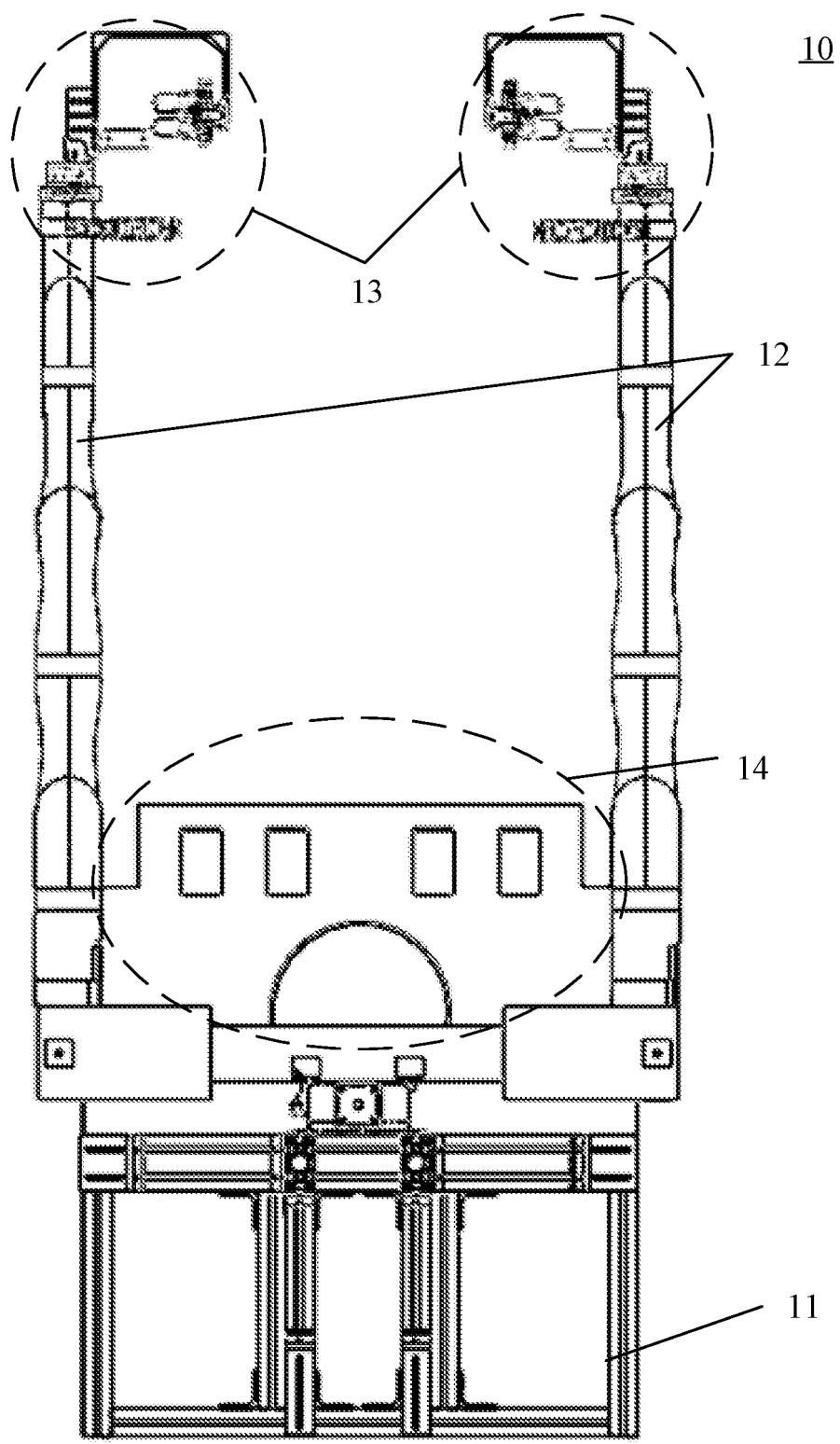
FIG. 6 is a schematic structural diagram of a primary-end operation platform according to an exemplary embodiment of this application.

In the bilateral teleoperation system 100, the secondary-end operation platform 20 usually needs to move from a site to another site to work. To cause the primary-end operation platform 10 to control travel of the secondary-end operation platform 20, schematically, as shown in FIG. 3 and FIG. 7, in the bilateral teleoperation system 100 provided in this embodiment of this application, the primary-end operation platform 10 further includes a console 14 connected to the first controller, and the secondary-end operation platform 20 further includes a mobile chassis 24 connected to the second controller.

Schematically, the console 14 is fixedly arranged on the primary-end support 11, and the mobile chassis 24 is fixedly arranged on the bottom of the secondary-end support 21; the console 14 is configured to control travel motion of the mobile chassis 24.

The first controller is further configured to collect travel motion information of the console 14, and the second controller is further configured to control travel of the mobile chassis 24. Schematically, the travel motion information includes at least one of a travel direction, a travel distance and a stop position of the console 14. Specifically, the first controller collects travel motion information of the console 14, and the second controller controls the mobile chassis 24 to perform travel motion corresponding to the travel motion information.

Figure 16:
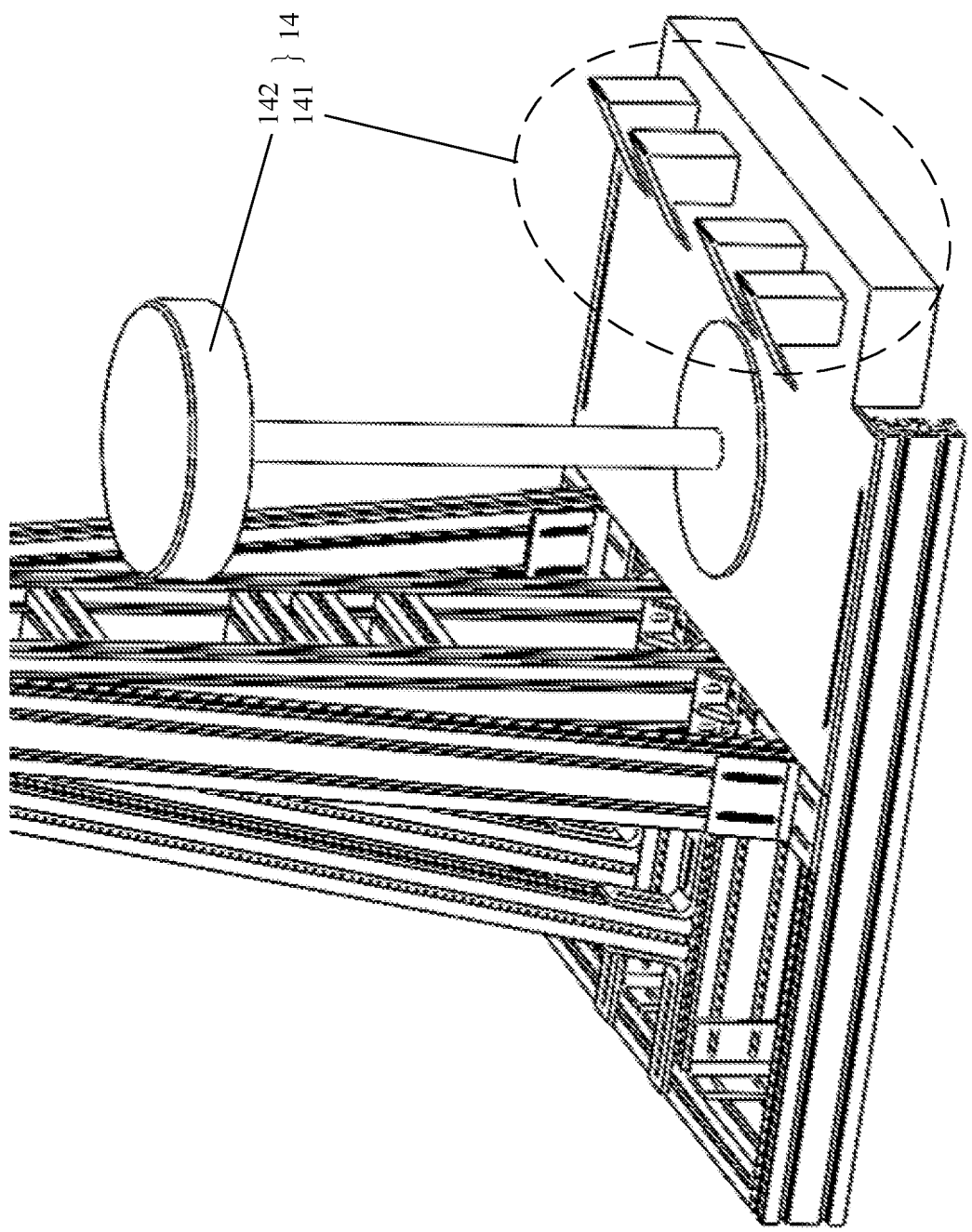
FIG. 16 is a schematic structural diagram of a console according to an exemplary embodiment of this application.

In the actual operation of the bilateral teleoperation system 100, the console 14 and the mobile chassis 24 may each have a plurality of structures. Schematically, as shown in FIG. 16 and FIG. 17, embodiments of this application respectively provide structures of the console 14 and the mobile chassis 24:

Schematically, as shown in FIG. 16, in the bilateral teleoperation system 100 provided in this embodiment of this application, the console 14 includes a pedal control board 141; the pedal control board 141 is fixedly arranged on the bottom of the primary-end support 11, and the pedal control board 141 is configured to control travel motion of the mobile chassis 24. The first controller collects travel motion information of the console 14 through the pedal control board 141, and the second controller controls the mobile chassis 24 to perform travel motion corresponding to the travel motion information.

Additionally, in the bilateral teleoperation system 100 provided in this embodiment of this application, the console 14 further includes a seat 142, and the seat 142 is fixedly arranged on the primary-end support 11. The operator performs a travel operation on the pedal control board 141 by sitting on the seat 142.

Figure 17:
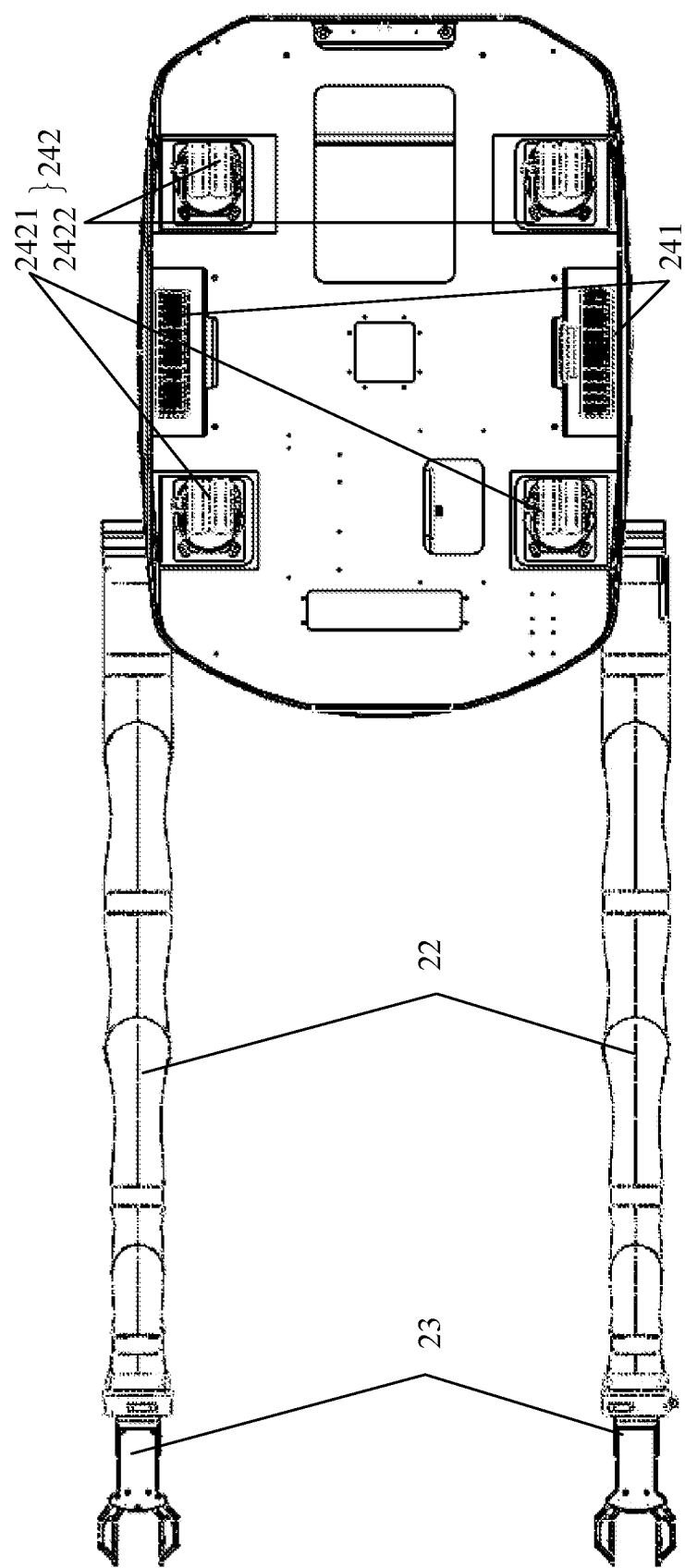
FIG. 17 is a schematic structural diagram of a mobile chassis according to an exemplary embodiment of this application.

Schematically, as shown in FIG. 17, in the bilateral teleoperation system 100 provided in this embodiment of this application, the mobile chassis 24 includes a driving wheel 241 and a driven wheel 242; the driven wheel 242 is arranged on a circumferential side of the driving wheel 241; the console 14 is configured to control motion of the driving wheel 241. The first controller collects travel motion information through the console 14, the second controller controls the driving wheel 241 to perform travel motion corresponding to the travel motion information, and the driven wheel 242 follows the driving wheel 241 to perform travel motion.

Additionally, in the bilateral teleoperation system 100 provided in this embodiment of this application, the driven wheel 242 includes a front driven wheel 2421 and a rear driven wheel 2422; the front driven wheel 2421 is arranged in front of the driving wheel 241, and the rear driven wheel 2422 is arranged behind the driving wheel 241.

Schematically, to rotate the mobile chassis 24 in situ, in the bilateral teleoperation system 100 provided in this embodiment of this application, the driving wheel 241 is a steering wheel.

To sum up, in the bilateral teleoperation system 100 provided in this embodiment of this application, through cooperative use of the console 14 and the mobile chassis 24, the primary-end operation platform 10 may control travel motion of the secondary-end operation platform 20.

An example in which the operator controls the primary-end operation platform 10 of the bilateral teleoperation system 100 is used. In the operation process of the bilateral teleoperation system, because of being affected heights, arm lengths, arm widths and other individual differences of operators, the position of the primary-end mechanical arm 12 needs to be adjusted; because of different operation environments of the secondary-end operation platform 20, the position of the secondary-end mechanical arm 22 also needs to be adjusted. According to this, the embodiments of this application provide the following solutions of specific structures of the primary-end support 11 and the secondary-end support 21:

I. Primary-End Support 11.

Figure 18:
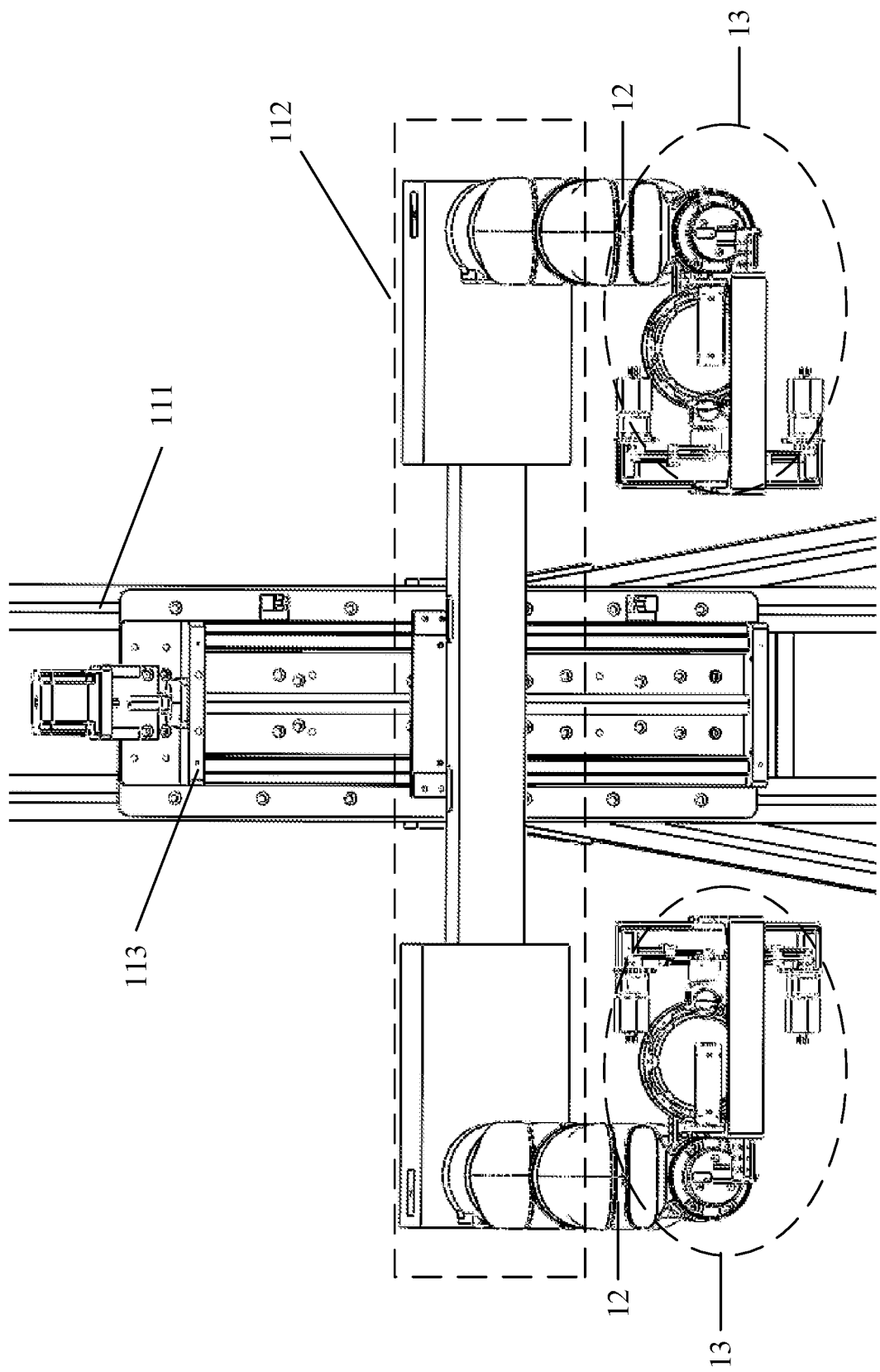
FIG. 18 is a schematic partial diagram of a secondary-end operation platform according to an exemplary embodiment of this application.
Figure 19:
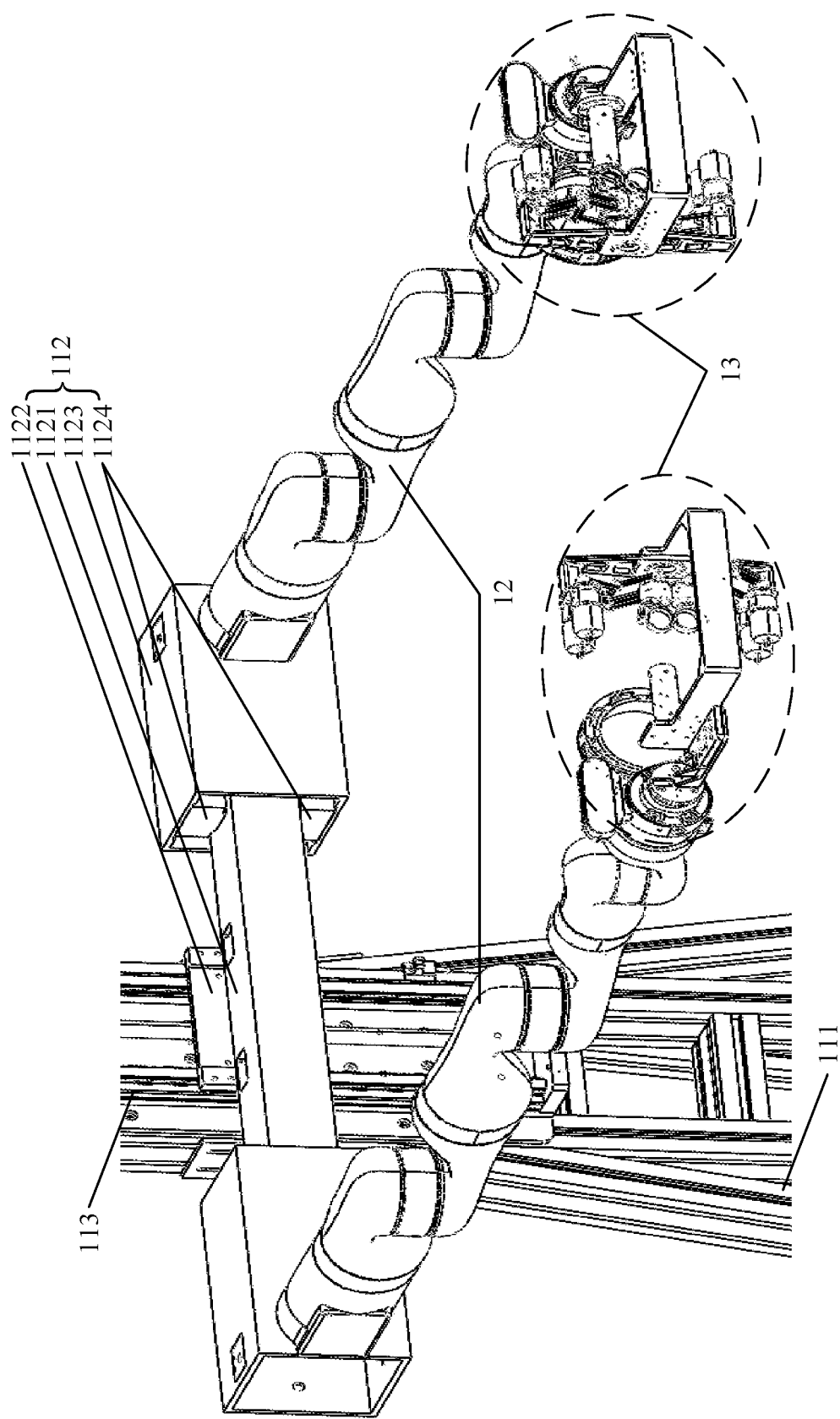
FIG. 19 is a schematic structural diagram of a primary-end support according to an exemplary embodiment of this application.

Schematically, as shown in FIG. 18 and FIG. 19, in the bilateral teleoperation system 100 provided in this embodiment of this application, the primary-end support 11 includes a primary-end apparatus supporting frame 111 and a primary-end mechanical arm supporting frame 112; the primary-end mechanical arm supporting frame 112 is slidably arranged on the primary-end apparatus supporting frame 111, and the root end of the primary-end mechanical arm 12 is movably connected to the primary-end mechanical arm supporting frame 112.

The primary-end apparatus supporting frame 111 is configured to support the primary-end mechanical arm supporting frame 112, and the primary-end mechanical arm supporting frame 112 is configured to support the primary-end mechanical arm 12.

Schematically, relative positions of the primary-end apparatus supporting frame 111 and the primary-end mechanical arm supporting frame 112 are adjustable, and relative positions of the primary-end mechanical arm supporting frame 112 and the primary-end mechanical arm 12 are adjustable. Specifically, by adjusting the position of the primary-end mechanical arm supporting frame 112 on the primary-end apparatus supporting frame 111, the height of the primary-end mechanical arm 12 may be adjusted; by adjusting the position of the primary-end mechanical arm 12 on the primary-end mechanical arm supporting frame 112, the spacing between the primary-end mechanical arms 12 may be adjusted.

The slidable connection between the primary-end apparatus supporting frame 111 and the primary-end mechanical arm supporting frame 112 may be implemented through a manner as follows: Schematically, in the bilateral teleoperation system 100 provided in this embodiment of this application, the primary-end support 11 further includes a guide rail 113, the guide rail 113 is fixed to the primary-end apparatus supporting frame 111, and the primary-end mechanical arm supporting frame 112 is arranged on the guide rail 113.

The movable connection between the primary-end mechanical arm supporting frame 112 and the primary-end mechanical arm 12 may be implemented through a manner as follows: Schematically, in the bilateral teleoperation system 100 provided in this embodiment of this application, the primary-end mechanical arm supporting frame 112 includes a beam 1121, a beam connection member 1122 and a beam fixing member 1123.

The beam 1121 is slidably connected to the primary-end apparatus supporting frame 111 through the beam connection member 1122; the root end of the primary-end mechanical arm 12 is slidably connected to the beam 1121 through the beam fixing member 1123. Specifically, the beam 1121 is fixedly arranged on the beam connection member 1122, and the beam connection member 1122 is slidably connected to the primary-end apparatus supporting frame 111.

In some embodiments, the slidable connection between the primary-end mechanical arm 12 and the beam 1121 may be implemented through a manner as follows: Schematically, in the bilateral teleoperation system 100 provided in this embodiment of this application, the primary-end mechanical arm supporting frame 112 further includes a sliding block 1124; the sliding block 1124 is arranged between the beam 1121 and the beam fixing member 1123, and the root end of the primary-end mechanical arm 12 is fixedly connected to the beam fixing member 1123.

II. Secondary-End Support 21.

Figure 20:
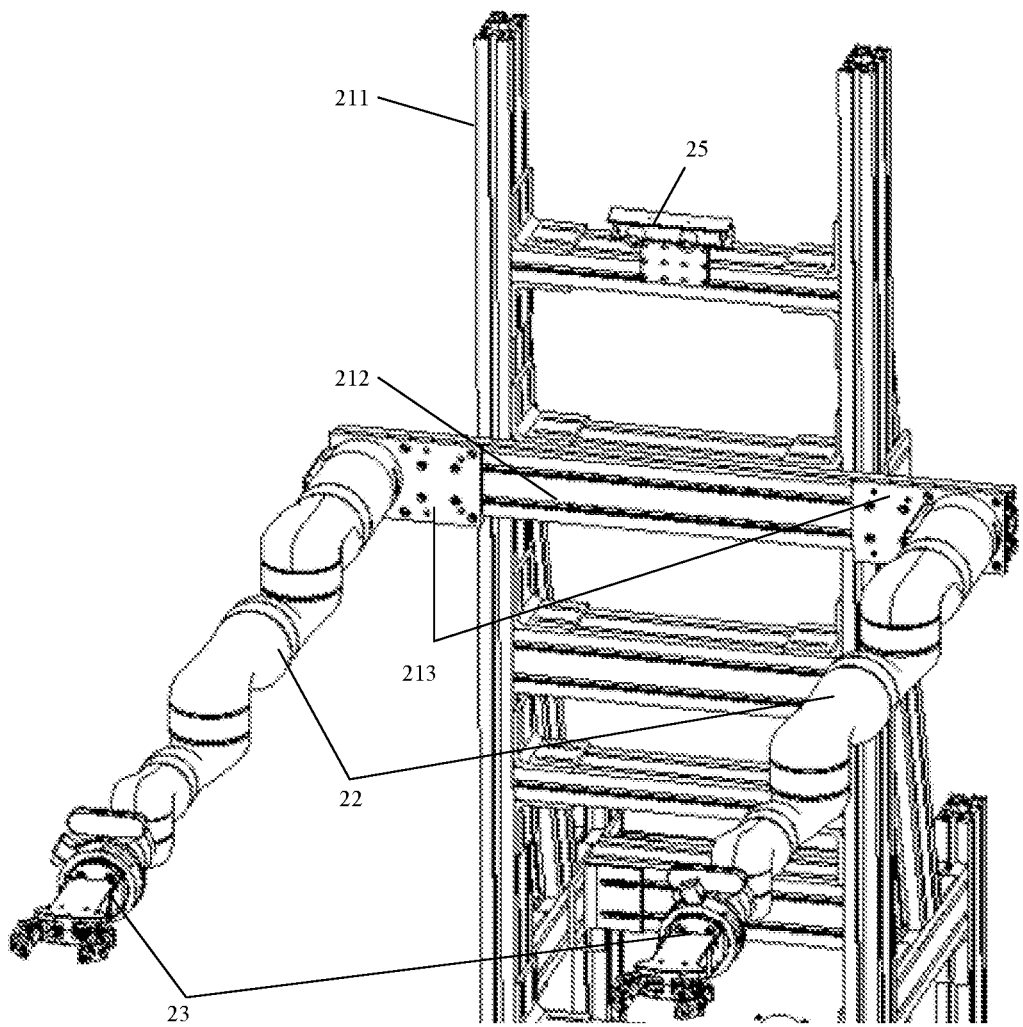
FIG. 20 is a schematic structural diagram of a secondary-end support according to an exemplary embodiment of this application.

Schematically, as shown in FIG. 20, in the bilateral teleoperation system 100 provided in this embodiment of this application, the secondary-end support 21 includes a secondary-end apparatus supporting frame 211 and a secondary-end mechanical arm supporting frame 212; the secondary-end mechanical arm supporting frame 212 is slidably arranged on the secondary-end apparatus supporting frame 211, and the root end of the secondary-end mechanical arm 22 is fixedly connected to the secondary-end mechanical arm supporting frame 212.

The secondary-end apparatus supporting frame 211 is configured to support the secondary-end mechanical arm supporting frame 212, and the secondary-end mechanical arm supporting frame 212 is configured to support the secondary-end mechanical arm 22.

Schematically, relative positions of the secondary-end apparatus supporting frame 211 and the secondary-end mechanical arm supporting frame 212 are adjustable, and relative positions of the secondary-end mechanical arm supporting frame 212 and the secondary-end mechanical arm 22 are adjustable. Specifically, by adjusting the position of the secondary-end mechanical arm supporting frame 212 on the secondary-end apparatus supporting frame 211, the height of the secondary-end mechanical arm 22 may be adjusted; by adjusting the position of the secondary-end mechanical arm 22 on the secondary-end mechanical arm supporting frame 212, the spacing between the secondary-end mechanical arms 22 may be adjusted.

Specifically, the secondary-end apparatus supporting frame 211 is fixedly connected to the secondary-end mechanical arm supporting frame 212, and when the height of the secondary-end mechanical arm 22 needs to be adjusted, the secondary-end mechanical arm supporting frame 212 is detached from the secondary-end apparatus supporting frame 211, and fixed to the predetermined position again; or the secondary-end apparatus supporting frame 211 is slidably connected to the secondary-end mechanical arm supporting frame 212 through the guide rail 113.

In some embodiments, the connection between the secondary-end mechanical arm supporting frame 212 and the secondary-end mechanical arm 22 may be implemented through a manner as follows: Schematically, in the bilateral teleoperation system 100 provided in this embodiment of this application, the secondary-end support 21 further includes a connection flange 213; the root end of the secondary-end mechanical arm 22 is detachably fixed to the secondary-end mechanical arm supporting frame 212 through the connection flange 213.

To sum up, in the bilateral teleoperation system 100 provided in this embodiment of this application, through the primary-end support 11 and the secondary-end support 21, the positions of the primary-end mechanical arm 12 and the secondary-end mechanical arm 22 may be adjusted.

Schematically, as shown in FIG. 3 to FIG. 6, an embodiment of this application further provides a primary-end operation platform 10. For specific descriptions about the primary-end operation platform 10, reference may be made to the foregoing content, and the repeated content is not described again.

The primary-end operation platform 10 provided in this embodiment of this application includes: a primary-end support 11, primary-end mechanical arms 12, mechanical hand control assemblies 13, and a first controller.

Schematically, a root end of the primary-end mechanical arm 12 is arranged on the primary-end support 11, and a tail end of the primary-end mechanical arm 12 is connected to the mechanical hand control assembly 13; and the first controller is configured to collect motion information of the primary-end mechanical arm 12 and the mechanical hand control assembly 13, and control motion of the primary-end mechanical arm 12 and the mechanical hand control assembly.

Schematically, the first controller may be divided into a first mechanical arm controller and a first mechanical hand controller. The first mechanical arm controller is configured to collect motion information of the primary-end mechanical arm 12, and control motion of the primary-end mechanical arm 12; the first mechanical hand controller is configured to collect motion information of the mechanical hand control assembly 13, and control motion of the mechanical hand control assembly 13.

Schematically, the primary-end mechanical arm 12 is a mechanical arm with seven degrees of freedom.

To obtain the arm motion information of the primary-end mechanical arm 12, schematically, as shown in FIG. 9, a primary-end torque sensor 121 connected to the first controller is arranged on the primary-end mechanical arm 12 in the primary-end operation platform 10 provided in this embodiment of this application.

Schematically, in the primary-end operation platform 10 provided in this embodiment of this application, the primary-end torque sensor 121 includes at least one of a first torque sensor 1211 and a second torque sensor 1212. The first torque sensor 1211 is arranged on a joint of the primary-end mechanical arm 12, and the second torque sensor 1212 is arranged on the tail end of the primary-end mechanical arm 12. Schematically, the first torque sensor 1211 is a joint torque sensor. Schematically, the second torque sensor 1212 is a six-dimensional force sensor.

Schematically, in the bilateral teleoperation system 100 provided in this embodiment of this application, an electronic skin connected to a first controller is attached to a surface of a primary-end mechanical arm 12; the first controller is further configured to collect the contact information of the primary-end mechanical arm 12. Schematically, the electronic skin includes a skin tactile sensor. The skin tactile sensor works according to a tactile perception principle.

Schematically, the primary-end operation platform 10 provided in this embodiment of this application includes an intention prediction part, and the intention prediction part is configured to collect motion information for predicting a motion intention of the primary-end operation platform 10. The intention prediction part may be arranged on the primary-end mechanical arm 12, or may be arranged on the mechanical hand control assembly 13.

According to different motion information, schematically, the intention prediction part includes at least one of a direction intention prediction part and a torque intention prediction part.

To perceive wrist motion of the mechanical hand control assembly 13 and obtain motion information of a motion direction of the primary-end operation platform 10, schematically, as shown in FIG. 11 and FIG. 12, In the primary-end operation platform 10 provided in this embodiment of this application, the direction intention prediction part includes an annular tactile sensor 131 connected to the first controller, and the annular tactile sensor 131 is arranged on the tail end of the primary-end mechanical arm 12. In addition to being configured to perceive wrist motion information of the primary-end operation platform 10, the annular tactile sensor 131 further has a function of predicting a motion intention of the primary-end mechanical arm 12.

The specific structure of the annular tactile sensor 131 may use an implementation as follows:

Schematically, as shown in FIG. 13 and FIG. 14, in the primary-end operation platform 10 provided in this embodiment of this application, the annular tactile sensor 131 includes an inner ring 1311, an outer ring 1312 and at least two tactile sensor chips 1313. The at least two tactile sensor chips 1313 are nested between the inner ring 1311 and the outer ring 1312.

Schematically, as shown in FIG. 13 and FIG. 14, in the primary-end operation platform 10 provided in this embodiment of this application, the annular tactile sensor 131 further includes at least two elastic members 1314. The at least two elastic members 1314 are nested between the inner ring 1311 and the outer ring 1312, and the at least two elastic members 1314 and the at least two tactile sensor chips 1313 are distributed at intervals.

Schematically, as shown in FIG. 13 and FIG. 14, in the primary-end operation platform 10 provided in this embodiment of this application, the annular tactile sensor 131 further includes a first retaining ring 1315 and a second retaining ring 1316. The first retaining ring 1315 is fixedly connected to the inner ring 1311, and the second retaining ring 1316 is fixedly connected to the outer ring 1312.

Schematically, the torque intention prediction part includes a primary-end torque sensor 121 connected to the first controller, and the primary-end torque sensor 121 is arranged on the primary-end mechanical arm 12.

According to different arrangement positions of the primary-end torque sensor 121, schematically, the primary-end torque sensor 121 includes at least one of a first torque sensor 1211 and a second torque sensor 1212. The first torque sensor 1211 is arranged on a joint of the primary-end mechanical arm 12, and the second torque sensor 1212 is arranged on the tail end of the primary-end mechanical arm 12.

To obtain a more accurate motion intention prediction result, schematically, in the primary-end operation platform 10 provided in this embodiment of this application, the torque intention prediction part further includes a handle 132, the handle 132 is fixedly arranged on the tail end of the primary-end mechanical arm 12, and the handle 132 is configured to transfer the arm motion information of the primary-end mechanical arm 12 to the primary-end torque sensor 121.

To obtain multi-finger motion information of the mechanical hand control assembly 13, schematically, as shown in FIG. 11 and FIG. 12, in the primary-end operation platform 10 provided in this embodiment of this application, the mechanical hand control assembly 13 includes a multi-finger control apparatus 133 connected to the first controller; the multi-finger control apparatus 133 is fixedly connected to the tail end of the primary-end mechanical arm 12.

Because the multi-finger motion information may include motion information of a plurality of fingers, the structure of the multi-finger control apparatus 133 has a plurality of manners. Schematically, as shown in FIG. 11 and FIG. 12, in the primary-end operation platform 10 provided in this embodiment of this application, the multi-finger control apparatus 133 includes a first finger thimble 1331 and a second finger thimble 1332; the first finger thimble 1331 and the second finger thimble 1332 are arranged on the tail end of the primary-end mechanical arm 12.

The multi-finger control apparatus 133 further has an information feedback function. Schematically, as shown in FIG. 11 and FIG. 12, in the primary-end operation platform 10 provided in this embodiment of this application, the mechanical hand control assembly 13 is configured to return contact information of the secondary-end mechanical hand 23, and the first controller is further configured to return the contact information of the secondary-end mechanical hand 23. Specifically, a tactile feedback apparatus is arranged on the multi-finger control apparatus 133, and the tactile feedback apparatus is configured to generate fingertip stimulus feedback of the mechanical hand control assembly 13.

Additionally, to obtain motion information of more fingers of the mechanical hand control assembly 13, schematically, as shown in FIG. 11 and FIG. 12, in the primary-end operation platform 10 provided in this embodiment of this application, the mechanical hand control assembly 13 further includes the handle 132 and an assembly supporting member 134; the assembly supporting member 134 is a U-shaped structure; a first end of the assembly supporting member 134 is fixed to the tail end of the primary-end mechanical arm 12, the handle 132 is fixedly arranged on the first end of the assembly supporting member 134, and the multi-finger control apparatus 133 is fixedly arranged on a second end of the assembly supporting member 134.

To implement travel motion of the primary-end operation platform 10, schematically, as shown in FIG. 3 and FIG. 7, in the primary-end operation platform 10 provided in this embodiment of this application, the primary-end operation platform 10 further includes a console 14 connected to the first controller, and the console 14 is fixedly arranged on the primary-end support 11.

Specifically, the structure of the console 14 has an implementation as follows: Schematically, as shown in FIG. 16, in the primary-end operation platform 10 provided in this embodiment of this application, the console 14 includes a pedal control board 141; the pedal control board 141 is fixedly arranged on the bottom of the primary-end support 11. Additionally, in the primary-end operation platform 10 provided in this embodiment of this application, the console 14 further includes a seat 142, and the seat 142 is fixedly arranged on the primary-end support 11.

To enable the primary-end operation platform 10 to obtain feedback information, the first controller is further configured to receive feedback information. Schematically, the first controller is further configured to receive at least one of arm feedback information, contact information, and vision feedback information.

To enable the operator of the primary-end operation platform 10 to obtain the foregoing vision feedback information in real time, schematically, as shown in FIG. 15, in the primary-end operation platform 10 provided in this embodiment of this application, the primary-end operation platform 10 further includes virtual glasses 15 connected to the first controller, and the virtual glasses 15 are configured to be worn by the operator.

To adjust the position of the primary-end mechanical arm 12, schematically, as shown in FIG. 18 and FIG. 19, in the bilateral teleoperation system 100 provided in this embodiment of this application, the primary-end support 11 includes a primary-end apparatus supporting frame 111 and a primary-end mechanical arm supporting frame 112; the primary-end mechanical arm supporting frame 112 is slidably arranged on the primary-end apparatus supporting frame 111, and the root end of the primary-end mechanical arm 12 is movably connected to the primary-end mechanical arm supporting frame 112.

The slidable connection between the primary-end apparatus supporting frame 111 and the primary-end mechanical arm supporting frame 112 may be implemented through a manner as follows: Schematically, in the primary-end operation platform 10 provided in this embodiment of this application, the primary-end support 11 further includes a guide rail 113, the guide rail 113 is fixed to the primary-end apparatus supporting frame 111, and the primary-end mechanical arm supporting frame 112 is arranged on the guide rail 113.

The movable connection between the primary-end mechanical arm supporting frame 112 and the primary-end mechanical arm 12 may be implemented through a manner as follows: Schematically, in the primary-end operation platform 10 provided in this embodiment of this application, the primary-end mechanical arm supporting frame 112 includes a beam 1121, a beam connection member 1122 and a beam fixing member 1123.

In some embodiments, the slidable connection between the primary-end mechanical arm 12 and the beam 1121 may be implemented through a manner as follows: Schematically, in the primary-end operation platform 10 provided in this embodiment of this application, the primary-end mechanical arm supporting frame 112 further includes a sliding block 1124; the sliding block 1124 is arranged between the beam 1121 and the beam fixing member 1123, and the root end of the primary-end mechanical arm 12 is fixedly connected to the beam fixing member 1123.

Schematically, as shown in FIG. 7 and FIG. 8, an embodiment of this application further provides a secondary-end operation platform 20. For specific descriptions about the primary-end operation platform 10, reference may be made to the foregoing content, and the repeated content is not described again.

The secondary-end operation platform 20 provided in this embodiment of this application includes: a secondary-end support 21, secondary-end mechanical arms 22, secondary-end mechanical hands 23, and a second controller.

Schematically, a root end of the secondary-end mechanical arm 22 is arranged on the secondary-end support 21, and a tail end of the secondary-end mechanical arm 22 is connected to the secondary-end mechanical hand 23; and the second controller is configured to control motion of the secondary-end mechanical arm 22 and the secondary-end mechanical hand 23, and return motion information of the secondary-end mechanical arm 22 and the secondary-end mechanical hand 23.

Schematically, the second controller may be divided into a second mechanical arm controller and a second mechanical hand controller. The second mechanical arm controller is configured to control motion of the secondary-end mechanical arm 22, and return motion information of the secondary-end mechanical arm 22, and the second mechanical hand controller is configured to control motion of the secondary-end mechanical hand 23, and return motion information of the secondary-end mechanical hand 23.

Schematically, the secondary-end mechanical arm 22 is a mechanical arm with seven degrees of freedom.

Schematically, the secondary-end mechanical hand 23 is a two-finger clamping claw.

Schematically, as shown in FIG. 10, in the bilateral teleoperation system 100 provided in this embodiment of this application, a secondary-end torque sensor 221 connected to a second controller is arranged on a secondary-end mechanical arm 22; the second controller is further configured to collect arm feedback information of the secondary-end mechanical arm 22. Schematically, the third torque sensor 2211 is a joint torque sensor. Schematically, the fourth torque sensor 2212 is a six-dimensional force sensor.

Schematically, in the bilateral teleoperation system 100 provided in this embodiment of this application, an electronic skin connected to a second controller is attached to a surface of a secondary-end mechanical arm 22; the second controller is further configured to collect contact information of the secondary-end mechanical arm 22. Schematically, the electronic skin includes a skin tactile sensor. The skin tactile sensor works according to a tactile perception principle.

Schematically, as shown in FIG. 7 and FIG. 8, in the bilateral teleoperation system 100 provided in this embodiment of this application, the secondary-end operation platform 20 further includes a binocular vision camera 25 connected to the second controller; the binocular vision camera 25 is arranged on the top of the secondary-end support 21; and the second controller is further configured to collect vision information of the binocular vision camera 25, and the second controller is further configured to return the vision information of the binocular vision camera 25.

To enable the second controller to control the secondary-end operation platform 20 to respond to the wrist motion corresponding to the wrist motion information, schematically, in the secondary-end operation platform 20 provided in this embodiment of this application, the secondary-end mechanical hand 23 is connected to the secondary-end mechanical arm 22 through a rotation apparatus, and the rotation apparatus is configured to control rotation motion of the secondary-end mechanical hand 23.

To enable the second controller to implement an information feedback function, in the secondary-end operation platform 20 provided in this embodiment of this application, the second controller is further configured to collect contact information of the secondary-end mechanical hand 23. Specifically, a fingertip tactile sensor connected to the second controller is arranged on the secondary-end mechanical hand 23, and the fingertip tactile sensor is configured to obtain fingertip contact information of the secondary-end mechanical hand 23.

To implement travel motion of the secondary-end operation platform 20, schematically, as shown in FIG. 3 and FIG. 7, in the secondary-end operation platform 20 provided in this embodiment of this application, the secondary-end operation platform 20 further includes a mobile chassis 24 connected to the second controller, and the mobile chassis 24 is fixedly arranged on the bottom of the secondary-end support 21.

Specifically, the structure of the mobile chassis 24 has an implementation as follows: Schematically, as shown in FIG. 17, in the secondary-end operation platform 20 provided in this embodiment of this application, the mobile chassis 24 includes a driving wheel 241 and a driven wheel 242; the driven wheel 242 is arranged on a circumferential side of the driving wheel 241. Additionally, in the secondary-end operation platform 20 provided in this embodiment of this application, the driven wheel 242 includes a front driven wheel 2421 and a rear driven wheel 2422; the front driven wheel 2421 is arranged in front of the driving wheel 241, and the rear driven wheel 2422 is arranged behind the driving wheel 241. Schematically, to rotate the mobile chassis 24 in situ, in the secondary-end operation platform 20 provided in this embodiment of this application, the driving wheel 241 is a steering wheel.

To adjust the position of the secondary-end mechanical arm 22, schematically, as shown in FIG. 20, in the bilateral teleoperation system 100 provided in this embodiment of this application, the secondary-end support 21 includes a secondary-end apparatus supporting frame 211 and a secondary-end mechanical arm supporting frame 212; the secondary-end mechanical arm supporting frame 212 is slidably arranged on the secondary-end apparatus supporting frame 211, and the root end of the secondary-end mechanical arm 22 is fixedly connected to the secondary-end mechanical arm supporting frame 212.

In some embodiments, the connection between the secondary-end mechanical arm supporting frame 212 and the secondary-end mechanical arm 22 may be implemented through a manner as follows: Schematically, in the secondary-end operation platform 20 provided in this embodiment of this application, the secondary-end support 21 further includes a connection flange 213; the root end of the secondary-end mechanical arm 22 is detachably fixed to the secondary-end mechanical arm supporting frame 212 through the connection flange 213.

Figure 21:
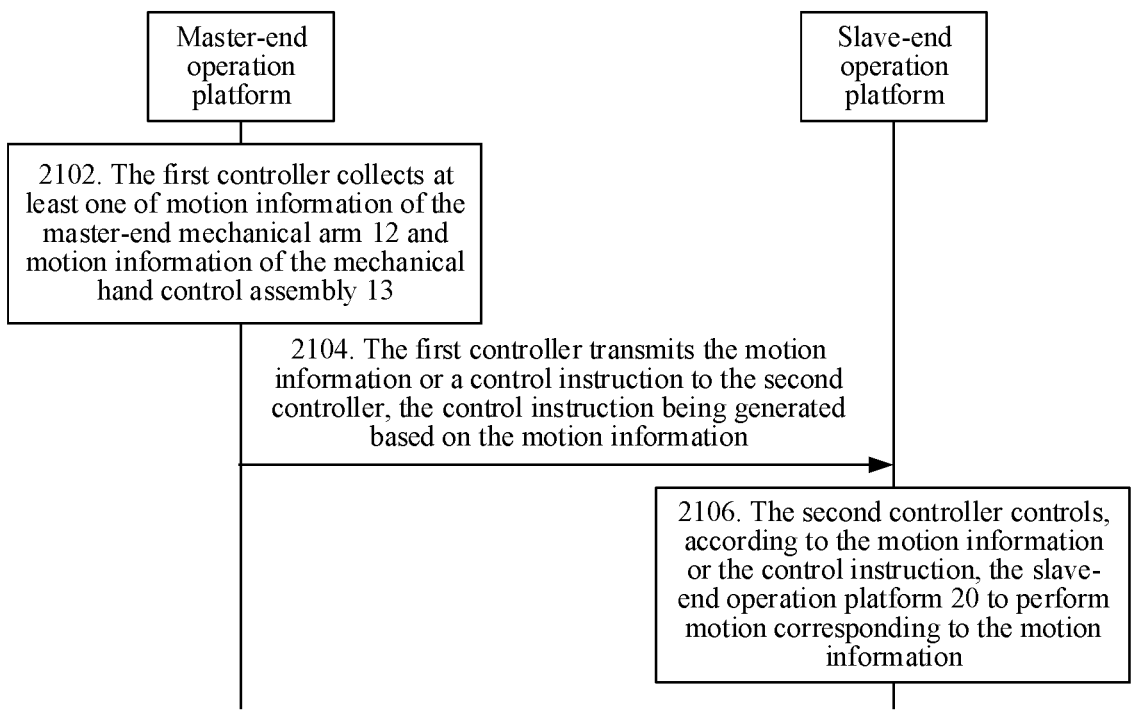
FIG. 21 is a flowchart of a bilateral teleoperation system control method according to an exemplary embodiment of this application.

Schematically, as shown in FIG. 21, an embodiment of this application further provides a bilateral teleoperation system control method. For specific descriptions about the bilateral teleoperation system 100, reference may be made to the foregoing content, and the repeated content is not described again.

The bilateral teleoperation system control method provided in this embodiment of this application is applied to the bilateral teleoperation system 100 in the foregoing content, and the control method includes steps as follows:

Step 2102. The first controller collects at least one of motion information of the primary-end mechanical arm 12 and motion information of the mechanical hand control assembly 13.

Schematically, the motion information includes at least one of wrist motion information of the primary-end mechanical arm 12, arm motion information of the primary-end mechanical arm 12 and multi-finger motion information of the mechanical hand control assembly 13. The wrist motion information includes at least one of a motion direction, a motion speed and a stop position of a wrist of the primary-end mechanical arm 12; the arm motion information includes at least one of a motion direction, a motion speed and a stop position of an arm section of the primary-end mechanical arm 12; the multi-finger motion information includes at least one of a motion direction, a motion speed and a stop position of multiple fingers of the mechanical hand control assembly 13.

Schematically, the motion information is collected by the first controller; or the motion information is collected by a related part in the primary-end operation platform 10 and then transferred to the first controller.

Step 2104. The first controller transmits the motion information or a control instruction to the second controller.

Schematically, the control instruction is generated based on the motion information.

The control instruction is configured to control a motion parameter of the secondary-end mechanical arm 22 and/or the secondary-end mechanical hand 23, where the motion parameter includes but not limited to at least one of a motion direction, a motion speed and a stop position.

Schematically, the control instruction includes at least one of a wrist control instruction, an arm control instruction and a multi-finger control instruction, and specific content of the wrist control instruction, the arm control instruction and the multi-finger control instruction is described below.

Specifically, step 2104 includes the following two implementations:

Implementation 1: The first controller transmits the motion information to the second controller.

Implementation 2: The first controller generates a control instruction according to the motion information; the first controller transmits the control instruction to the second controller.

In the implementation 1, after receiving the motion information transmitted by the first controller, the second controller generates the control instruction according to the motion information, so that the second controller controls motion of the secondary-end mechanical arm 22 and the secondary-end mechanical hand 23. That is, the control instruction may be generated by the first controller or the second controller.

Step 2106. The second controller controls, according to the motion information or the control instruction, the secondary-end operation platform 20 to perform motion corresponding to the motion information.

The motion corresponding to the motion information and performed by the secondary-end operation platform 20 is performed by at least one of the secondary-end mechanical arm 22 and the secondary-end mechanical hand 23.

Schematically, the motion corresponding to the motion information includes at least one of wrist motion of the secondary-end mechanical arm 22, arm motion of the secondary-end mechanical arm 22 and multi-finger motion of the secondary-end mechanical hand 23. The wrist motion includes at least one of a motion direction, a motion speed and a stop position of a wrist of the secondary-end mechanical arm 22; the arm motion includes at least one of a motion direction, a motion speed and a stop position of an arm section of the secondary-end mechanical arm 22; the multi-finger motion includes at least one of a motion direction, a motion speed and a stop position of multiple fingers of the secondary-end mechanical hand 23.

Schematically, the bilateral teleoperation system control method provided in this embodiment of this application is applied to a homogeneous bilateral teleoperation system and/or a heterogeneous bilateral teleoperation system. Specifically, in the homogeneous bilateral teleoperation system, mapping of the primary-end operation platform 10 and the secondary-end operation platform 20 is in a homogeneous mapping mode; in the heterogeneous bilateral teleoperation system, mapping of the primary-end operation platform 10 and the secondary-end operation platform 20 is in a heterogeneous mapping mode. Schematically, the bilateral teleoperation system control method provided in this embodiment of this application includes at least one of the homogeneous mapping mode and the heterogeneous mapping mode. Specific mapping modes may be switched according to needs of actual application scenarios, which is not limited in this application.

For example, in the homogeneous mapping mode, the first controller collects the motion information of the primary-end mechanical arm 12 being forward movement of the arm by 0.5 meters and clockwise rotation of the wrist by 90 degrees, and the motion information of the mechanical hand control assembly 13 being a two-finger clamping action; the first controller generates an arm control instruction, a wrist control instruction and a multi-finger control instruction respectively according to the foregoing motion information, and transmits the three instructions to the second controller; after receiving the three instructions, the second controller controls the secondary-end mechanical arm 22 according to the arm control instruction to move forward by 0.5 meters, controls the secondary-end mechanical arm 22 according to the wrist control instruction to rotate clockwise by 90 degrees, and controls the secondary-end mechanical hand 23 according to the multi-finger control instruction to move two fingers to perform clamping.

In another example, in the heterogeneous mapping mode, the first controller collects the motion information of the primary-end mechanical arm 12 being forward movement of the arm by 0.5 meters and clockwise rotation of the wrist by 90 degrees, and the motion information of the mechanical hand control assembly 13 being a two-finger clamping action; the first controller transmits the foregoing motion information to the second controller, and after receiving the foregoing motion information, the second controller generates an arm control instruction, a wrist control instruction and a multi-finger control instruction respectively; the second controller controls the secondary-end mechanical arm 22 according to the arm control instruction to move forward by 1 meter, controls the secondary-end mechanical arm 22 according to the wrist control instruction to rotate clockwise by 90 degrees, and controls the secondary-end mechanical hand 23 according to the multi-finger control instruction to move five fingers to perform clamping.

In an actual operation process, because of different structures of the bilateral teleoperation system 100, the bilateral teleoperation system control method provided in this embodiment of this application has a plurality of implementations. According to the foregoing content, this embodiment of this application provides the following several specific implementations of the bilateral teleoperation system control method:

I. The primary-end operation platform 10 includes an intention prediction part.

Schematically, in the bilateral teleoperation system control method provided in this embodiment of this application, when the primary-end operation platform 10 includes the intention prediction part, step 2102 has an implementation as follows: The first controller collects, through the intention prediction part, motion information used for predicting a motion intention of the primary-end mechanical arm 12.

There may be one or more intention prediction parts. Schematically, the intention prediction part is arranged on the primary-end mechanical arm 12; or the intention prediction part is arranged on the mechanical hand control assembly 13.

Schematically, the motion information for predicting a motion intention of the primary-end operation platform 10 includes but not limited to at least one of motion direction information and motion torque information. According to different motion information, the intention prediction part also includes a plurality of different parts. Schematically, the intention prediction part includes at least one of a direction intention prediction part and a torque intention prediction part. Descriptions are made below from the two aspects:

1. The direction intention prediction part includes an annular tactile sensor 131 connected to the first controller.

Step 2102 has an implementation as follows: The first controller collects, through the annular tactile sensor 131, wrist motion information of the primary-end mechanical arm 12.

Schematically, the wrist motion information includes at least one of a motion direction, a motion speed and a stop position of a wrist of the primary-end mechanical arm 12.

Correspondingly, step 2106 has an implementation as follows: The second controller controls, according to the wrist motion information or a wrist control instruction, the secondary-end mechanical arm 22 to perform wrist motion corresponding to the wrist motion information.

Schematically, the wrist control instruction is generated by performing intention prediction in a motion direction based on the wrist motion information. The wrist control instruction is configured to control a motion parameter of the secondary-end mechanical arm 22, and the motion parameter includes but not limited to at least one of a motion direction, a motion speed and a stop position of a wrist of the secondary-end mechanical arm 22.

2. The torque intention prediction part includes a primary-end torque sensor 121 connected to the first controller.

Step 2102 has an implementation as follows: The first controller collects, through the primary-end torque sensor 121, arm motion information of the primary-end mechanical arm 12.

Schematically, the arm motion information includes at least one of a motion direction, a motion speed and a stop position of an arm section of the primary-end mechanical arm 12.

Correspondingly, step 2106 has an implementation as follows: The second controller controls, according to the arm motion information or an arm control instruction, the secondary-end mechanical arm 22 to perform arm motion corresponding to the arm motion information.

Schematically, the arm control instruction is generated based on the arm motion information.

Schematically, the arm control instruction is configured to control a motion parameter of the secondary-end mechanical arm 22, where the motion parameter includes but not limited to at least one of a motion direction, a motion speed and a stop position of an arm section of the secondary-end mechanical arm 22.

According to the foregoing content, the primary-end torque sensor 121 includes at least one of a first torque sensor 1211 and a second torque sensor 1212. Correspondingly, the foregoing two steps include at least three implementations as follows:

(1). The primary-end torque sensor 121 includes the first torque sensor 1211.

Step 2102 has an implementation as follows: The first controller collects, through the first torque sensor 1211, first arm motion information of the primary-end mechanical arm 12.

Schematically, the first arm motion information includes at least one of a motion direction, a motion speed and a stop position of each joint of the primary-end mechanical arm 12.

Correspondingly, step 2106 has an implementation as follows: The second controller controls, according to the first arm motion information or a first arm control instruction, the secondary-end mechanical arm 22 to perform first arm motion corresponding to the first arm motion information.

Schematically, the first arm control instruction is generated based on the first arm motion information.

Schematically, the first arm control instruction is configured to control a motion parameter of each joint of the secondary-end mechanical arm 22, where the motion parameter includes but not limited to at least one of a motion direction, a motion speed and a stop position of each joint of the secondary-end mechanical arm 22.

(2). The primary-end torque sensor 121 includes the second torque sensor 1212.

Step 2102 has an implementation as follows: The first controller collects, through the second torque sensor 1212, second arm motion information of the primary-end mechanical arm 12.

Schematically, the second arm motion information includes at least one of a motion direction, a motion speed and a stop position of the tail end of the primary-end mechanical arm 12.

Correspondingly, step 2106 has an implementation as follows: The first controller controls, according to the second arm motion information or a second arm control instruction, the secondary-end mechanical arm 22 to perform second arm motion corresponding to the second arm motion information.

Schematically, the second arm control instruction is generated based on the second arm motion information.

Schematically, the second arm control instruction is configured to control a motion parameter of the tail end of the secondary-end mechanical arm 22, where the motion parameter includes but not limited to at least one of a motion direction, a motion speed and a stop position of the tail end of the secondary-end mechanical arm 22.

(3). The primary-end torque sensor 121 includes the first torque sensor 1211 and the second torque sensor 1212.

Step 2102 has an implementation as follows: The first controller collects, through the first torque sensor 1211, first arm motion information of the primary-end mechanical arm 12; The first controller collects, through the second torque sensor 1212, second arm motion information of the primary-end mechanical arm 12.

Correspondingly, step 2106 has an implementation as follows: The second controller controls, according to the first arm motion information or a first arm control instruction, the secondary-end mechanical arm 22 to perform first arm motion corresponding to the first arm motion information; The first controller controls, according to the second arm motion information or a second arm control instruction, the secondary-end mechanical arm 22 to perform second arm motion corresponding to the second arm motion information.

II. An electronic skin connected to the first controller is attached to a surface of the primary-end mechanical arm 12.

Step 2102 has an implementation as follows: The first controller collects arm touch information of the primary-end mechanical arm 12 through the electronic skin.

Schematically, the arm feedback information includes contact information of the primary-end mechanical arm 12 for an external environment, where the contact information includes but not limited to at least one of torque information of an external force applied to the primary-end mechanical arm 12, a contact force of an object touched by the primary-end mechanical arm 12 and geometrical information of the object.

Correspondingly, step 2106 has an implementation as follows: The second controller controls, according to the arm touch information or an arm touch instruction, the secondary-end mechanical arm 22 to perform arm motion corresponding to the arm touch information.

Schematically, the arm touch instruction is generated based on the arm touch information.

III. The mechanical hand control assembly 13 includes a multi-finger control apparatus 133 connected to the first controller.

Step 2102 has an implementation as follows: The first controller collects, through the multi-finger control apparatus 133, multi-finger motion information of the mechanical hand control assembly 13.

Schematically, the multi-finger motion information includes at least one of a motion direction, a motion speed and a stop position of multiple fingers of the mechanical hand control assembly 13.

Correspondingly, step 2106 has an implementation as follows: The second controller controls, according to the multi-finger motion information or a multi-finger control instruction, the secondary-end mechanical hand 23 to perform multi-finger motion corresponding to the multi-finger motion information.

Schematically, the multi-finger control instruction is generated based on the multi-finger motion information.

Schematically, the multi-finger control instruction is configured to control a motion parameter of multiple fingers of the secondary-end mechanical hand 23, where the motion parameter includes but not limited to at least one of a motion direction, a motion speed and a stop position of the multiple fingers of the secondary-end mechanical hand 23.

According to the foregoing content, the multi-finger control apparatus 133 includes at least one of the first finger thimble 1331 and the second finger thimble 1332. Correspondingly, the foregoing two steps include a plurality of implementations as follows:

1. The multi-finger control apparatus 133 includes the first finger thimble 1331.

Step 2102 has an implementation as follows: The first controller collects, through the first finger thimble 1331, first multi-finger motion information of the mechanical hand control assembly 13.

Schematically, the first multi-finger motion information includes at least one of a motion direction, a motion speed and a stop position of a first finger of the mechanical hand control assembly 13.

Correspondingly, step 2106 has an implementation as follows: The second controller controls, according to the first multi-finger motion information or a first multi-finger control instruction, the secondary-end mechanical hand 23 to perform first multi-finger motion corresponding to the first multi-finger motion information.

Schematically, the first multi-finger control instruction is generated based on the first multi-finger motion information.

Schematically, the first multi-finger control instruction is configured to control a motion parameter of a first finger of the secondary-end mechanical hand 23, where the motion parameter includes but not limited to at least one of a motion direction, a motion speed and a stop position of the first finger of the secondary-end mechanical hand 23.

2. The multi-finger control apparatus 133 includes the second finger thimble 1332.

Step 2102 has an implementation as follows: The first controller collects, through the second finger thimble 1332, second multi-finger motion information of the mechanical hand control assembly 13.

Schematically, the second multi-finger motion information includes at least one of a motion direction, a motion speed and a stop position of a second finger of the mechanical hand control assembly 13.

Correspondingly, step 2106 has an implementation as follows: The second controller controls, according to the second multi-finger motion information or a second multi-finger control instruction, the secondary-end mechanical hand 23 to perform second multi-finger motion corresponding to the second multi-finger motion information.

Schematically, the second multi-finger control instruction is generated based on the second multi-finger motion information.

Schematically, the second multi-finger control instruction is configured to control a motion parameter of a second finger of the secondary-end mechanical hand 23, where the motion parameter includes but not limited to at least one of a motion direction, a motion speed and a stop position of the second finger of the secondary-end mechanical hand 23.

3. The multi-finger control apparatus 133 includes the first finger thimble 1331 and the second finger thimble 1332.

Step 2102 has an implementation as follows: The first controller collects, through the first finger thimble 1331, first multi-finger motion information of the mechanical hand control assembly 13; The first controller collects, through the second finger thimble 1332, second multi-finger motion information of the mechanical hand control assembly 13.

Correspondingly, step 2106 has an implementation as follows: The second controller controls, according to the first multi-finger motion information or a first multi-finger control instruction, the secondary-end mechanical hand 23 to perform first multi-finger motion corresponding to the first multi-finger motion information; The second controller controls, according to the second multi-finger motion information or a second multi-finger control instruction, the secondary-end mechanical hand 23 to perform second multi-finger motion corresponding to the second multi-finger motion information.

4. The mechanical hand control assembly 13 includes the handle 132.

According to the foregoing content, the mechanical hand control assembly 13 further includes the handle 132, configured to obtain motion information of the remaining fingers of the mechanical hand control assembly 13.

Step 2102 has an implementation as follows: The first controller collects third multi-finger motion information of the mechanical hand control assembly 13 through the handle 132.

Schematically, the third multi-finger motion information includes at least one of a motion direction, a motion speed and a stop position of the remaining fingers of the mechanical hand control assembly 13.

Correspondingly, step 2106 has an implementation as follows: The second controller controls, according to the third multi-finger motion information or a third multi-finger control instruction, the secondary-end mechanical hand 23 to perform third multi-finger motion corresponding to the third multi-finger motion information.

Schematically, the third multi-finger control instruction is generated based on the third multi-finger motion information.

Schematically, the third multi-finger control instruction is configured to control a motion parameter of the remaining fingers of the secondary-end mechanical hand 23, where the motion parameter includes but not limited to at least one of a motion direction, a motion speed and a stop position of the remaining fingers of the secondary-end mechanical hand 23.

To sum up, in the bilateral teleoperation system control method provided in this embodiment of this application, the motion information or the control instruction is transmitted to the second controller through the first controller, and the primary-end operation platform 10 may control motion of the secondary-end operation platform 20.

Figure 22:
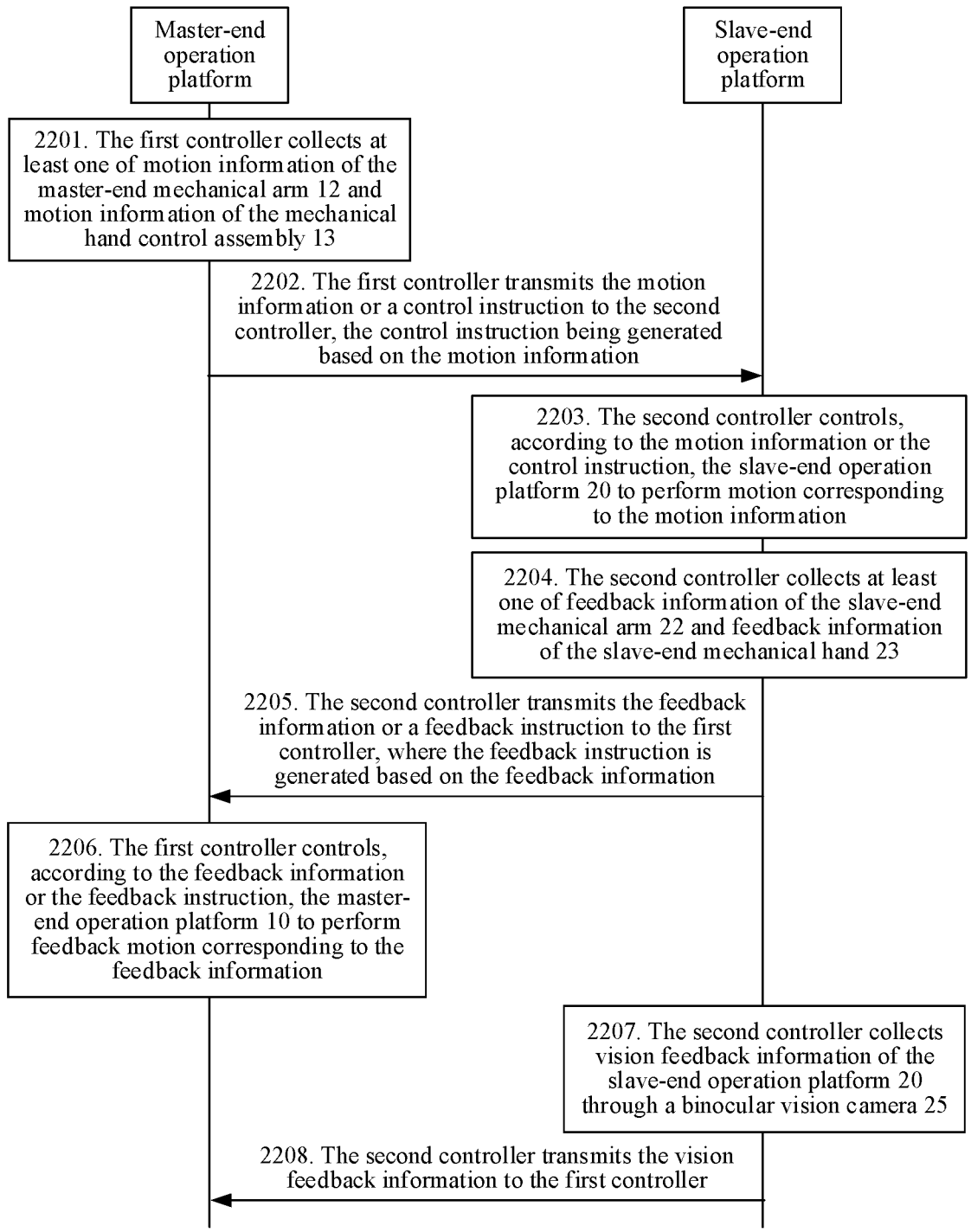
FIG. 22 is a flowchart of a bilateral teleoperation system control method according to an exemplary embodiment of this application.

According to the above description, in the bilateral teleoperation system 100, the secondary-end operation platform 20 may further transmit feedback information to the primary-end operation platform 10. Schematically, as shown in FIG. 22, a bilateral teleoperation system control method provided in an embodiment of this application includes steps as follows:

Step 2201. The first controller collects at least one of motion information of the primary-end mechanical arm 12 and motion information of the mechanical hand control assembly 13.

Step 2202. The first controller transmits the motion information or a control instruction to the second controller.

Schematically, the control instruction is generated based on the motion information.

Step 2203. The second controller controls, according to the motion information or the control instruction, the secondary-end operation platform 20 to perform motion corresponding to the motion information.

The motion corresponding to the motion information and performed by the secondary-end operation platform 20 is performed by at least one of the secondary-end mechanical arm 22 and the secondary-end mechanical hand 23.

Schematically, steps 2201, 2202, and 2203 are the same as steps 2102, 2104, and 2106 that may be used as a reference, and details are not described again.

Step 2204. The second controller collects at least one of feedback information of the secondary-end mechanical arm 22 and feedback information of the secondary-end mechanical hand 23.

Schematically, the feedback information includes feedback information of an external environment for the secondary-end mechanical arm 22 and/or the secondary-end mechanical hand 23. Schematically, the feedback information refers to information about contact between the secondary-end mechanical arm 22 and/or the secondary-end mechanical hand 23 and the external environment, including but not limited to at least one of a contact point, a contact surface, a contact position, the temperature of a contacted object, the shape of the contacted object, the weight of the contacted object, and the roughness of the contacted object.

Step 2205. The second controller transmits the feedback information or a feedback instruction to the first controller.

Schematically, the feedback instruction is generated based on the feedback information.

Step 2206. The first controller controls, according to the feedback information or the feedback instruction, the primary-end operation platform 10 to perform feedback motion corresponding to the feedback information.

The motion corresponding to the motion information and performed by the primary-end operation platform 10 is performed by at least one of the primary-end mechanical arm 12 and the mechanical hand control assembly 13.

Step 2207. The second controller collects vision feedback information of the secondary-end operation platform 20 through a binocular vision camera 25.

Schematically, the vision feedback information includes external image information of the secondary-end operation platform 20 perceived by the binocular vision camera 25, and the external image information of the secondary-end operation platform 20 includes but not limited to at least one of a related image, a video, and an audio of an external environment in which the secondary-end operation platform 20 is located.

Step 2208. The second controller transmits the vision feedback information to the first controller.

According to the foregoing content, the primary-end operation platform 10 further includes virtual glasses 15 connected to the first controller and configured to be worn by the operator. Then, in the bilateral teleoperation system control method provided in this embodiment of this application, after receiving the vision feedback information transmitted by the second controller, the first controller may display the foregoing vision feedback information to the operator through the virtual glasses 15.

Schematically, one or two of three step groups formed by steps 2201, 2202, and 2203, steps 2204, 2205, and 2206, and steps 2207 and 2208 may be performed, and the three step groups may be performed simultaneously, may be performed in order or out of order, or may be performed repeatedly.

In an actual operation process, because of different structures of the bilateral teleoperation system 100, step 2204 and step 2206 have a plurality of implementations, and this embodiment of this application provides several specific implementations as follows:

I. A secondary-end torque sensor 221 connected to a second controller is arranged on a secondary-end mechanical arm 22.

Step 2204 has an implementation as follows: The second controller collects arm feedback information of the secondary-end mechanical arm 22 through the secondary-end torque sensor 221.

Schematically, the arm feedback information includes arm feedback information of the external environment for the secondary-end mechanical arm 22.

Correspondingly, step 2206 has an implementation as follows: The first controller controls, according to the arm feedback information or an arm feedback instruction, the primary-end mechanical arm 12 to perform arm feedback motion corresponding to the arm feedback information.

According to the foregoing content, the secondary-end torque sensor 221 includes at least one of a third torque sensor 2211 and a fourth torque sensor 2212. Correspondingly, step 2404 and step 2406 include at least three implementations as follows:

1. The secondary-end torque sensor 221 includes the third torque sensor 2211.

Step 2204 has an implementation as follows: The second controller collects first arm feedback information of the secondary-end mechanical arm 22 through the third torque sensor 2211.

Schematically, the first arm feedback information includes at least one of a motion direction, a motion distance and a stop position of the external environment for each joint of the secondary-end mechanical arm 22 that are perceived by the secondary-end mechanical arm 22.

Correspondingly, step 2206 has an implementation as follows: The first controller controls, according to the first arm feedback information or a first arm feedback instruction, the primary-end mechanical arm 12 to perform first arm feedback motion corresponding to the first arm feedback information.

Schematically, the first arm feedback instruction is generated based on the first arm feedback information.

Schematically, the first arm feedback instruction is configured to control a motion parameter of each joint of the primary-end mechanical arm 12, where the motion parameter includes but not limited to at least one of a motion direction, a motion distance and a stop position of each joint of the primary-end mechanical arm 12.

2. The secondary-end torque sensor 221 includes the fourth torque sensor 2212.

Step 2204 has an implementation as follows: The second controller collects second arm feedback information of the secondary-end mechanical arm 22 through the fourth torque sensor 2212.

Schematically, the second arm feedback information includes at least one of a motion direction, a motion distance and a stop position of the external environment for the tail end of the secondary-end mechanical arm 22 that are perceived by the secondary-end mechanical arm 22.

Correspondingly, step 2206 has an implementation as follows: The first controller controls, according to the second arm feedback information or a second arm feedback instruction, the primary-end mechanical arm 12 to perform second arm feedback motion corresponding to the second arm feedback information.

Schematically, the second arm feedback instruction is generated based on the second arm feedback information.

Schematically, the second arm feedback instruction is configured to control a motion parameter of the tail end of the primary-end mechanical arm 12 and/or the mechanical hand control assembly 13, where the motion parameter includes but not limited to at least one of a motion direction, a motion distance and a stop position of the tail end of the primary-end mechanical arm 12.

3. The secondary-end torque sensor 221 includes the third torque sensor 2211 and the fourth torque sensor 2212.

Step 2204 has an implementation as follows: The second controller collects first arm feedback information of the secondary-end mechanical arm 22 through the third torque sensor 2211; The second controller collects second arm feedback information of the secondary-end mechanical arm 22 through the fourth torque sensor 2212.

Correspondingly, step 2206 has an implementation as follows: The first controller controls, according to the first arm feedback information or a first arm feedback instruction, the primary-end mechanical arm 12 to perform first arm feedback motion corresponding to the first arm feedback information; The first controller controls, according to the second arm feedback information or a second arm feedback instruction, the primary-end mechanical arm 12 to perform second arm feedback motion corresponding to the second arm feedback information.

4. An electronic skin connected to a second controller is attached to a surface of a secondary-end mechanical arm 22.

Step 2204 has an implementation as follows: The second controller collects touch feedback information of the secondary-end operation platform 20 through the electronic skin.

Schematically, the touch feedback information includes contact information of the secondary-end mechanical arm 22 for an external environment, where the contact information includes but not limited to at least one of torque information of an external force applied to the secondary-end mechanical arm 22, a contact force of an object touched by the primary-end mechanical arm 12 and geometrical information of the object.

Correspondingly, step 2206 has an implementation as follows: The first controller controls the primary-end mechanical arm 12 according to the touch feedback information or a touch feedback instruction to generate touch feedback corresponding to the touch feedback information.

II. The mechanical hand control assembly 13 has an information feedback function.

According to the above description, the mechanical hand control assembly 13 has an information feedback function. Specifically, the mechanical hand control assembly 13 includes a multi-finger control apparatus 133, a tactile feedback apparatus is arranged on the multi-finger control apparatus 133, and a fingertip tactile sensor connected to the second controller is arranged on the secondary-end mechanical hand 23.

Schematically, Step 2204 has an implementation as follows: The second controller collects fingertip tactile information of the contact information of the secondary-end mechanical hand 23 through the fingertip tactile sensor.

Schematically, the fingertip tactile information includes fingertip feedback information of the external environment for the secondary-end mechanical hand 23. Schematically, the fingertip tactile information includes but not limited to at least one of a contact point, a contact surface, a contact position, the temperature, the shape of the contacted object, the weight of the contacted object, and the roughness of the contacted object between a fingertip of the secondary-end mechanical hand 23 and an object and/or an external environment.

Correspondingly, step 2206 has an implementation as follows: The first controller controls the mechanical hand control assembly 13 according to the fingertip tactile information or a fingertip contact feedback instruction to generate fingertip stimulus feedback.

Schematically, the fingertip contact feedback instruction is generated based on the fingertip tactile information.

Schematically, the fingertip stimulus feedback is performed by the tactile feedback apparatus.

To sum up, in the bilateral teleoperation system control method provided in this embodiment of this application, the feedback information is transmitted to the first controller through the second controller, and the primary-end operation platform 10 controls the primary-end mechanical arm 12 and/or the mechanical hand control assembly 13 according to the feedback information to perform corresponding stimulus feedback.

Figure 23:
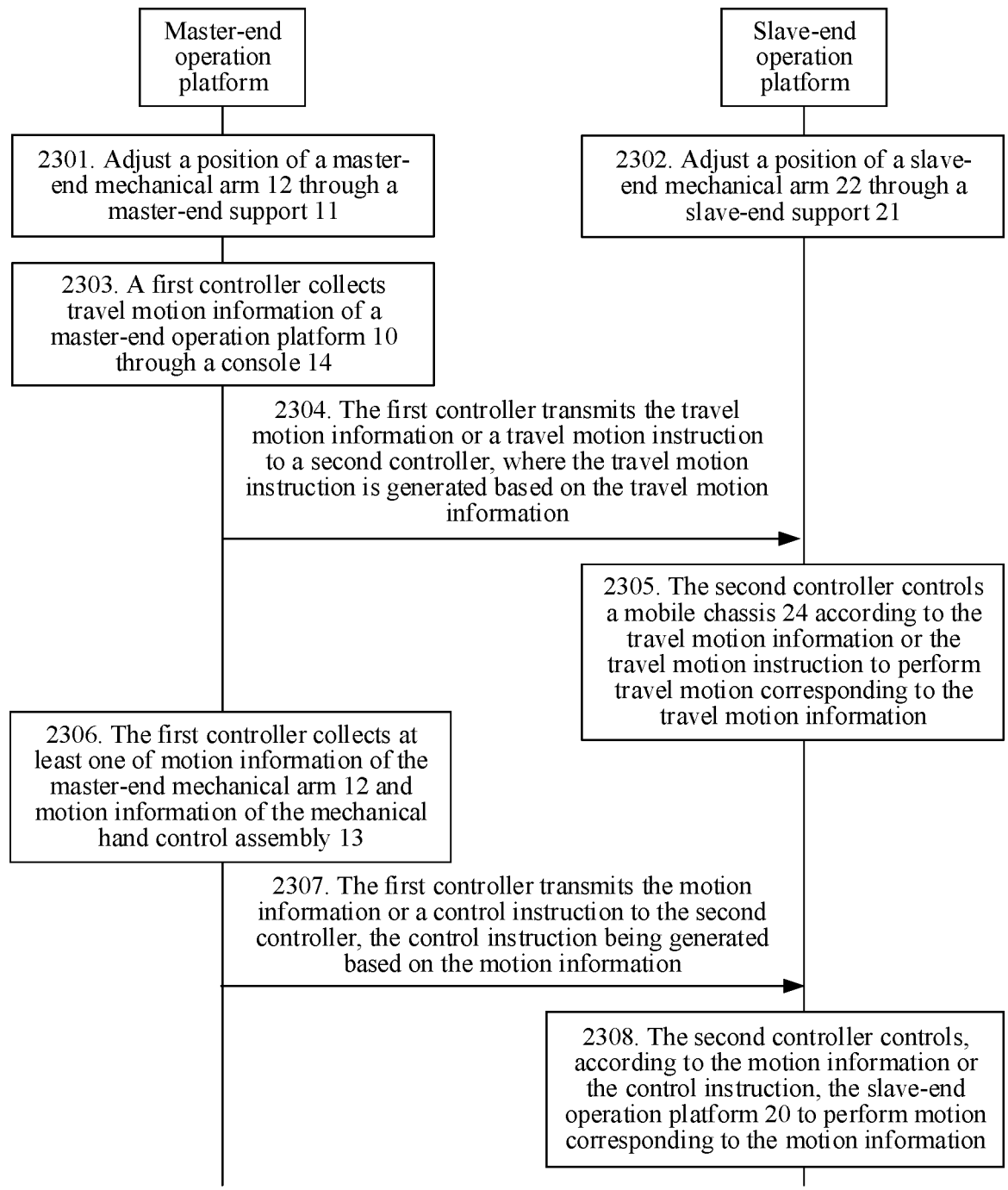
FIG. 23 is a flowchart of a bilateral teleoperation system control method according to an exemplary embodiment of this application.

According to the foregoing content, the primary-end operation platform 10 may further control travel of the secondary-end operation platform 20. Schematically, as shown in FIG. 23, a bilateral teleoperation system control method provided in an embodiment of this application includes steps as follows:

Step 2301. Adjust a position of a primary-end mechanical arm 12 through a primary-end support 11.

According to the foregoing content, at least two primary-end mechanical arms 12 exist, and the primary-end support 11 includes a primary-end apparatus supporting frame 111 and a primary-end mechanical arm supporting frame 112.

Step 2301 includes the following steps:

adjusting heights of the at least two primary-end mechanical arms 12 through the primary-end apparatus supporting frame 111; and adjusting a spacing between the at least two primary-end mechanical arms 12 through the primary-end mechanical arm supporting frame 112.

Step 2302. Adjust a position of a secondary-end mechanical arm 22 through a secondary-end support 21.

According to the foregoing content, at least two secondary-end mechanical arms 22 exist, and the secondary-end support 21 includes a secondary-end apparatus supporting frame 211 and a secondary-end mechanical arm supporting frame 212.

Step 2302 includes the following steps:

adjusting heights of the at least two secondary-end mechanical arms 22 through the secondary-end apparatus supporting frame 211; and adjusting a spacing between the at least two secondary-end mechanical arms 22 through the secondary-end mechanical arm supporting frame 212.

Schematically, step 2301 and step 2302 may be performed simultaneously, may be performed in order or out of order, or may not be performed.

Step 2303. A first controller collects travel motion information of a primary-end operation platform 10 through a console 14.

Step 2304. The first controller transmits the travel motion information or a travel motion instruction to a second controller.

Schematically, the travel motion instruction is generated based on the travel motion information.

Step 2305. The second controller controls a mobile chassis 24 according to the travel motion information or the travel motion instruction to perform travel motion corresponding to the travel motion information.

According to the foregoing content, the console 14 includes a pedal control board 141, and the mobile chassis 24 includes a driving wheel 241. According to this, step 2303 includes an implementation as follows: The first controller collects the travel motion information of the primary-end operation platform 10 through the pedal control board 141. Correspondingly, step 2305 includes an implementation as follows: The second controller controls the driving wheel 241 according to the travel motion information or the travel motion instruction to perform travel motion corresponding to the travel motion information.

Step 2306. The first controller collects at least one of motion information of the primary-end mechanical arm 12 and motion information of the mechanical hand control assembly 13.

Step 2307. The first controller transmits the motion information or a control instruction to the second controller.

Schematically, the control instruction is generated based on the motion information.

Step 2308. The second controller controls, according to the motion information or the control instruction, the secondary-end operation platform 20 to perform motion corresponding to the motion information.

The motion corresponding to the motion information and performed by the secondary-end operation platform 20 is performed by at least one of the secondary-end mechanical arm 22 and the secondary-end mechanical hand 23.

Schematically, steps 2306, 2307, and 2308 are the same as steps 2102, 2104, and 2106 that may be used as a reference, and details are not described again. Schematically, steps 2303, 2304, and 2305 and steps 2306, 2307, and 2308 may be performed simultaneously, may be performed in order or out of order, or may be performed repeatedly.

To sum up, in the bilateral teleoperation system control method provided in this embodiment of this application, the position of the primary-end mechanical arm 12 may be adjusted through the primary-end support 11, the position of the secondary-end mechanical arm 22 may be adjusted according to the secondary-end support 21, and the primary-end operation platform 10 may control travel of the secondary-end operation platform 20 according to the console 14 and the mobile chassis 24.

Figure 24:
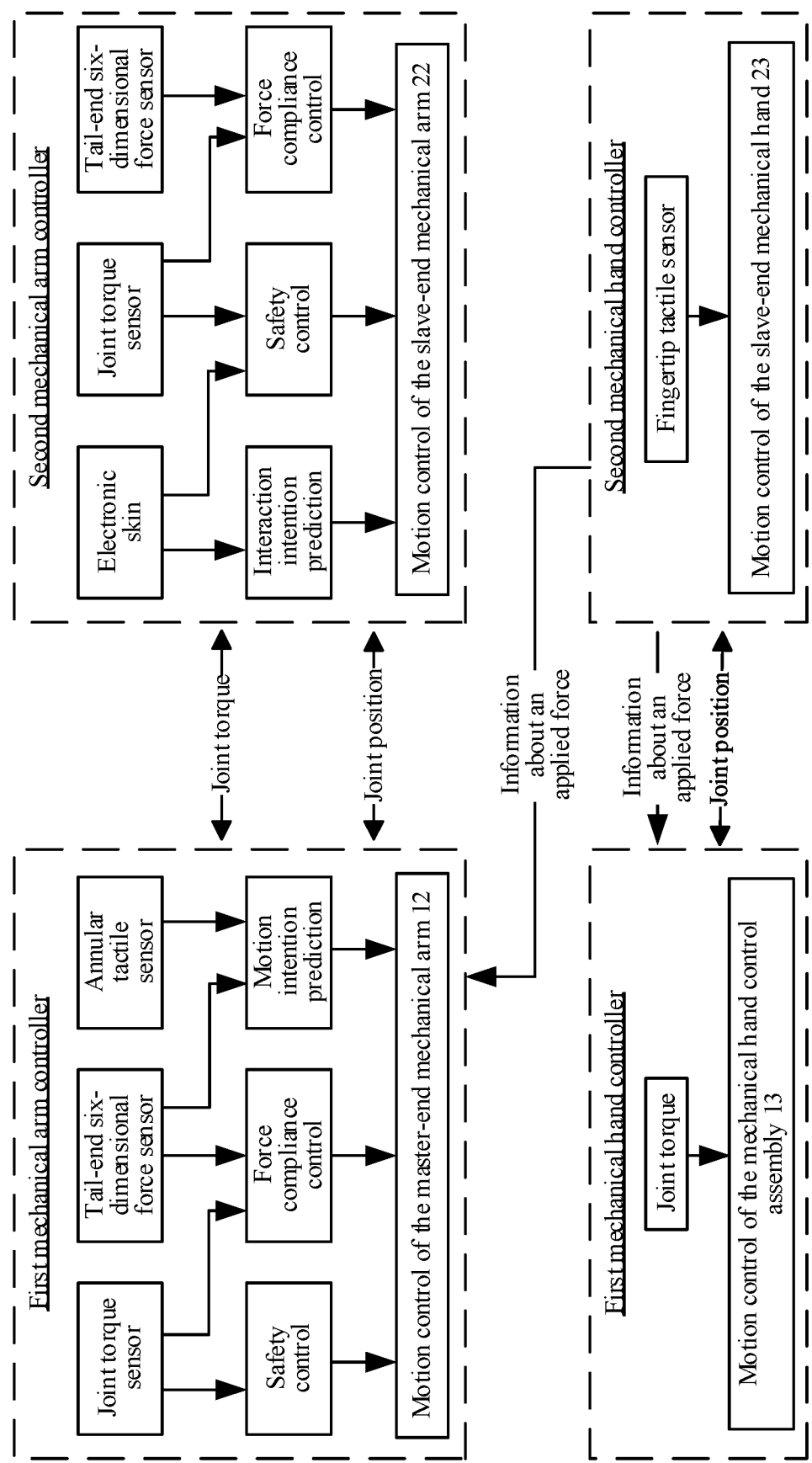
FIG. 24 is a principle diagram of a bilateral teleoperation system control method according to an exemplary embodiment of this application.

According to the foregoing content, FIG. 24 is a principle diagram of a bilateral teleoperation system control method according to an embodiment of this application. Specific descriptions are as follows:

Exemplarily, in the primary-end operation platform 10 of the bilateral teleoperation system 100 provided in this embodiment of this application, the primary-end torque sensor 121 includes the first torque sensor 1211 that is a joint torque sensor and the second torque sensor 1212 that is a tail-end six-dimensional force sensor.

Exemplarily, in the secondary-end operation platform 20 of the bilateral teleoperation system 100 provided in this embodiment of this application, the secondary-end torque sensor 221 includes the third torque sensor 2211 that is a joint torque sensor and the fourth torque sensor 2212 that is a tail-end six-dimensional force sensor, and the fingertip tactile sensor connected to the second controller is arranged on the secondary-end mechanical hand 23.

The first controller may be divided into the first mechanical arm controller and the first mechanical hand controller that are configured to implement motion control of the primary-end mechanical arm 12 and the mechanical hand control assembly 13, the second controller may be divided into the second mechanical arm controller and the second mechanical hand controller that are configured to implement motion control of the secondary-end mechanical arm 22 and the secondary-end mechanical hand 23, and the first controller is communicatively connected to the second controller.

During motion control of the primary-end mechanical arm 12, the joint torque sensor may be configured to perform safety control and force compliance control of the primary-end mechanical arm 12, and the tail-end six-dimensional force sensor may be configured to perform force compliance control and motion intention prediction of the primary-end mechanical arm 12. Additionally, a motion trend of the primary-end mechanical arm 12 perceived by the annular tactile sensor 131 may also be used for predicting a motion intention of the primary-end mechanical arm 12.

Correspondingly, during motion control of the secondary-end mechanical arm 22, the joint torque sensor may be configured to perform safety control and force compliance control of the secondary-end mechanical arm 22, and the tail-end six-dimensional force sensor may be configured to perform force compliance control and motion intention prediction of the secondary-end mechanical arm 22. Additionally, contact information perceived by the electronic skin may also be used for predicting a motion intention of the secondary-end mechanical arm 22.

Safety control refers to control performed on running safety of a mechanical arm, and motion of the mechanical arm includes but not limited to a motion direction, and the size of a motion force. For example, the joint torque sensor on the primary-end mechanical arm 12 perceives that the primary-end mechanical arm 12 is squeezed by a relatively large external force, and the first mechanical arm controller controls the primary-end mechanical arm 12 according to collected torque information of the squeezing external force to stop, to ensure motion safety of the primary-end mechanical arm 12.

Force compliance control refers to control performed on a running compliance extent of a mechanical arm, and through cooperation between the joint torque sensor and the tail-end six-dimensional force sensor, the running compliance extent of the mechanical arm is improved, to avoid the mechanical arm from getting stuck. For example, the joint torque sensor and the tail-end six-dimensional force sensor on the primary-end mechanical arm 12 perceive a motion situation of the primary-end mechanical arm 12, the first mechanical arm controller feeds the motion situation back to the second mechanical arm controller, and the second mechanical arm controller controls each joint of the secondary-end mechanical arm 22 and the tail end of the mechanical arm to perform motion corresponding to a force.

Motion intention prediction refers to prediction and analysis performed on a motion intention of a mechanical arm, and may also improve the running compliance extent of the mechanical arm. For example, the tail-end six-dimensional force sensor on the primary-end mechanical arm 12 perceives the motion situation of the primary-end mechanical arm 12, and learns torque information of motion of the primary-end mechanical arm 12; the annular tactile sensor 131 perceives a motion situation of a wrist of the operator, and learns direction information of the motion of the primary-end mechanical arm 12. The first mechanical arm controller or the second mechanical arm controller performs prediction according to the foregoing two motion situations, to obtain a motion intention of the primary-end mechanical arm 12, and the second mechanical arm controller controls the secondary-end mechanical arm 22 in advance according to the motion intention, so that the secondary-end mechanical arm 22 also has a corresponding motion trend.

Interaction intention prediction refers to motion prediction of a mechanical arm performed according to interaction information received by the mechanical arm. For example, the electronic skin on the secondary-end mechanical arm 22 perceives that a specific pushing force is applied to the secondary-end mechanical arm 22, the second mechanical arm controller feeds information about the pushing force back to the first mechanical arm controller, and the first mechanical arm controller controls the primary-end mechanical arm 12 to perform motion with the same force as the pushing force applied to the secondary-end mechanical arm 22.

During motion control of the mechanical hand control assembly 13, multi-finger motion information of the mechanical hand control assembly 13 is obtained through the multi-finger control apparatus 133 and the handle 132. During motion control of the secondary-end mechanical hand 23, contact information of the secondary-end mechanical hand 23 is perceived through the fingertip tactile sensor.

Additionally, in an interaction process of the first mechanical arm controller and the second mechanical arm controller, data exchange content includes but not limited to at least one of a joint torque and a joint position; in an interaction process of the first mechanical hand controller and the second mechanical hand controller, data exchange content includes but not limited to at least one of information about an applied force and a joint position; Moreover, the second mechanical hand controller may also transmit the information about the applied force to the first mechanical arm controller, to help the primary-end operation platform 10 prejudge next motion control.

In this application, it is to be understood that, the terms such as "first" and "second" are used for descriptive purposes only and should not be construed as indicating or implying relative importance or implicitly indicating the number of technical features indicated.

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

All of the above technical solutions are combinable to form embodiments of this application. Details are not described herein again.

The foregoing descriptions are embodiments of this application, but are not intended to limit this application. Any modification, equivalent replacement, or improvement made within the spirit and principle of this application shall fall within the protection scope of this application.

What is claimed is:

1. A bilateral teleoperation system, comprising: a primary-end operation platform and a secondary-end operation platform;
   the primary-end operation platform comprising: a primary-end support, primary-end mechanical arms, a mechanical hand control assembly, and a first controller, wherein a root end of the primary-end mechanical arm is arranged on the primary-end support, and a tail end of the primary-end mechanical arm is connected to the mechanical hand control assembly; and
   the secondary-end operation platform comprising: a secondary-end support, secondary-end mechanical arms, a secondary-end mechanical hand, and a second controller, wherein a root end of the secondary-end mechanical arm is arranged on the secondary-end support, and a tail end of the secondary-end mechanical arm is connected to the secondary-end mechanical hand; wherein
   the primary-end mechanical arm and the secondary-end mechanical arm are homogeneous mechanical arms with seven degrees of freedom, and the first controller in the primary-end operation platform is communicatively connected to the second controller in the secondary-end operation platform;
   the primary-end operation platform further includes a pair of virtual-reality glasses communicatively connected to the first controller, and the pair of virtual-reality glasses are configured to be worn by an operator of the bilateral teleoperation system; and
   the primary-end operation platform further comprises (i) an annular tactile sensor configured to transfer motion direction information of the operator to the first controller and (ii) a primary-end torque sensor configured to transfer motion torque information of the operator to the first controller to the first controller, wherein the first controller is configured to predict motion information of the operator based jointly on the motion direction information and the motion torque information and cause the second controller to move the secondary-end mechanical arm accordingly with the same number of degree of freedom as the primary-end mechanical arm.

2. The bilateral teleoperation system according to claim 1, wherein
   the annular tactile sensor is arranged on the tail end of the primary-end mechanical arm.

3. The bilateral teleoperation system according to claim 1, wherein
   the primary-end torque sensor is arranged on the primary-end mechanical arm.

4. The bilateral teleoperation system according to claim 3, wherein the primary-end torque sensor comprises at least one of a first torque sensor arranged on a joint of the primary-end mechanical arm and a second torque sensor arranged on the tail end of the primary-end mechanical arm.

5. The bilateral teleoperation system according to claim 3, wherein the primary-end torque sensor further comprises a handle fixedly arranged on the tail end of the primary-end mechanical arm, and the handle is configured to transfer arm motion information of the primary-end mechanical arm to the primary-end torque sensor.

6. The bilateral teleoperation system according to claim 1, wherein the mechanical hand control assembly further comprises a multi-finger control apparatus connected to the first controller and fixedly connected to the tail end of the primary-end mechanical arm.

7. The bilateral teleoperation system according to claim 6, wherein the multi-finger control apparatus comprises a first finger thimble and a second finger thimble arranged on the tail end of the primary-end mechanical arm.

8. The bilateral teleoperation system according to claim 1, wherein the secondary-end operation platform further comprises a binocular vision camera connected to the second controller and arranged on the top of the secondary-end support, and wherein
   the second controller is further configured to collect vision information of the binocular vision camera, and to return the vision information of the binocular vision camera.

9. A bilateral teleoperation system control method, the method comprising:
   collecting, by a first controller, at least one of motion information of a primary-end mechanical arm of a primary-end operation platform controlled by an operator of a bilateral teleoperation system and motion information of a mechanical hand control assembly of the primary-end operation platform controlled by the operator, wherein the primary-end operation platform further comprises (i) an annular tactile sensor connected to the first controller and (ii) a primary-end torque sensor connected to the first controller to the first controller;
   predicting, by the first controller, the motion information of the operator based jointly on motion direction information transferred from the annular tactile sensor and motion torque information transferred from the primary-end torque sensor;
   transmitting, by the first controller, the motion information or a control instruction to a second controller of a secondary-end operation platform of the bilateral teleoperation system, the control instruction being generated based on the motion information;
   controlling, by the second controller according to the motion information or the control instruction, the secondary-end operation platform to perform motion corresponding to the motion information, the motion being performed by at least one of a secondary-end mechanical arm and a secondary-end mechanical hand, wherein the primary-end mechanical arm and the secondary-end mechanical arm are homogeneous mechanical arms with seven degrees of freedom and the secondary-end mechanical arm is configured to move with the same number of degree of freedom as the primary-end mechanical arm according to the motion information or the control instruction;

collecting, by the second controller through a binocular vision camera connected to the second controller, vision feedback information of the secondary-end operation platform, wherein the vision feedback information comprises external image information of the secondary-end operation platform perceived by the binocular vision camera;

transmitting, by the second controller, the vision feedback information to the first controller; and displaying, by the first controller through a pair of virtual-reality glasses connected to the second controller, the vision feedback information to an operator of the bilateral teleoperation system wearing the pair of virtual-reality glasses.

10. The method according to claim 9, further comprising:
collecting, by the first controller through the annular tactile sensor, wrist motion information of the primary-end mechanical arm; and
controlling, by the second controller according to the wrist motion information or a wrist control instruction from intention prediction in a motion direction based on the wrist motion information, the secondary-end mechanical arm to perform wrist motion corresponding to the wrist motion information.

11. The method according to claim 9, further comprising:
collecting, by the first controller through the primary-end torque sensor, arm motion information of the primary-end mechanical arm; and
controlling, by the second controller according to the arm motion information or an arm control instruction, the secondary-end mechanical arm to perform arm motion corresponding to the arm motion information, wherein the arm control instruction is generated by performing intention prediction in a motion torque based on the arm motion information.

12. The method according to claim 11, wherein the primary-end torque sensor comprises a first torque sensor, wherein
collecting, by the first controller through the primary-end torque sensor, arm motion information of the primary-end mechanical arm comprises:
collecting, by the first controller through the first torque sensor, first arm motion information of the primary-end mechanical arm; and
controlling, by the second controller according to the arm motion information or an arm control instruction, the secondary-end mechanical arm to perform arm motion corresponding to the arm motion information comprises:
controlling, by the second controller according to the first arm motion information or a first arm control instruction generated based on the first arm motion information, the secondary-end mechanical arm to perform first arm motion corresponding to the first arm motion information.

13. The method according to claim 11, wherein the primary-end torque sensor comprises a second torque sensor, wherein collecting, by the first controller through the primary-end torque sensor, arm motion information of the primary-end mechanical arm comprises:
collecting, by the first controller through the second torque sensor, second arm motion information of the primary-end mechanical arm; and
controlling, by the second controller according to the arm motion information or an arm control instruction, the secondary-end mechanical arm to perform arm motion corresponding to the arm motion information comprises:
controlling, by the second controller according to the second arm motion information or a second arm control instruction generated based on the second arm motion information, the secondary-end mechanical arm to perform second arm motion corresponding to the second arm motion information.

14. The method according to claim 9, wherein the mechanical hand control assembly comprises a multi-finger control apparatus connected to the first controller, wherein
collecting, by the first controller, at least one of motion information of the primary-end mechanical arm and motion information of the mechanical hand control assembly comprises:
collecting, by the first controller through the multi-finger control apparatus, multi-finger motion information of the mechanical hand control assembly; and
controlling, by the second controller according to the motion information or the control instruction, the secondary-end operation platform to perform motion corresponding to the motion information comprises:
controlling, by the second controller according to the multi-finger motion information or a multi-finger control instruction generated based on the multi-finger motion information, the secondary-end mechanical hand to perform multi-finger motion corresponding to the multi-finger motion information.

15. The method according to claim 9, further comprising:
collecting, by the second controller, at least one of feedback information of the secondary-end mechanical arm and feedback information of the secondary-end mechanical hand;
transmitting, by the second controller, the feedback information or a feedback instruction generated based on the feedback information to the first controller; and
controlling, by the first controller according to the feedback information or the feedback instruction, the primary-end operation platform to perform feedback motion corresponding to the feedback information, wherein the feedback motion is performed by at least one of the primary-end mechanical arm and the mechanical hand control assembly.

16. A non-transitory computer-readable storage medium, storing a computer program, the computer program, when executed by one or more processors of an electronic device, cause the one or more processors to perform operations comprising:
collecting, by a first controller, at least one of motion information of a primary-end mechanical arm of a primary-end operation platform controlled by an operator of a bilateral teleoperation system and motion information of a mechanical hand control assembly of the primary-end operation platform controlled by the operator, wherein the primary-end operation platform further comprises (i) an annular tactile sensor connected to the first controller and (ii) a primary-end torque sensor connected to the first controller to the first controller;

predicting, by the first controller, the motion information of the operator based jointly on motion direction information transferred from the annular tactile sensor and motion torque information transferred from the primary-end torque sensor;

transmitting, by the first controller, the motion information or a control instruction to a second controller of a secondary-end operation platform of the bilateral teleoperation system, the control instruction being generated based on the motion information;

controlling, by the second controller according to the motion information or the control instruction, the secondary-end operation platform to perform motion corresponding to the motion information, the motion being performed by at least one of a secondary-end mechanical arm and a secondary-end mechanical hand, wherein the primary-end mechanical arm and the secondary-end mechanical arm are homogeneous mechanical arms with seven degrees of freedom and the secondary-end mechanical arm is configured to move with the same number of degree of freedom as the primary-end mechanical arm according to the motion information or the control instruction;

collecting, by the second controller through a binocular vision camera connected to the second controller, vision feedback information of the secondary-end operation platform, wherein the vision feedback information comprises external image information of the secondary-end operation platform perceived by the binocular vision camera;

transmitting, by the second controller, the vision feedback information to the first controller; and displaying, by the first controller through a pair of virtual-reality glasses connected to the second controller, the vision feedback information to an operator of the bilateral teleoperation system wearing the pair of virtual-reality glasses.

17. The non-transitory computer-readable storage medium according to claim 16, wherein the operations further comprise:

collecting, by the first controller through the annular tactile sensor, wrist motion information of the primary-end mechanical arm; and controlling, by the second controller according to the wrist motion information or a wrist control instruction from intention prediction in a motion direction based on the wrist motion information, the secondary-end mechanical arm to perform wrist motion corresponding to the wrist motion information.

18. The non-transitory computer-readable storage medium according to claim 16, wherein the operations further comprise:

collecting, by the first controller through the primary-end torque sensor, arm motion information of the primary-end mechanical arm; and controlling, by the second controller according to the arm motion information or an arm control instruction, the secondary-end mechanical arm to perform arm motion corresponding to the arm motion information, wherein the arm control instruction is generated by performing intention prediction in a motion torque based on the arm motion information.

19. The non-transitory computer-readable storage medium according to claim 16, wherein the mechanical hand control assembly comprises a multi-finger control apparatus connected to the first controller, wherein collecting, by the first controller, at least one of motion information of the primary-end mechanical arm and motion information of the mechanical hand control assembly comprises:

collecting, by the first controller through the multi-finger control apparatus, multi-finger motion information of the mechanical hand control assembly; and controlling, by the second controller according to the motion information or the control instruction, the secondary-end operation platform to perform motion corresponding to the motion information comprises:

controlling, by the second controller according to the multi-finger motion information or a multi-finger control instruction generated based on the multi-finger motion information, the secondary-end mechanical hand to perform multi-finger motion corresponding to the multi-finger motion information.

20. The non-transitory computer-readable storage medium according to claim 16, wherein the operations further comprise:

collecting, by the second controller, at least one of feedback information of the secondary-end mechanical arm and feedback information of the secondary-end mechanical hand;

transmitting, by the second controller, the feedback information or a feedback instruction generated based on the feedback information to the first controller; and controlling, by the first controller according to the feedback information or the feedback instruction, the primary-end operation platform to perform feedback motion corresponding to the feedback information, wherein the feedback motion is performed by at least one of the primary-end mechanical arm and the mechanical hand control assembly.

* * * * *